United States Patent
Vaidyanathan et al.

[11] Patent Number: 6,058,209
[45] Date of Patent: May 2, 2000

[54] METHOD FOR RESOLVING REDUNDANT IDENTIFICATIONS OF AN OBJECT

[75] Inventors: Akhileswar Ganesh Vaidyanathan, Hockessin; James Arthur Whitcomb, Wilmington, both of Del.

[73] Assignee: E. I. du Pont de Nemours and Company, Wilmington, Del.

[21] Appl. No.: 08/349,581

[22] Filed: Dec. 5, 1994

Related U.S. Application Data

[63] Continuation-in-part of application No. 08/159,641, Nov. 30, 1993, Pat. No. 5,579,409, which is a continuation-in-part of application No. 08/035,819, Mar. 23, 1993, Pat. No. 5,448,652, which is a continuation-in-part of application No. 07/999,703, Dec. 31, 1992, Pat. No. 5,375,177, which is a continuation-in-part of application No. 07/999,702, Dec. 31, 1992, Pat. No. 5,371,810, which is a continuation-in-part of application No. 07/767,339, Sep. 27, 1991, Pat. No. 5,481,620.

[51] Int. Cl.[7] ..................................................... G06K 9/46
[52] U.S. Cl. .......................... 382/203; 382/133; 382/286
[58] Field of Search .................... 382/128, 133, 382/134, 224, 225, 203, 204, 286, 201

[56] References Cited

U.S. PATENT DOCUMENTS

| | | | |
|---|---|---|---|
| 3,736,432 | 5/1973 | Sweet | 250/222 PC |
| 3,811,036 | 5/1974 | Perry | 235/92 PC |
| 3,873,974 | 3/1975 | Bouton et al. | 382/48 |
| 3,999,047 | 12/1976 | Green | 382/51 |
| 4,097,845 | 6/1978 | Bacus | 340/146.3 |
| 4,183,013 | 1/1980 | Agrawala | 377/10 |
| 4,334,274 | 6/1982 | Agui et al. | 382/22 |
| 4,453,266 | 6/1984 | Bacus | 382/6 |
| 4,493,105 | 1/1985 | Beall et al. | 382/25 |
| 4,618,989 | 10/1986 | Tsukune et al. | 382/25 |
| 4,637,053 | 1/1987 | Schalkowsky | 382/6 |
| 4,718,090 | 1/1988 | Cooper, Jr. | 382/204 |
| 4,747,153 | 5/1988 | Kouno et al. | 382/25 |
| 4,763,119 | 8/1988 | Matsubara et al. | 340/747 |
| 4,809,349 | 2/1989 | Herby et al. | 382/50 |

(List continued on next page.)

FOREIGN PATENT DOCUMENTS

| | | | |
|---|---|---|---|
| 2 602 074 | 7/1986 | France . | |
| 62-60069 | 12/1987 | Japan . | |
| WO 91/18368 | 11/1991 | WIPO | G06K 9/48 |
| WO 93/06562 | 4/1993 | WIPO | G06F 15/72 |
| WO 94-16405 | 7/1994 | WIPO | G06F 15/72 |
| WO 94/16402 | 7/1994 | WIPO | G06F 15/62 |
| WO 94/16403 | 7/1994 | WIPO | G06F 15/70 |

OTHER PUBLICATIONS

Whitcomb et al., Adaptive Image Analysis For Object Recognition Part II—Redundant Object Resolution, IEEE, vol. 2, pp. 1892–1898, 1995.

Couch et al., *Analysis of Images of Colonies of Tissue Culture Cells and Microorganisms*, Proc. Pateern Recognition and Image Processing, pp. 473–8, Aug. 1979.

Marr, D, "Early Processing of Visual Information", *Image Understanding*, eds. Ullman and W. Richards, Ablex Publishing Company, 1984.

(List continued on next page.)

*Primary Examiner*—Yon J. Couso

[57] ABSTRACT

When identifying an object in an image, very often redundant identifications of the object may occur. The present invention relates to methods of image analysis for resolving such redundant identifications of an object. More specifically, the present invention relates to object identification schemes which obtain multiple representations of the same object. In addition, such identification schemes may identify void, or donut-shaped objects when a single search, or multiples searches, of the image are performed. Further, the present invention is useful in resolving several distinct objects where other identification schemes employing either single or multiple searching have identified these distinct objects as a single clumped object. The present invention may be used, for instance, to determine whether a smaller object is contained within another, larger object.

25 Claims, 74 Drawing Sheets

U.S. PATENT DOCUMENTS

| | | | |
|---|---|---|---|
| 4,958,217 | 9/1990 | Kimura et al. | 358/75 |
| 4,959,869 | 9/1990 | Hongo | 382/51 |
| 4,998,211 | 3/1991 | Hamada et al. | 340/747 |
| 5,029,106 | 7/1991 | Kai et al. | 364/518 |
| 5,038,385 | 8/1991 | Kasahara | 382/22 |
| 5,046,118 | 9/1991 | Ajewole et al. | 382/51 |
| 5,073,960 | 12/1991 | Nakai et al. | 382/22 |
| 5,083,313 | 1/1992 | Reinsch | 382/8 |
| 5,138,671 | 8/1992 | Yokoyama | 382/52 |
| 5,220,620 | 6/1993 | Nakano et al. | 382/17 |
| 5,457,754 | 10/1995 | Han et al. | 382/128 |

OTHER PUBLICATIONS

Shannon, C.E.,"A Mathematical Theory of Communication", *Bell Syst. Tech. J.*, 27, 379–423, Jul. 1948.

Pun, T., "Entropic Thresholding, A New Approach", *Comp. Graphics and Image Proc.*, 16, 210–239, 1981.

Kapur, J.N. et al,. "A New Method for Gray–Level Picture Thresholding Using the Entropy of the Histogram", *Comp. Graphics and Image Proc.*, 29, 273–285, 1985.

Pal, S.K. et al, "Entropic Thresholding", *Signal Processing*, 16, 97–108, 1989.

Haralick, R.M. et al, "Textural Features for Image Classification", *IEEE Transactions on Systems, Man & Cybernetics*, SMC–3(6), 610–621, 1973.

Wang, S. et al, "Automatic Multithreshold Selection", *Computer Vision Graphics and Image Processing*, 25, 46–67, 1984.

Fernandes, M.A. et al, "Detection and Quantification of Microorganisms in a Heterogeneous Foodstuff by Image Analysis", *Cabios*, 4(2), 291–295, 1988.

Johannsen, G. et al, "A Threshold Selection Method Using Information Measures", Proc. 6th Int. Conf. on Pattern Recognition, 1982.

Sahoo, P.K. et al, "A Survey of Thresholding Techniques", *Computer Vision, Graphics and Image Processing*, 41, 233–260, 1988.

Abutaleb, A.S. , "Automatic Thresholding of Grey–Level Pictures Using Two Dimensional Entropy", *Computer Vision, Graphics and Image Processing*, 47, 22–32, 1989.

Lee, S.U. et al, "A Comparative Performance Study of Several Global Thresholding Techniques for Segmentation", *Computer Vision, Graphics, and Image Processing*, 52, 171–190, 1990.

Wong,A.K.C., et al, "A Gray Level Threshold Selection Method Based on Maximum Entropy Principle", *IEEE Transactions on System, Man and Cybernetics*, 19, 866–871, 1989.

Mehmet Celenk, "A Color Clustering Technique for Image Segmentation", *Computer Vision, Graphics and Image Processing*, 52, 145–170, 1990.

Miyamoto, S. et al, "Enhancement of Laser Radar Images By A Class of Piecewise Linear Transformations of Gray Levels Based on Entropy Criteria", *1985 IEEE Workshop on Languages for Automation*, Jun. 29, 1985, Palma De Mallorca, Spain, 265–269.

Chang, L.W. et al, "A Fast Algorithm for the Restoration of Images Based on Chain Codes Description and Its Applications", *Computer Vision, Graphics and Image Processing*, 50, 296–307, 1990.

Landeweerd, G.H. et al, "Pattern Recognition of Nucleated Cells from the Peripheral Blood", *Pattern Recognition*, 16(2), 131–140, 1983.

Freeman, H., "Computer Processing of Line–Drawing Images", *Computing Surveys*, 6(1), 57–97, Mar. 1974.

Barba et al, "Automatic Region Construction by Edge Detection and Contour Following in Image Segmentation", Proceedings of the Eight Inter. Conf. on Pattern Recog., Paris, France, *IEEE Press*, 681–683, Oct. 27–31, 1986.

Iwata et al, "A Discrimination Method of the Interior and Exterior of a Closed Curve", *System, Computers, Controls*, 11(6), 11–20, Nov.–Dec. 1980.

Ali et al, "A New Algorithm for Extracting the Interior of Bounded Regions Based on Chain Coding", *Computer Vision, Graphics and Image Processing*, 43(2), 256–264, Aug. 1988.

G. Wyszecki and W.S. Stile, "Color Science, Concepts and Methods, Quantitative Data and Formulae", pp. 228–230 (1967).

| POINT | ROW (X) | COLUMN (Y) | NEXT$_i$ | PREV.$_i$ |
|---|---|---|---|---|
| 1 | 1 | 2 | 3 | 1 |
| 2 | 2 | 3 | 3 | 3 |
| 3 | 3 | 4 | 1 | 3 |
| 4 | 2 | 5 | 1 | 1 |
| 5 | 1 | 6 | 3 | 1 |
| 6 | 2 | 7 | 4 | 3 |
| 7 | 3 | 7 | 5 | 4 |
| 8 | 4 | 6 | 5 | 5 |
| 9 | 5 | 5 | 6 | 5 |
| 10 | 5 | 4 | 7 | 6 |
| 11 | 4 | 3 | 7 | 7 |
| 12 | 3 | 2 | 7 | 7 |
| 13 | 2 | 1 | 1 | 7 |

FIG.14

LUT CLOCKWISE

DIRECTION CODE

| | NEXT | 0 | 1 | 2 | 3 | 4 | 5 | 6 | 7 |
|---|---|---|---|---|---|---|---|---|---|
| PREVIOUS 0 | | F | F | F | NF | NF | F | F | F |
| 1 | | F | F | F | NF | NF | NF | F | F |
| 2 | | F | F | F | NF | NF | NF | NF | F |
| 3 | | F | F | F | NF | NF | NF | NF | NF |
| 4 | | NF | F | F | NF | NF | NF | NF | NF |
| 5 | | NF | NF | F | NF | NF | NF | NF | NF |
| 6 | | F | F | F | F | F | F | F | F |
| 7 | | F | F | F | NF | F | F | F | F |

DIRECTION CODE

FIG.15

LUT COUNTERCLOCKWISE

DIRECTION CODE

| | NEXT | 0 | 1 | 2 | 3 | 4 | 5 | 6 | 7 |
|---|---|---|---|---|---|---|---|---|---|
| PREVIOUS | | | | | | | | | |
| 0 | | NF | NF | F | F | F | NF | NF | NF |
| 1 | | NF | NF | F | F | F | F | NF | NF |
| 2 | | NF | NF | F | F | F | F | NF | NF |
| 3 | | NF | NF | F | F | F | F | F | NF |
| 4 | | NF | NF | F | F | F | F | F | F |
| 5 | | NF | NF | F | F | F | F | F | F |
| 6 | | F | F | F | F | F | F | F | F |
| 7 | | NF | NF | F | F | NF | NF | NF | NF |

DIRECTION CODE

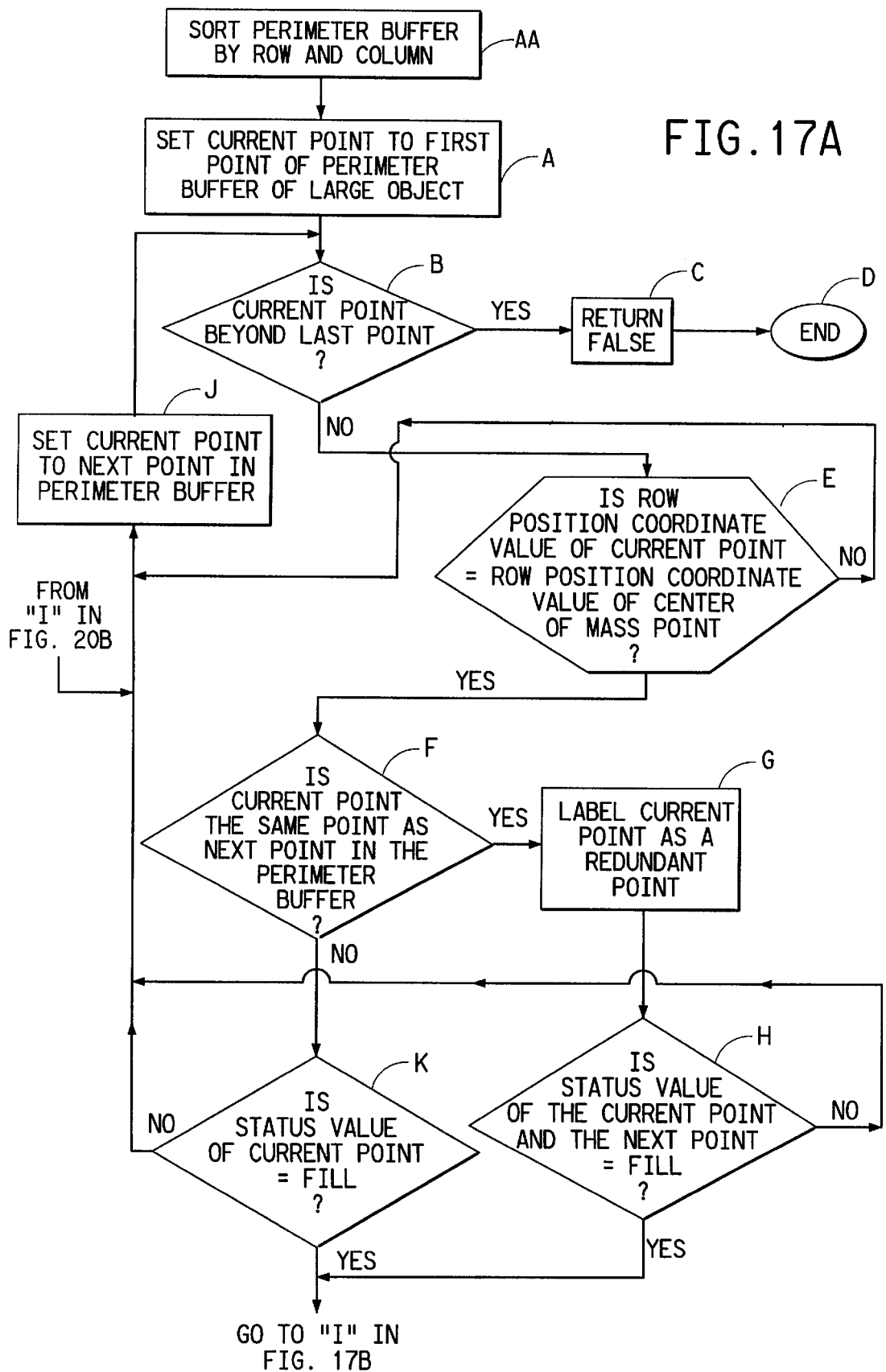

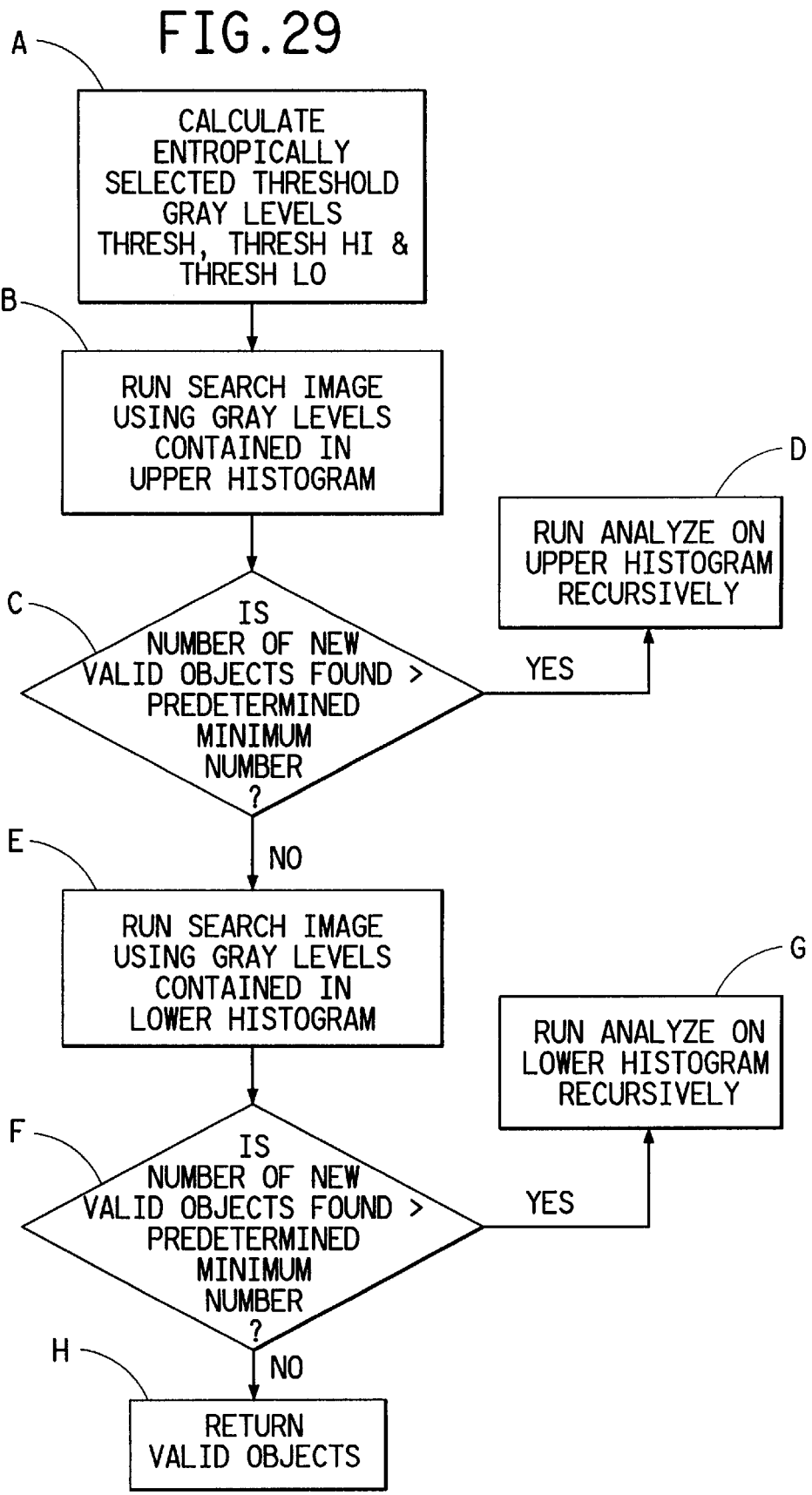

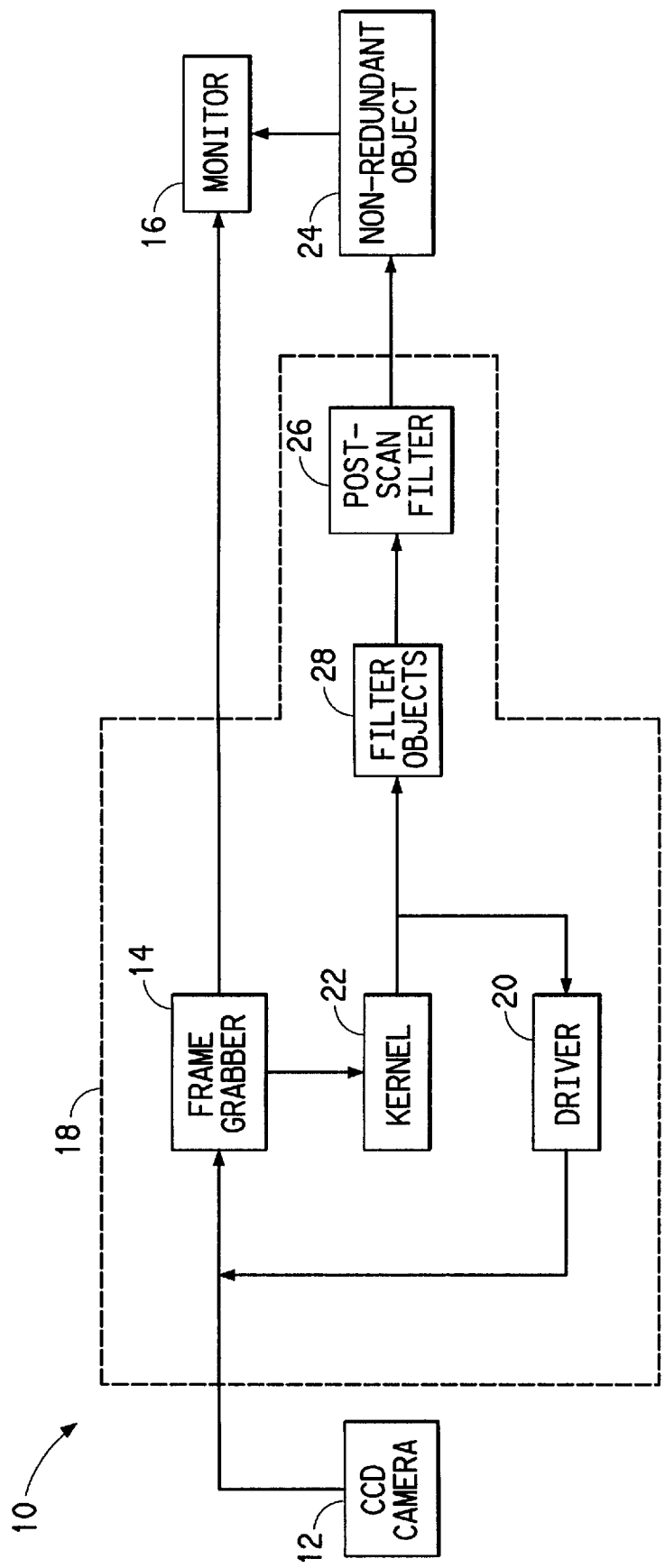

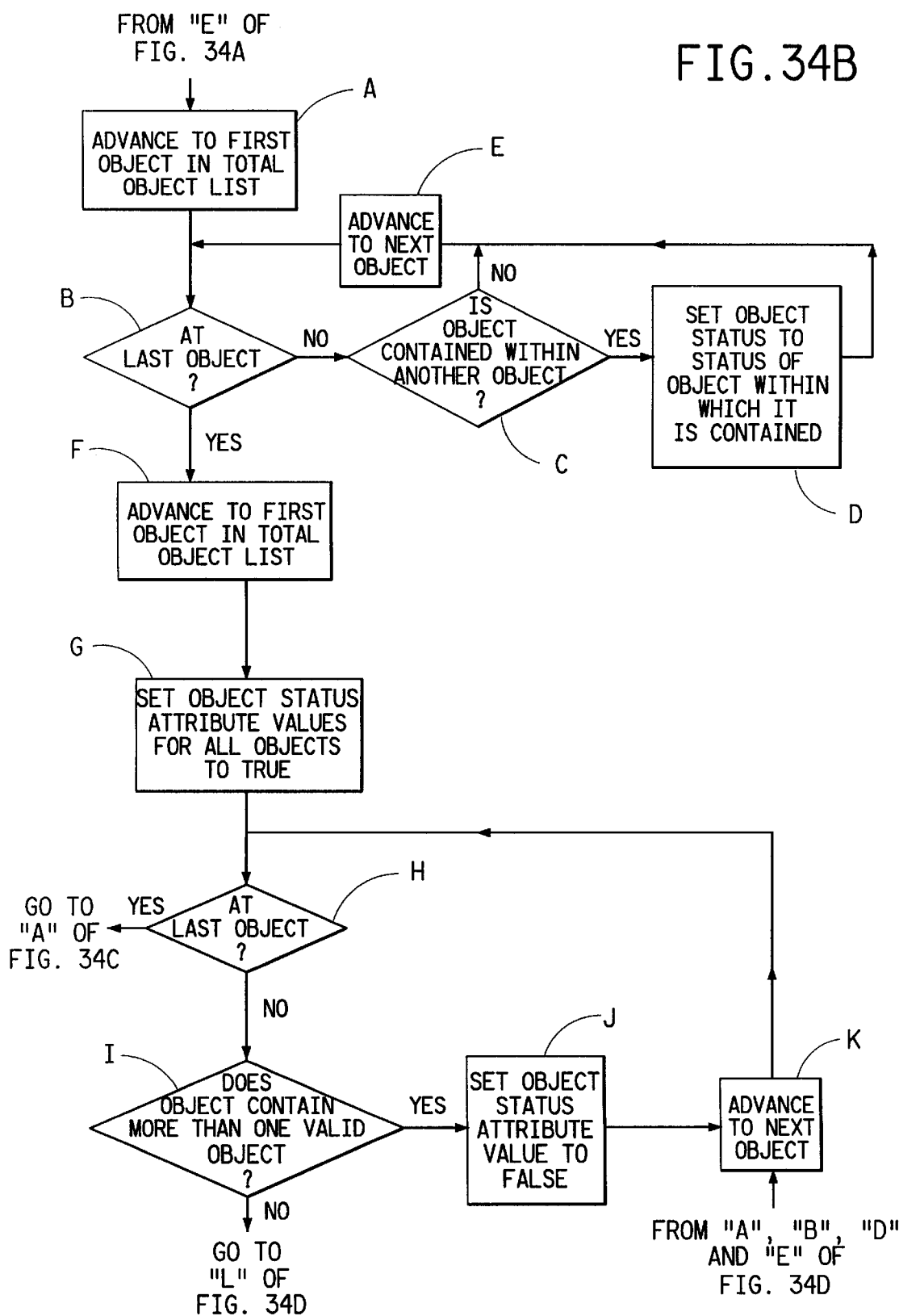

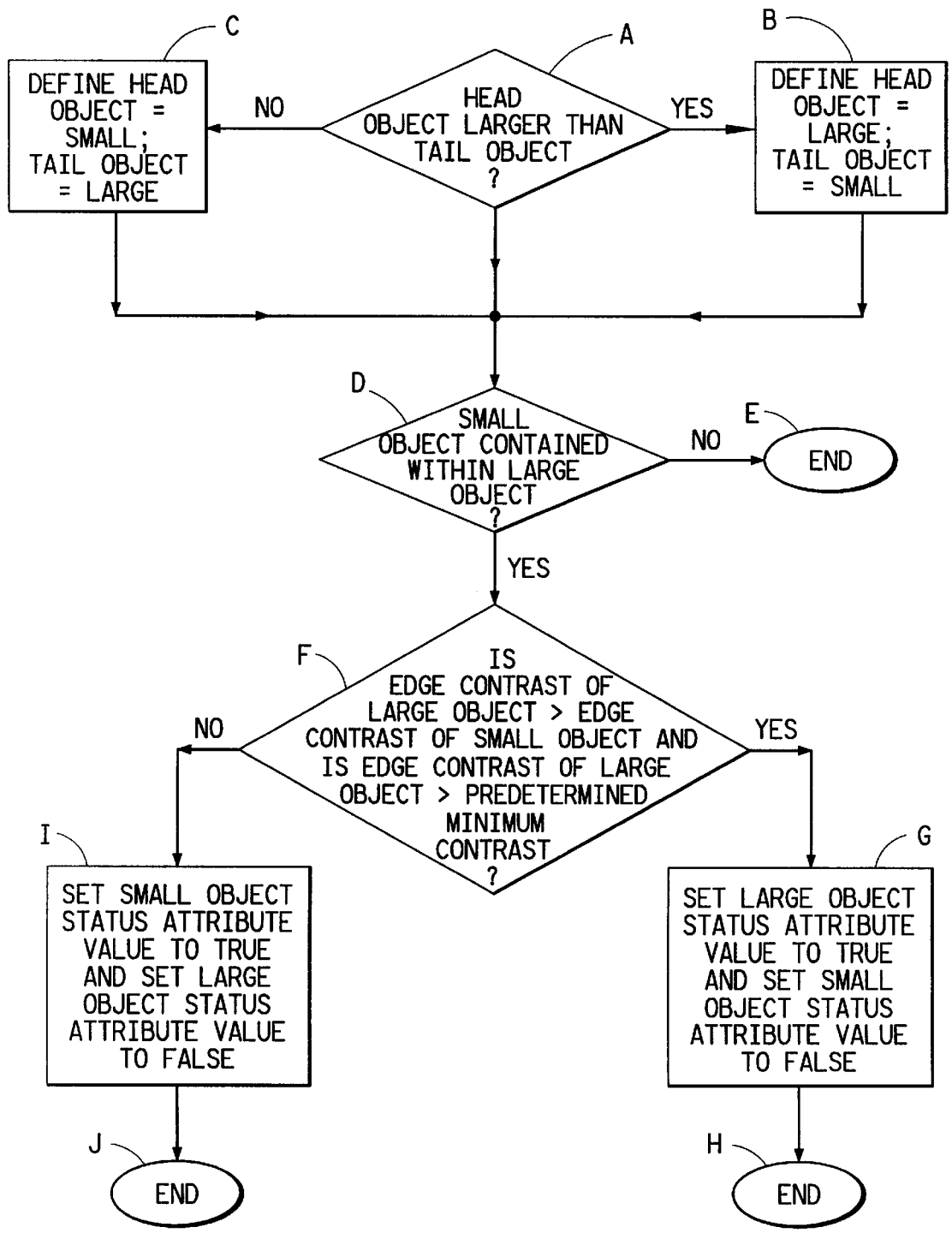

METHOD FOR RESOLVING REDUNDANT IDENTIFICATIONS OF AN OBJECT

This application is a continuation in part of U.S. application Ser. No. 08/159,641, filed Nov. 30, 1993, now U.S. Pat. No. 5,579,409, which is continuation-in-part of U.S. application Ser. No. 08/035,819, filed Mar. 23, 1993, now U.S. Pat. No. 5,448,652 which is continuation-in-part, of U.S. application Ser. No. 07/999,703, filed Dec. 31, 1992, now U.S. Pat. No. 5,375,177 which is a continuation-in-part, of U.S. application Ser. No. 07/999,702, filed Dec. 31, 1992, now U.S. Pat. No. 5,371,810, which is continuation-in-part of U.S. application Ser. No. 07/767,339, filed Sep. 27, 1991 now U.S. Pat. No. 5,481,620.

BACKGROUND OF THE INVENTION

1. Field of the Invention

The present invention relates to image analysis methods for resolving redundant identifications of an object. More specifically, the present invention relates to object identification schemes which obtain multiple representations of the same object when multiple searches of the same image are performed. Alternatively, object identification schemes may identify void, or donut-shaped objects when a single search, or multiple searches, of the image are performed. Further, the present invention is useful in resolving several distinct objects when either a single search or when multiple searches of the same image are performed, where other identification schemes have identified these distinct objects as a single clumped object. Such object identification schemes decide whether the identification of an object having one or more predetermined attributes and obtained from one representation of the object is redundant with another identification of the object which has at least one of the predetermined attributes and which is obtained from a different scan of the object. The present invention may be used, for instance, to determine whether a smaller object is contained within a previously identified, larger object.

2. Description of the Related Art

Image analysis methods are known for identifying an object in a background. See, for example, U.S. Pat. No. 4,453,266 to Bacus. However, such image analysis methods are unable to discriminate between objects which overlap one another. For instance, in an object identification scheme, when viewing an image, which is a two-dimensional representation of an object, there may be several representations of an object which piggyback each other—i.e., overlie the same two-dimensional space in the image. These several representations may appear as only one object, but in reality should be identified as several objects. In other image identification schemes, multiple, overlapping objects are identified as a single clumped object and are not resolved into several, distinct objects.

SUMMARY OF THE INVENTION

The present invention provides image analysis methods for resolving redundant identifications of an object so that the same object is counted only once in an identification scheme. The present invention is especially useful for identification schemes where multiple scans of an image result in multiple identifications of a single object.

In accordance with the purpose of the invention, as embodied and broadly described herein, there are provided methods for resolving redundant identifications of an identified object in an image. A first and fourth embodiment of the method of the present invention comprises the steps of identifying a group of potentially redundant objects in an image; sorting the identified objects in a predetermined order to create a sorted list of objects, where the initial object in the list has an initial characteristic value and the last object in the list has a last characteristic value; defining an object status variable, where the object status variable has one of a first and a second value; assigning the first value of the object status variable to the initial object in the sorted list; comparing each respective object subsequent to the initial object to each object having a characteristic value less than the characteristic value of the respective, subsequent object and having the first value of the object status variable, wherein each respective, subsequent object is defined as a first object and each object having a characteristic value less than the characteristic value of the first object is defined as a second object for each comparison; determining whether each respective second object has a characteristic value contained within a predetermined range of the characteristic value of the first object, thereby assigning one of the first and the second status values of the object status variable to each respective first object and to each respective second object in order to resolve redundant identifications of an object in the image; and identifying the objects having the first value of the object status variable as non-redundant objects and retaining the non-redundant objects.

In accordance with a second embodiment of the invention, there is provided a method of resolving redundant identifications of an object in an image. The method comprises the steps of identifying a group of potentially redundant objects; comparing the areas of two identified objects and designating one of the objects as a relatively larger object as compared to the other object and the other of the objects as a relatively smaller object as compared to the larger object; determining whether the smaller object is contained within the larger object by determining the four extremum points of the larger object, each extremum point having a row-position coordinate value and a column-position coordinate value; constructing a rectangle bounding the larger object by using the row-position coordinate value and the column-position coordinate values of the four extremum points; determining a predetermined point on the smaller object, the predetermined point having a predetermined row-position coordinate value and a predetermined column-position coordinate value; determining the position of the predetermined point of the smaller object with respect to the rectangle bounding the larger object, and designating the smaller object as contained within the larger object if the predetermined point of the smaller object is contained within the rectangle, thereby resolving redundant identifications of each identified object in the image.

Further in accordance with a third embodiment of the present invention, there is provided a method of identifying a valid object having at least one predetermined attribute value in a background and for resolving redundant identifications of the valid object. The method comprises the steps of generating an image of an object and a background; defining a multi-dimensional data space comprising a plurality of sub-spaces; selecting at least one sub-space; multiply searching the image using the selected sub-space for at least one representation of a candidate object, wherein the candidate object has at least one candidate object attribute value; and validating the candidate object having the valid object predetermined attribute value to identify the valid object by comparing the areas of two valid objects and designating one of the valid objects as a relatively larger valid object as compared to the other valid object and the other of the valid objects as a relatively smaller valid object as compared to the larger object; determining the perimeter points of the larger valid object; creating a perimeter buffer comprising the perimeter points of the larger valid object, each perimeter point having a row-position coordinate value and a column-position coordinate value; determining the four extremum points of the larger valid object; constructing a rectangle bounding the larger valid object by using the row-position coordinate value and the column-position coordinate values of the four extremum points; determining a predetermined point on the smaller object, the predetermined point having a predetermined row-position coordinate value and a predetermined column-position coordinate value; determining the position of the predetermined point of the smaller object with respect to the rectangle bounding the larger object, and designating the smaller object as being contained within the larger object if the predetermined point of the smaller object is contained within the rectangle, thereby resolving redundant identifications of each identified valid object in the image.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 14 is a FILL look-up table for objects traced in the clockwise direction.

FIG. 15 is a FILL look-up table for objects traced in the counterclockwise direction.

FIGS. 17A–17B are a flow chart showing the steps of the module CONTAIN STATUS, which is called by CHECK CONTAIN, and which performs a portion of the check of whether a smaller object is contained in a larger object for the first embodiment.

FIG. 29 is a flow chart showing the steps of a module, ANALYZE, which is used to recursively search the image for candidate objects for the first embodiment.

FIG. 30 is a schematic diagram showing the components of a system used with the first, second and fourth embodiments of the present invention.

FIGS. 34A–34D are a flow chart showing the steps of a module, CHK LIST, which is used to resolve redundancies in inhomogeneous objects in the third embodiment.

FIG. 37 is a flow chart showing the steps of a module, SET STAT, which is used with the module CHK LIST as shown in FIGS. 36A–36B.

DETAILED DESCRIPTION OF THE PREFERRED EMBODIMENTS

Reference will now be made in detail to the present preferred embodiments of the invention as illustrated in the accompanying drawings.

In accordance with a first and a fourth embodiment of the present invention, there is provided a method for resolving redundant identifications of an object in an image. The method of the first embodiment is particularly useful when the image is searched, or scanned, multiple times and when multiple representations of a single object are identified. The present invention also has utility if the image is only scanned once, or only one representation of the image is made. In particular, the present invention may be useful for identifying void, or "donut-shaped", objects when a single search of the image is performed. Further, the present invention has also been found to be valuable in resolving several distinct objects when other image analysis methods have identified a single, clumped object through either a single search, or through multiple searches of the image.

Figure 1:
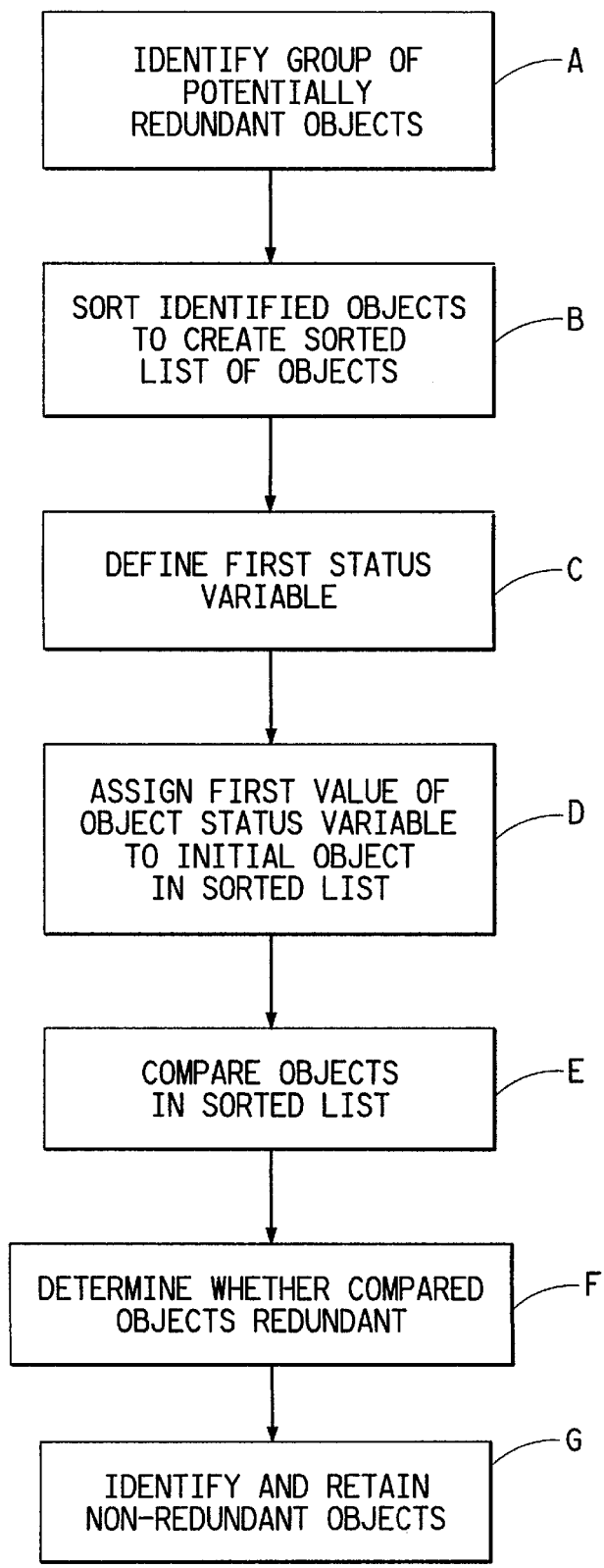
FIG. 1 is a block diagram showing the steps of the overall method according to a first and a fourth embodiment of the present invention.

The overall steps of the method of the first and fourth embodiments are illustrated in the block diagram of FIG. 1. The method of the first embodiment comprises the step of identifying a group of potentially redundant objects in an image. This step is shown in block A of FIG. 1. The group of potentially redundant objects may be identified using any thresholding method which searches an image, such as entropic thresholding, as will be described below with respect to a preferred implementation of the first embodiment. Such thresholding methods may include manually calculated thresholds, and automatically calculated thresholds, which will be explained below with respect to FIGS. 28A–28C.

Figure 2A:
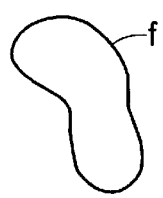
FIGS. 2A and 2B are schematic diagrams of two objects identified through multiple searches of an image.
Figure 2B:
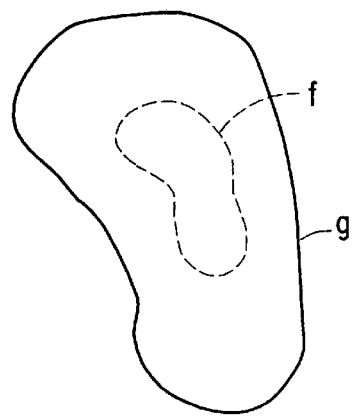

A preferred implementation of the first and fourth embodiments will be illustrated with respect to FIGS. 2A and 2B and FIGS. 3A and 3B, where, for purposes of ease of visualization, redundancy determination is based on the characteristic value of the size attribute—i.e., whether a smaller object is contained within a larger object. FIGS. 2A and 2B are schematic diagrams of two objects which are identified through multiple searches of an image. In FIG. 2A a first search or scan of the image is conducted, and an object, f, is identified. In FIG. 2B, a second search or scan of the image is conducted, and an object, g, is identified. The dotted outline of object f is also illustrated in FIG. 2B to show its relative size and position with respect to object g. In FIGS. 2A and 2B, object f is smaller than object g and is contained within object g. With the method of the present invention, object f is determined to be redundant with object g. Thus, object g is retained, and object f is deleted, or not retained.

Figure 3A:
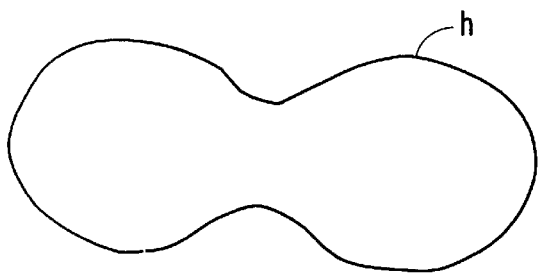
FIGS. 3A and 3B are schematic diagrams of three objects identified through multiple searches of an image.
Figure 3B:
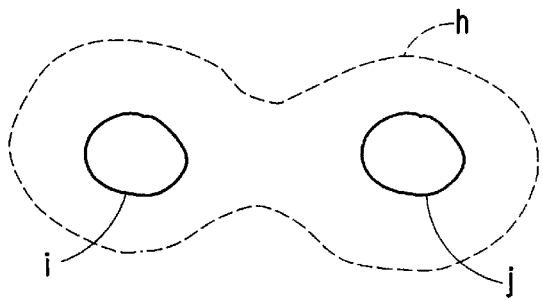

The determination of whether a smaller object is contained in a larger object is also illustrated with respect to FIGS. 3A and 3B, which are schematic diagrams of three objects which are identified through multiple searches of an image. For FIG. 3A, a first search or scan of an image is conducted and object, h, is identified. In FIG. 3B, a second search or scan of the image is conducted, and an object, i, and an object j, are identified. The dotted outline of object h is also illustrated in FIG. 3B to show its relative size and position to objects i and j. In the schematic of FIGS. 3A and 3B, objects i and j are smaller than object h and are contained within object h. With the method of the present invention, object h is determined to be redundant with objects i and j. Thus, object h is deleted, or not retained, and objects i and j are retained.

The method of resolving redundant identifications of an object of the first and fourth embodiments also comprises the step of sorting the identified objects in a predetermined order to create a sorted list of objects. This step is shown in block B of FIG. 1. The initial object in the list has an initial characteristic value, and the last object in the list has a last characteristic value. In a preferred implementation of the first and fourth embodiments, the characteristic value is indicative of size, so that the first object in the list is the smallest object, and the last object in the list is the largest object. However, the characteristic value may be indicative of other attributes of an object. Two types of such attributes include (1) morphological attributes, such as size and shape, and (2) gray level attributes, which include hue and edge contrast. In the case of hue, it may be possible that multiple representations of the same object could have a narrower hue range than the hue differences between different objects. In this instance, one could resolve redundant identifications based on hue range.

The method of resolving redundant identifications of an object of the first and fourth embodiments also comprises the step of defining an object status variable. This step is shown in block C of FIG. 1. The object status variable has one of a first and a second value. The first value of the status variable is "RETAIN", or "KEEP BOTH". In the first embodiment, the second value of the status variable is "DELETE".

The method of resolving redundant identifications of an object of the first and fourth embodiments also comprises the step of assigning the first value of the object status variable to the initial object in the list. This step is shown in block D of FIG. 1. This step is also shown in block B of FIG. 4A for the first embodiment. In the preferred implementation of the first and fourth embodiments, where redundancy determination is based on size, a status value of "RETAIN" is assigned to the smallest object in the group of objects identified as being potentially redundant.

The method of resolving redundant identifications of an object of the first and fourth embodiments also comprises the step of comparing each respective object subsequent to the first object to each object having a characteristic value less than the characteristic value of the respective, subsequent object and having the first value of the status variable. This step is shown in block E in FIG. 1. For example, in the preferred implementation of the first and fourth embodiments, each object larger than and subsequent to the smallest object in the list is compared to each object smaller than each respective subsequent object which has a status value of RETAIN. For each comparison, each respective subsequent object is defined as a first object, and each object having a characteristic value less than the characteristic value of the first object is defined as a second object. For example, in the preferred implementation of the first embodiment, the subsequent object larger than the smallest object is the first object, and each object smaller than the subsequent object is the second object for purposes of comparison.

The method of resolving redundant identifications of an object of the first and fourth embodiments also comprises the step of determining whether each respective second object has a characteristic value contained within a predetermined range of the characteristic value of the first object, thereby assigning one of the first and second status values of the object status variable to each respective first object and to each respective second object. In this way, redundant identifications of an object in the image are resolved. This step is shown in block F of FIG. 1. The method of resolving redundant identifications of the first and fourth embodiments further comprises the steps of identifying the objects having the first value of the object status variable as non-redundant objects and retaining the non-redundant objects. This step is shown in block G of FIG. 1. In the preferred implementation of the first embodiment, when the characteristic value is for the size attribute, checking for redundancy based on size, the second object is a smaller object and is contained within the first object. In the case of hue redundancy, the hue of the second object has a hue within a given range of hue of the first object. In the case of shape, the shape factor of the second object is within a given range of the shape factor of the first object. In addition, multiple attributes may be used to construct the characteristic value. For the sake of the ability to conceptualize the present invention, all the flow charts beyond the broadest implementation of the first and fourth embodiments will be illustrated for the preferred implementation where the characteristic value is for the size attribute. Thus, in the following description and the accompanying Figures, the first object is illustrated as a larger object (as compared to the second object), and the second object is illustrated as a smaller object (as compared to the first, or larger object). Thus, as can be easily appreciated, the step of determining whether each respective second object has a characteristic value contained within a predetermined range of the characteristic value of the first object comprises determining whether the smaller object is contained within the larger object.

The step of determining whether each respective second object has a characteristic value contained within a predetermined range of the characteristic value of the first object comprises certain sub-steps, which may be referred to as selection rules. In the first embodiment, the selection rules provide that 1) the first object is retained and the first object status variable is set to the first value, RETAIN, if no second object has a characteristic value within the predetermined range of the characteristic value of the first object. The selection rules also provide that 1) the first object is retained and the first object status variable is set to the first value, RETAIN, if only one second object has a characteristic value within the predetermined range of the characteristic value of the first object, and 2) the second object is deleted. The selection rules also provide that 1) the first object is deleted, and 2) the object status variable of the second object is set to the first value, RETAIN, if more than one second object has a characteristic value within the predetermined range of the characteristic value of the first object.

The module FILTER OBJECTS is the main module which performs the redundancy checking for the first embodiment and is described in FIGS. 4A–4E. FILTER OBJECTS calls a module SET STATUS as will be described below with respect to FIG. 6. SET STATUS initially performs a box text, which is the first step of a containedness check—i.e., a test of whether a smaller object is contained in a larger object, which will be described below with respect to FIG. 5. If the box test is satisfied, SET STATUS performs a module CHECK CONTAIN as will be described below with respect to FIG. 16. The module CHECK CONTAIN performs a second step of the containedness check. If CHECK CONTAIN is satisfied, SET STATUS performs a module CHECK SIMILARITY, as will be described below with respect to FIG. 19. The module CHECK SIMILARITY performs another portion of the containedness check as will be explained below.

Figure 4A:
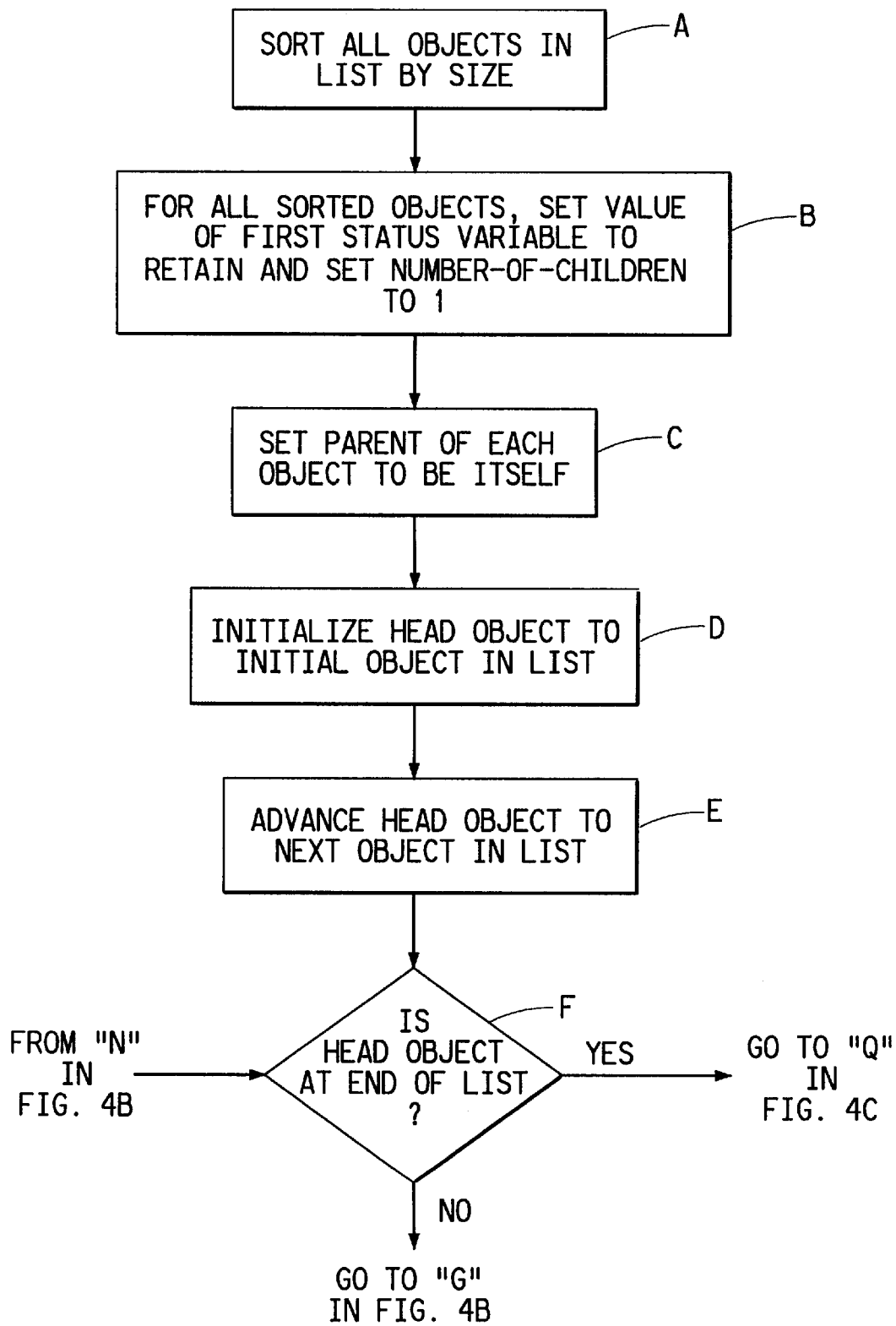
FIGS. 4A–4E are a flow chart showing the steps of the module FILTER OBJECTS, which is the main module for resolving redundant identifications of an object in the first and second embodiments.

The steps of the module FILTER OBJECTS are shown in the flow chart of FIGS. 4A–4E. The first step of FILTER OBJECTS, when performed for the preferred implementation of the first embodiment, is to sort all the objects in the group by the characteristic value of size to form a list. The first object in the list is the smallest object, and the last object in the list is the largest object. As shown in block B of FIG. 4A, for all sorted objects in the list, the value of the object status variable is set to RETAIN, and number of smaller objects contained within that object is set to one. In a comparison of two objects, the parent object is that object which contains the other object. The contained object is referred to as the child. As shown in block C of FIG. 4A, the parent, also referred to as the first, or larger object, of each object is set to be itself. The head object, i.e., the first object, which becomes each respective object subsequent to the initial object, is initialized to the initial object in the list as shown in block D of FIG. 4A. The head object is advanced to the next object in the list, e.g., that object in the list which has the next larger size, as shown in block E. Decision diamond F as shown in FIG. 4A then asks whether the head object is at the end of the list. If it is not, the tail object, is set to the initial object in the list as shown in block G. Decision diamond H then asks whether the tail object is equal to the head object. If it is not, then decision diamond I in FIG. 4A asks whether the value of the object status variable of the tail object is RETAIN. If it is, then the SET STATUS module, as described below with respect to FIGS. 6A and 6B, is called to compare the head and tail object for containedness as shown in block J, and the tail object is advanced as shown in block K of FIG. 4A. The module FILTER OBJECTS returns to decision diamond H, and the loop through H, I, J and K continues until the tail object is equal to the head object.

Figure 4B:
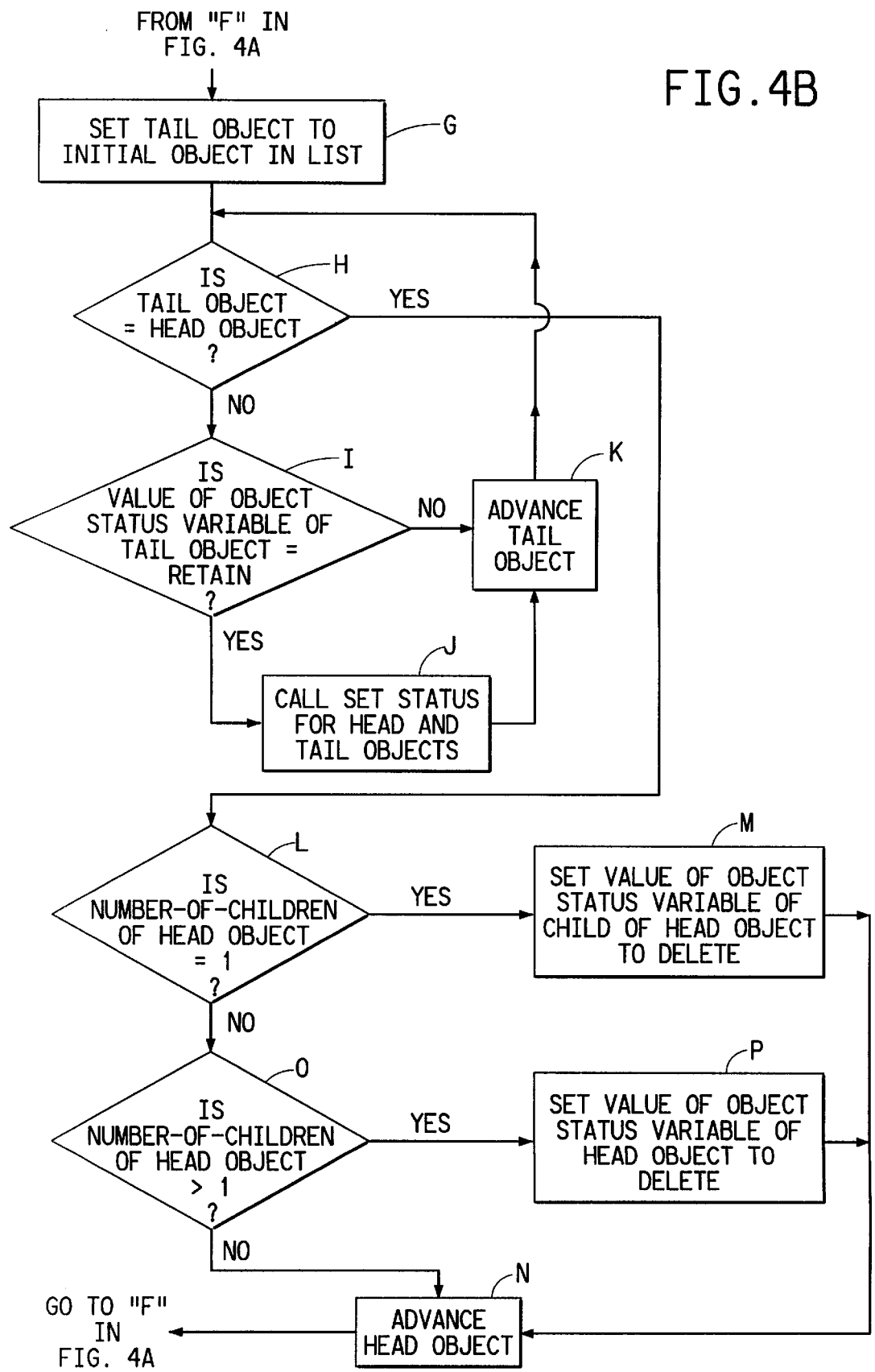
Figure 4C:
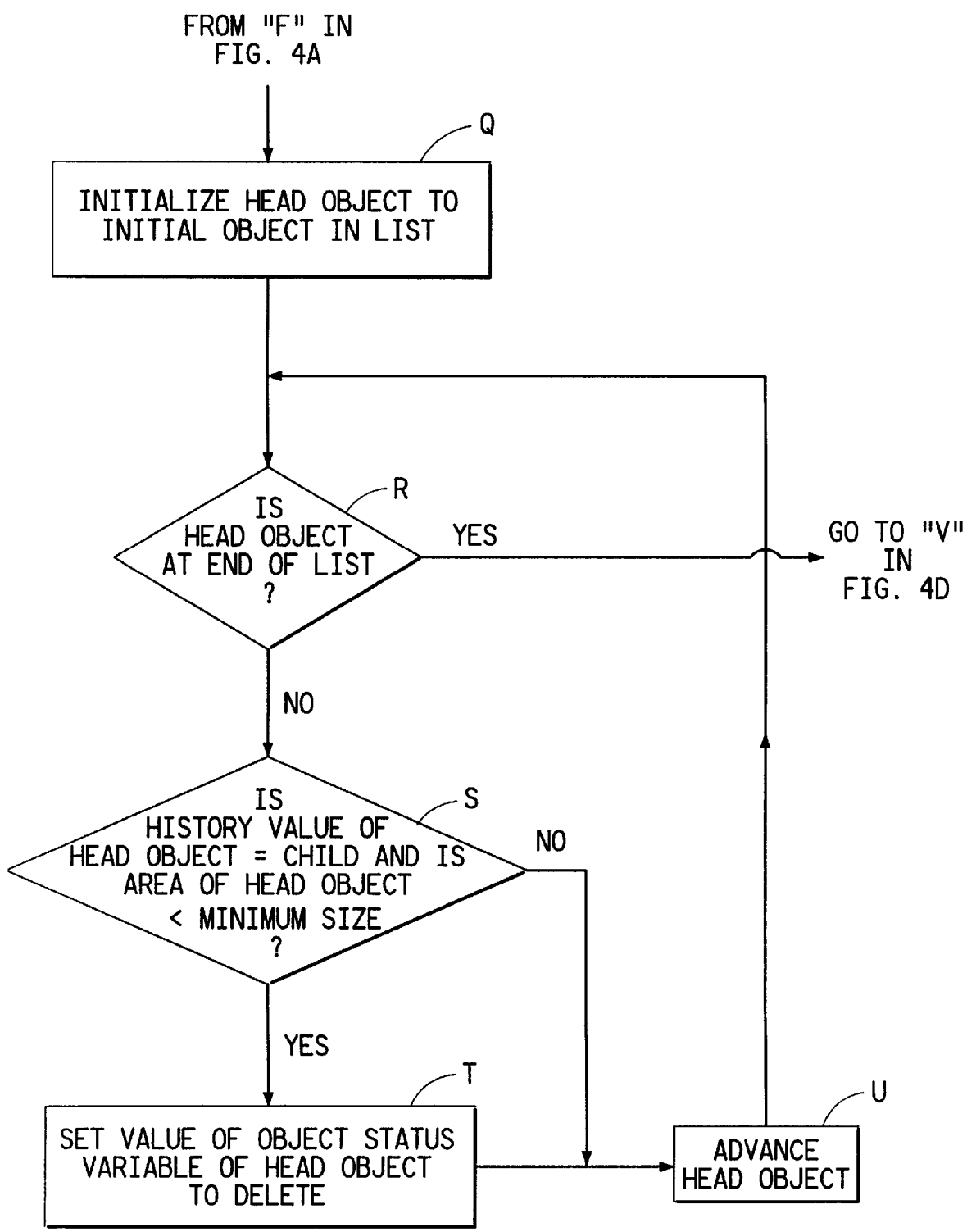

In FIG. 4B, L, M, N, O and P perform the selection rules as described above. Specifically, when the tail object is equal to the head object, decision diamond L of FIG. 4B asks whether the number of smaller objects contained within the larger object, or the number of children, of the head object is equal to one. If it is, then the value of the object status variable of the smaller object contained within the head object is set to the second value, or DELETE, as shown in block M, and the head object is advanced as shown in block N of FIG. 4A.

The module FILTER OBJECTS returns to decision diamond F in FIG. 4A, and the loop through F–L continues until the status value of the head object is not equal to one. Then decision diamond O of FIG. 4B asks whether the number of children of the head object is greater than one. If it is, then the value of the object status variable of the head object is set to DELETE as shown in block P, and the head object is advanced as shown in block N of FIG. 4B. The module FILTER OBJECTS returns to decision diamond F, and the loop through F–O continues until the status value of the head object is not greater than one. The head object is advanced once again as shown in block N of FIG. 4B.

The module FILTER OBJECTS returns to decision diamond F of FIG. 4A, which asks whether the head object is at the end of the list. If it is, then the head object is initialized to the initial object in the list as shown in block Q of FIG. 4C. Then, decision diamond R asks whether the head object is at the end of the list. If it is not, then decision diamond S asks whether the history value of the head object is equal to "CHILD" and whether the area of the head object is less than a predetermined minimum size. The history value of an object denotes whether that object was ever found to be a child of any other object, and therefore describes the object's history. If the answer to both of the questions in decision diamond S is yes, then the value of the object status variable of the head object is set to DELETE as shown in block T, and the head object is advanced as shown in block U of FIG. 4C. The module FILTER OBJECTS then returns to decision diamond R of FIG. 4C, and the loop through R–U continues until the head object is at the end of the list.

Figure 4D:
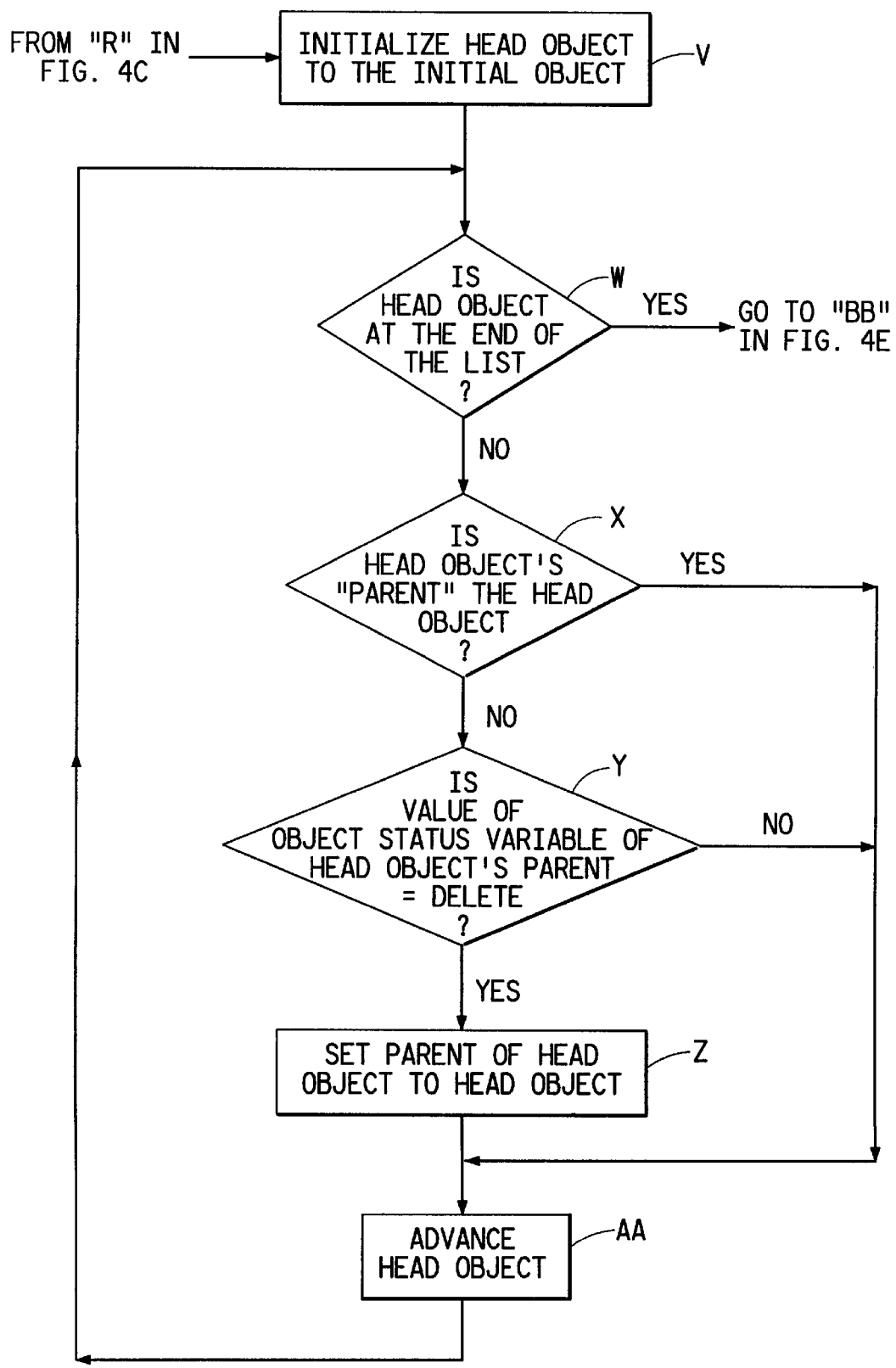

When the head object is at the end of the list, the module FILTER OBJECTS goes to block V of FIG. 4D, and the head object is initialized to point to the initial object, as shown in block V of FIG. 4D. Decision diamond W of FIG. 4D then asks whether the head object is at the end of the list. If it is not, then decision diamond X asks whether the parent of the head object (i.e., the larger object in which the head object is contained) is the head object. If it is not, decision diamond Y asks whether the value of the object status variable of the head object's parent is DELETE. If the answer to decision diamond X is yes, the head object is advanced and the loop through W–Z continues until the head object is the last object in the list. If the answer to decision diamond Y is yes, then the parent of the head object is set to the head object as shown in block Z, and the head object is advanced as shown in block AA of FIG. 4D. The module FILTER OBJECTS returns to decision diamond W, and the loop through W–Z continues until the head object is at the last object in the list.

Figure 4E:
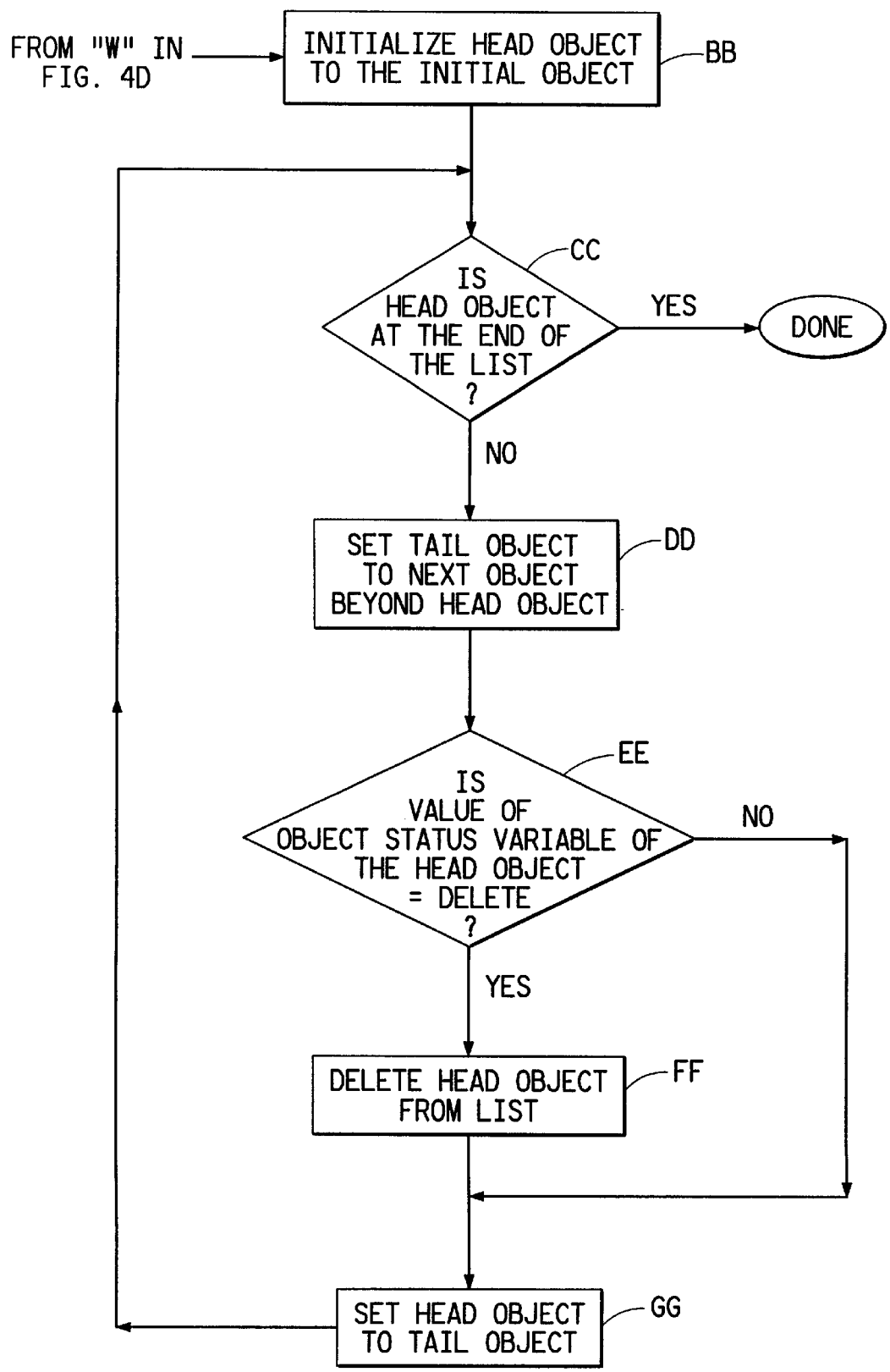

When the head object is at the last object, the head object is initialized to the initial object in the list as shown in block BB of FIG. 4E. Decision diamond CC then asks whether the head object is at the end of the list. If it is not, then the tail object is set to the next object beyond the head object as shown in block DD. Decision diamond EE then asks whether the value of the object status variable of the head object is DELETE. If it is, the head object is then deleted as shown in block FF, and the head object is set to the tail object as shown in block GG in FIG. 4E. Returning to decision diamond EE, if the value of the object status variable of the head object equal to DELETE, then the non-redundant objects are retained, and the head object is set to the tail object, as shown in block GG. The module FILTER OBJECTS then returns to decision diamond CC, and the loop through CC, DD, EE, FF and GG continues until the head object is at the end of the list. If the answer to decision diamond X is yes, the head object is advanced, and the loop through W–Z continues until the head object is the last object in the list. When it is, the module FILTER OBJECTS is done, as shown in oval II of FIG. 4F.

Figure 5:
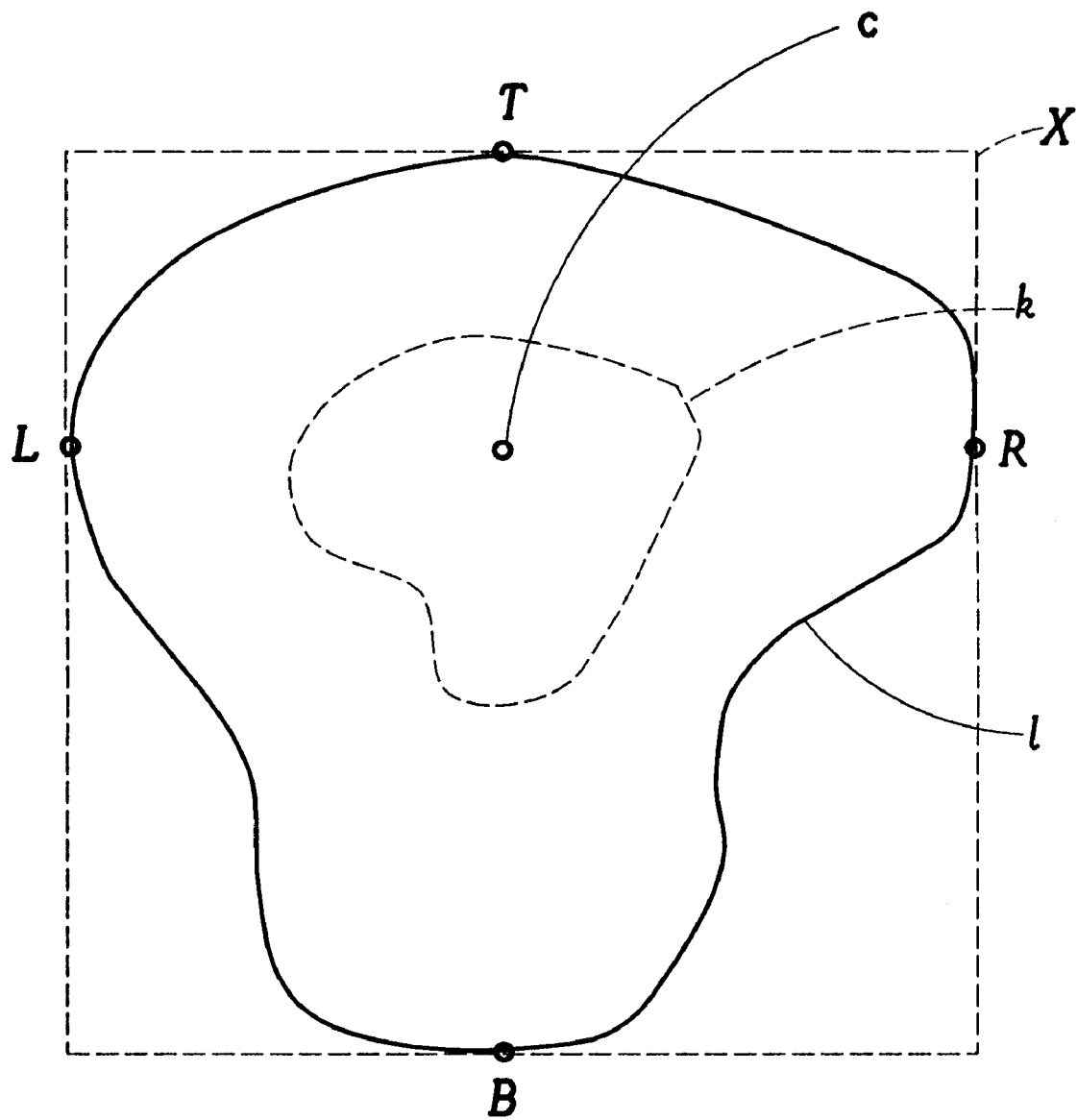
FIG. 5 is a schematic diagram of an object, illustrating the first step of the containedness check, or the "box test", as used with the first, second and third embodiments of the present invention.

As noted above, the module SET STATUS performs three tests: the box test, CHECK CONTAIN and CHECK SIMILARITY. The box test is the first step of a containedness check, which is performed to determine whether the smaller object is contained within the larger object. FIG. 5 is a schematic diagram illustrating the box test. In FIG. 5, an object, l, and an object, k, have been identified, where object l is larger than object k. According to the method of the first embodiment, the step of determining whether each smaller object is contained within each larger object includes the sub-step of determining the four extremum points of the larger object. As illustrated in FIG. 5, four extremum points L, T, R and B for object l are determined. Each extremum point has a row-position coordinate value and a column-position coordinate value. The four extremum points are determined by a module, TRACE OBJECT, as will be described below with respect to FIGS. 27A–27B. Each extremum point has a row-position coordinate value and a column-position coordinate value, which are described below with respect to FIGS. 6–9. The row-position coordinate value and the column-position coordinate value of each of the four extremum points are obtained using the module TRACE OBJECT. The determining step further includes the sub-steps of constructing a rectangle bounding the larger object by using the row-position coordinate value and the column-position coordinate value of the four extremum points. By performing the box test, a rectangle X as shown in FIG. 5 is constructed using the row-position coordinate value and the column-position coordinate value of the four extremum points, L, T, R and B for object l. The determining step further includes the sub-steps of determining a predetermined point on the smaller object. This point is shown as point c in FIG. 5. The predetermined point has a row-position coordinate value and a column-position coordinate value, which are obtained using the module TRACE OBJECT. The determining step further includes the sub-steps of determining the position of the predetermined point of the smaller object with respect to the rectangle bounding the larger object. In a preferred implementation of the first embodiment, the predetermined point is the center of mass. However, the predetermined point may be any point on the smaller object.

Figure 6:
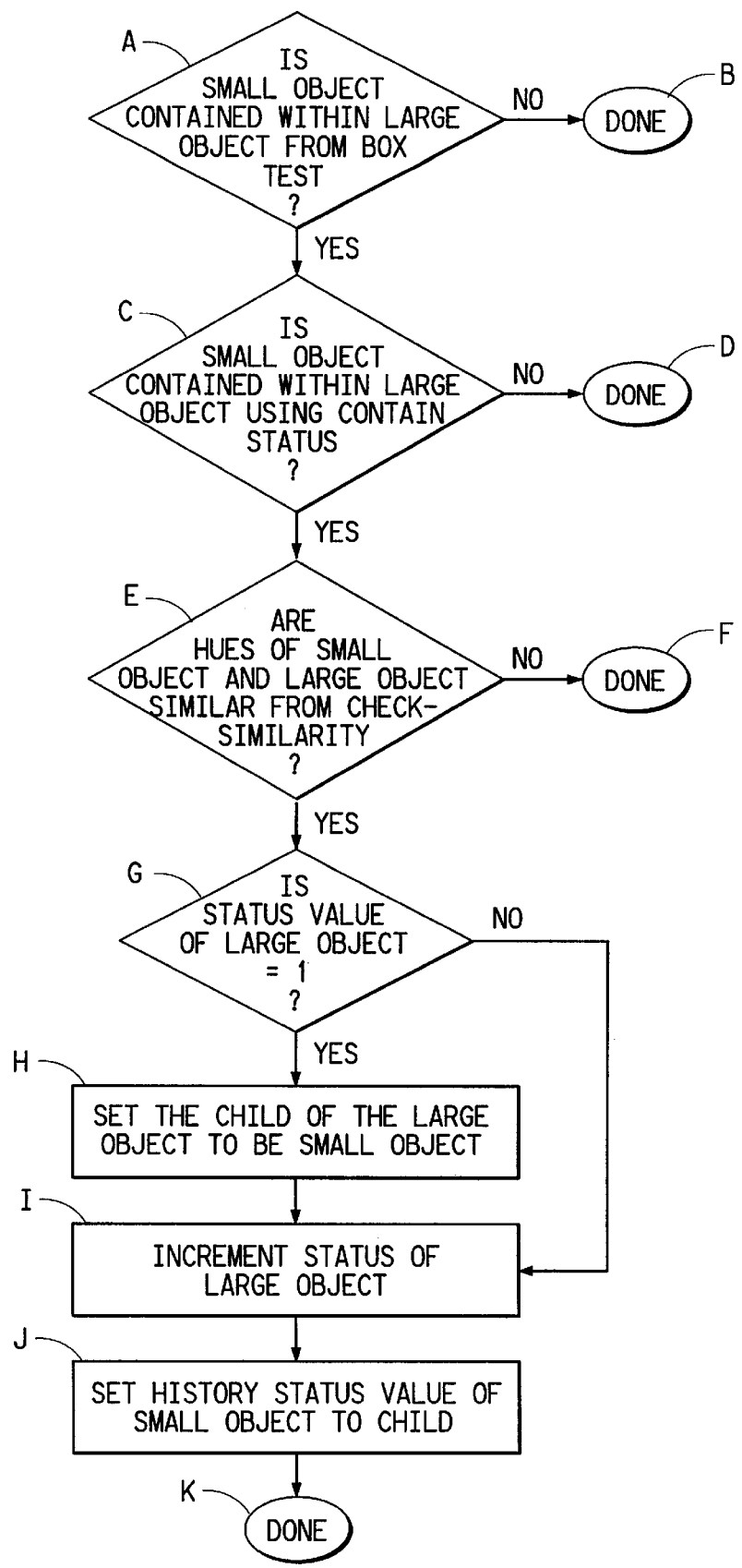
FIG. 6 is a flow chart showing the steps of a module SET STATUS, which is called by FILTER OBJECTS, and which compares a relatively smaller and larger object.

In order to perform the first step of the box test, the module FILTER OBJECTS calls the module SET STATUS, as described below with respect to FIG. 6. SET STATUS uses information about the perimeter points on an object derived from the module TRACE OBJECT. The module SET STATUS performs the box text as described above with respect to FIG. 5. FIG. 6 is a flow chart showing the steps of the module SET STATUS. As shown in decision diamond A of FIG. 6, the first step of SET STATUS is to ask whether the smaller object is contained within the larger object from the box test. If it is not, then the module SET STATUS is done as shown in oval B. If the smaller object is contained within the larger object as determined by the box test, then decision diamond C asks again whether the smaller object is contained within the larger object, which determination is made using the module CONTAIN STATUS, which is described in FIGS. 17A and 17B below. If it is not, then the module SET STATUS is done as shown in oval D. If the smaller object is contained within the larger object, which determination is made using the module CONTAIN STATUS, then decision diamond E asks whether the hues of the smaller object and the larger object are similar. This determination is made using the module CHECK SIMILARITY as described below in FIG. 19. If the hues of the smaller object and the larger object are not similar, then the module SET STATUS is done, as shown in oval F.

If the hues of the smaller object and the larger object are similar, then decision diamond G of FIG. 6 asks whether the number of children of the larger object is equal to one. If it is, then the child of the larger object (i.e., the smaller object contained within the larger object) is set to be the smaller object as shown in block H as shown in FIG. 6, and the number of children is incremented as shown in block I. Alternatively, if the number of children of the larger object is not equal to one, then the number of children of the larger object is incremented as shown in block I. In either case, after the number of children is incremented, the HISTORY status value of the smaller object is set to CHILD as shown in block J of FIG. 6. The module SET STATUS is then done as shown in oval K.

According to the first step of the containedness check, the predetermined point is contained within the rectangle bounding the larger object if both of the following conditions are met. First, the row-position coordinate value of the predetermined point of the smaller object lies between the minimum and the maximum values for the row-position coordinate values of the rectangle bounding the larger object. Second, the column-position coordinate value of the predetermined point of the smaller object lies between the minimum and maximum values for the column-position coordinate values of the rectangle bounding the larger object. In a preferred embodiment, the predetermined point is the center of mass. However, the predetermined point may be any point on the smaller object.

Figure 11:
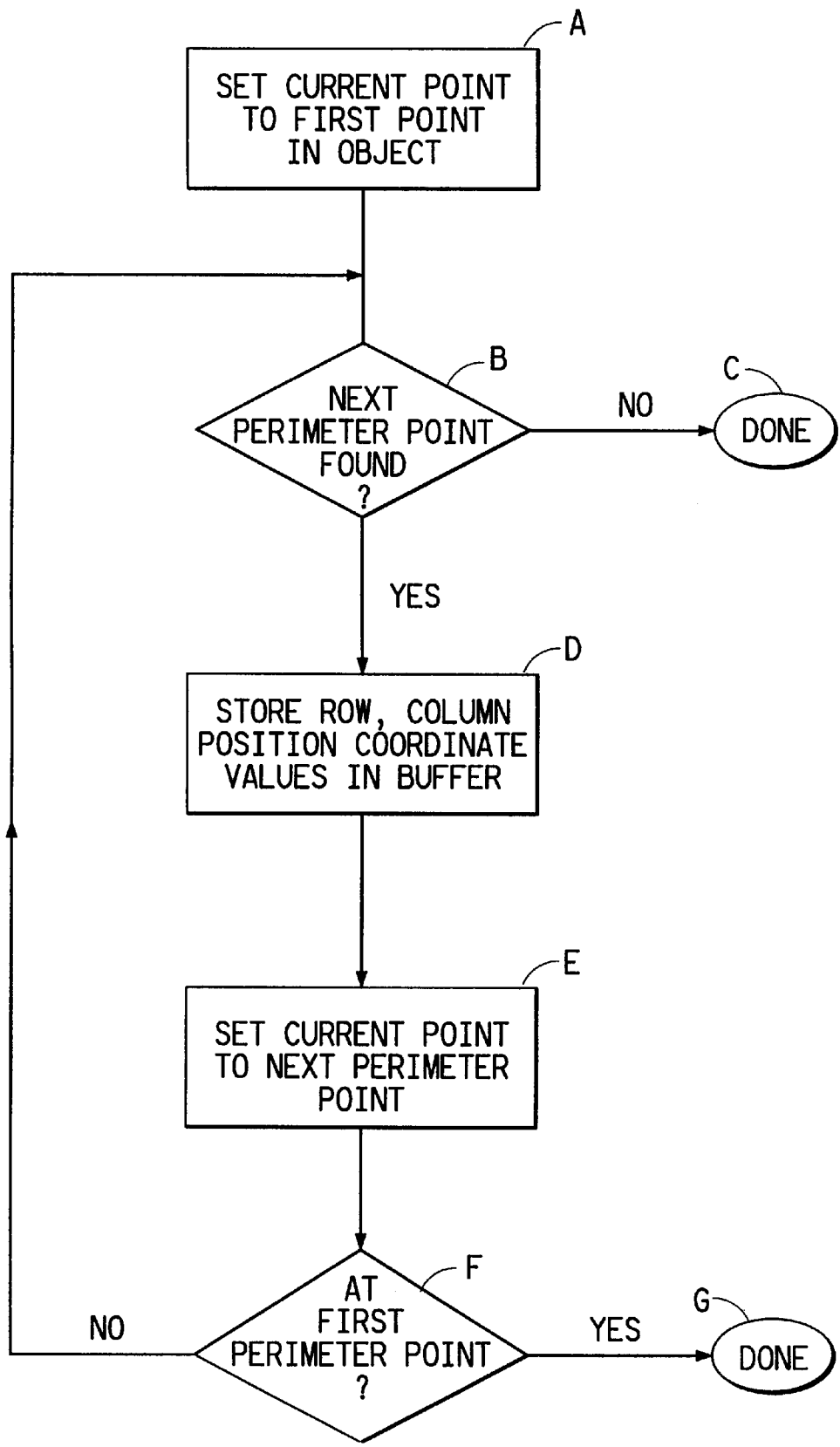
FIG. 11 is a flow chart showing the steps of the module GET PERIM, for determining the coordinates of each perimeter point of an object.
Figure 12:
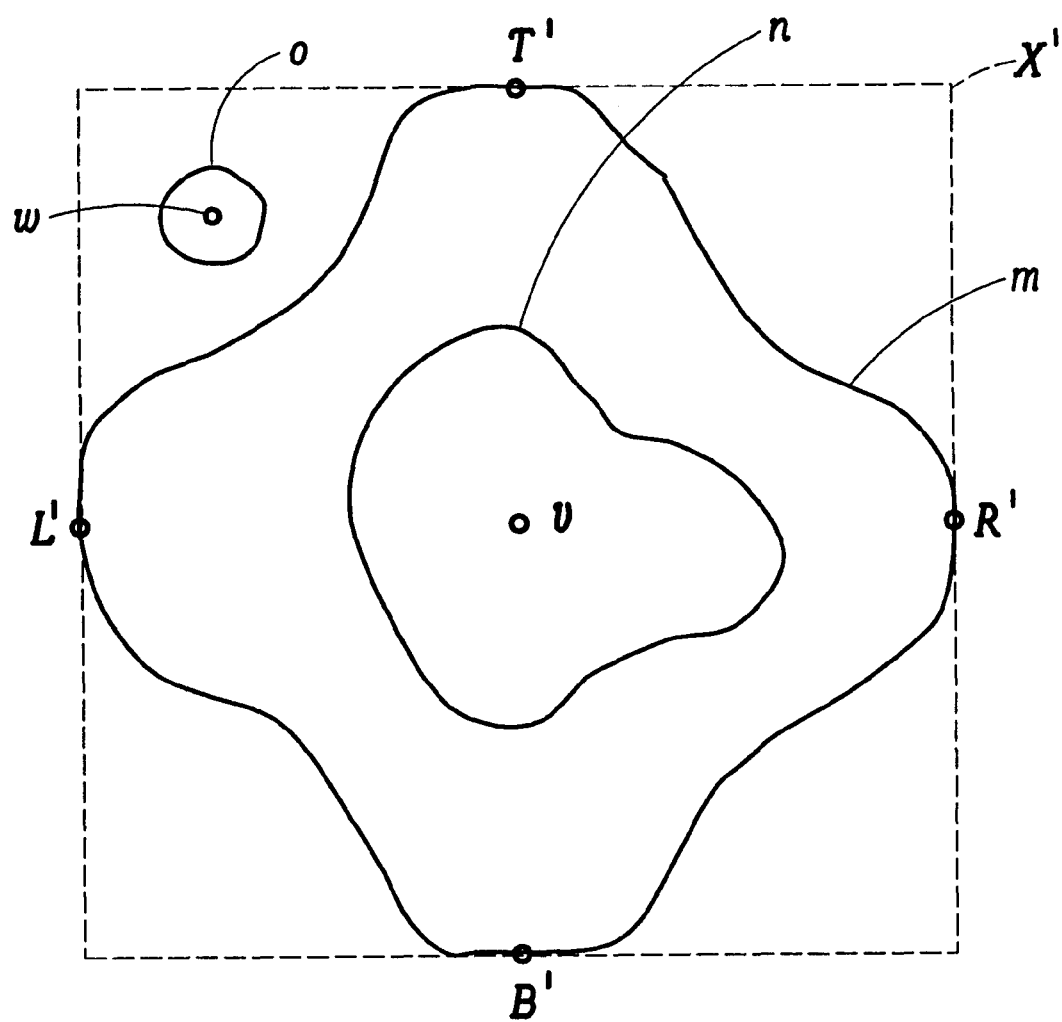
FIG. 12 is a schematic diagram of an object, illustrating the second step of the containedness check of the first embodiment.

FIG. 12 illustrates the second step of the containedness check of the first embodiment, which is performed by the module CHECK CONTAIN as will be described below with respect to FIG. 16. According to the second step of the containedness check, the step of determining whether each respective smaller object has a characteristic value contained within a predetermined range of the characteristic value of the larger object further includes the following sub-steps. The perimeter points of the larger object are determined. This is done for the first embodiment using the module GET PERIM as described with respect to FIG. 11. In order to obtain information about the perimeter points of an object, the object is first traced sequentially in either the clockwise or the counterclockwise direction. The module GET PERIM is used to determine the row-position coordinate value and the column-position coordinate value of each perimeter point. The basic principles of the GET PERIM module are similar to those described in "Digital Image Processing" by Rafael C. Gonzalez and Paul Wintz, Second Ed., Addison-Wesley Publishing Company, Reading, Mass. (1987).

Figures 7, 8:
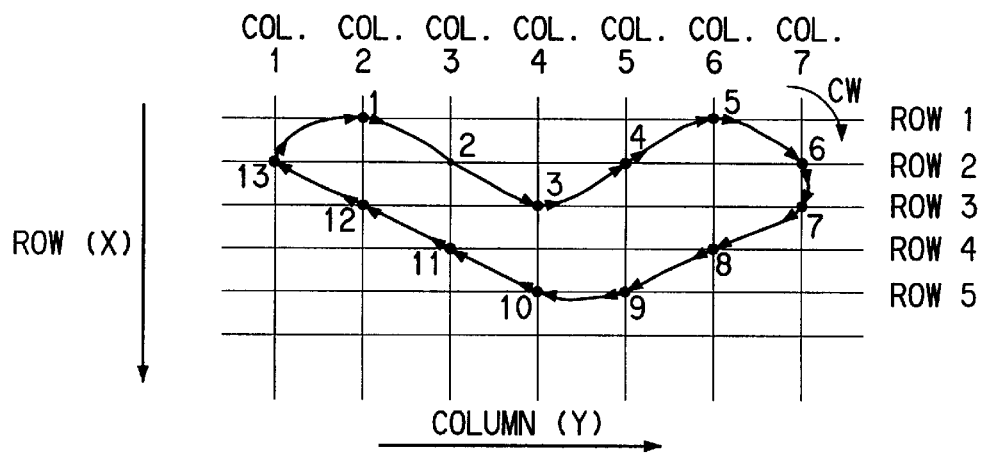
FIG. 7 is a schematic diagram, with row and columns designated, which represent the row and column-position coordinate values, of a simple object traced in a clockwise direction.
FIG. 8 is a chart showing the row-position coordinate value, the column-position coordinate value and the direction code values for the thirteen points illustrated in FIG. 7.

FIG. 7 shows a schematic for a simple object traced in a clockwise direction. For purposes of illustration, thirteen perimeter points are shown. Each perimeter point has a row-position coordinate value, a column-position coordinate value and a direction code vector. It should be noted that in this context, row and column do not have to be horizontal rows and vertical columns. Rather, any line segment through the object can be translated into a row or column by specifying the proper coordinate axes. The direction code vector comprises a first and a second direction code value for each perimeter point. The first direction code value describes the relationship of each respective perimeter point to the next perimeter point as determined by the GET PERIM module, and the second direction code value describes the relationship of each respective perimeter point to the previous perimeter point, as determined by the GET PERIM module. The definition of "next or previous point", as discussed below, depends on the direction in which the object is traced. The i'th member of the perimeter buffer is denoted by the direction code descriptor ($x_i, y_i, vector_i$), where $x_i$ is the row position coordinate value, $y_i$ is the column-position coordinate value and $vector_i$ is the direction code vector which contains the following information:

(i) $next_i$ is the direction code value to the next perimeter point; and (ii) $prev_i$ is the direction code value from the previous point to the current point.

FIG. 8 is a chart showing the row-position coordinate value, the column-position coordinate value, and the first and second direction code values for the thirteen points illustrated in FIG. 7. For example, point 13 is denoted as having a row-position coordinate value of 2, a column-position coordinate value of 1, a first direction code value of 1 and a second direction code value of 7.

Figure 9:
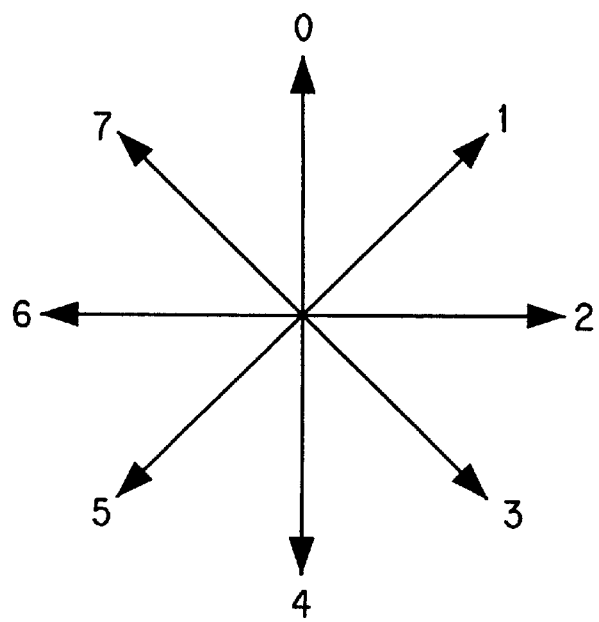
FIG. 9 is a schematic view illustrating the direction code values for an object which is traced in the clockwise direction.
Figure 10:
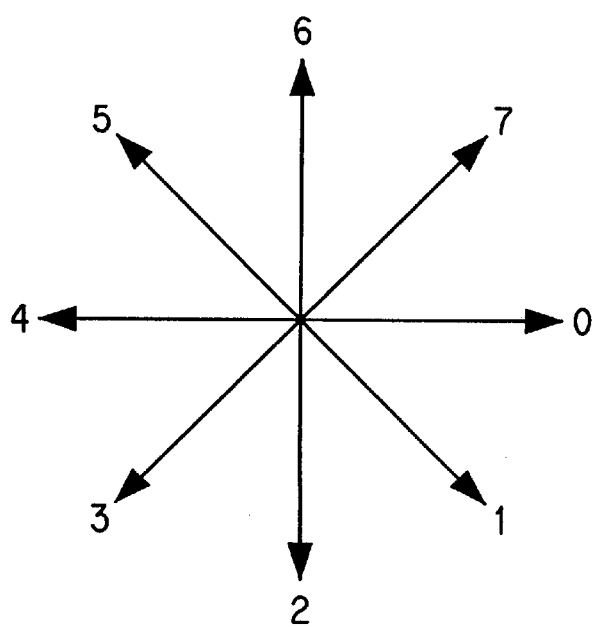
FIG. 10 is a schematic view illustrating the direction code values for an object which is traced in the counterclockwise direction.

In the present invention, the direction code values can range from 0–7, depending on the direction of one perimeter point to an adjacent perimeter point (either the next perimeter point or the previous perimeter point). The direction code values for the present invention are shown in FIGS. 9 and 10. FIG. 10 direction code values are derived by rotating the values illustrated in FIG. 9 by 90°. The application of the set of direction code values as illustrated in FIG. 9 as opposed to the direction code values as illustrated in FIG. 10 is also dependent upon the method of sorting the perimeter buffer to be discussed below. As can be seen from FIG. 9, if $next_i$ is equal to zero, the next perimeter point would be vertically above the current perimeter point and in the same column. It is important to realize that the value of a direction code from one perimeter point to the next depends on the sense in which the object is traced by the module GET PERIM. If the object is traced in the clockwise direction, the direction codes associated with the perimeter points are different than if the object is traced in the counterclockwise direction.

The steps of the module GET PERIM are shown in FIG. 11. As illustrated in FIG. 11, block A sets the current point to the first point in the object. Decision diamond B then asks whether the next perimeter point has been found. If not, then the traced object is invalid, and the module is done as shown in block C. If the next perimeter point has been found, then the row and column-position coordinate values are stored in the perimeter buffer as illustrated in block D of FIG. 11. The current point is set to the next perimeter point as shown in block E of FIG. 11. Decision diamond F then asks whether the current point is at the first perimeter point. If not, then the loop through decision diamond B, blocks C–E and decision diamond F is repeated until the current point is at the first perimeter point. If the answer to decision diamond F is yes, the module GET PERIM is done.

After running the module GET PERIM, a perimeter buffer is then created. This is done by a module, LOAD BUFFER, as will be described with respect to FIGS. 13A and 13B. The perimeter buffer comprises the perimeter points of the larger object. Each perimeter point has a row-position coordinate value, a column-position coordinate value and a direction code vector. The direction code vector comprises a first and a second direction code value for each perimeter point. The first direction code value describes the relationship of each respective perimeter point to the next perimeter point, and the second direction code value describes the relationship of each respective perimeter point to the previous perimeter point. The perimeter points in the perimeter buffer are then sorted in a predetermined order to create a row-column sorted perimeter buffer. A perimeter point status variable is then assigned to each perimeter point in the buffer. This step is done by a module, CONTAIN STATUS, as will be described below with respect to FIGS. 17A and 17B. The perimeter point status variable has one of a first and a second value. The value of the perimeter point status variable is determined by the first and second direction code values. The smaller object is designated as being contained within the larger object if the column-position coordinate value of a predetermined point of the smaller object lies between the values of the column-position coordinate value of a perimeter point having the first value of the perimeter point status variable, and the column-position coordinate value of the next perimeter point in the sorted perimeter buffer, where the perimeter points have the same row-position coordinate value as the predetermined point of the smaller object. In a preferred implementation of the first embodiment, the predetermined point is the center of mass. However, the predetermined point may be any point on the smaller object.

Relating these sub-steps to FIG. 12, objects m, n and o are identified. A predetermined point, v, in object n and a predetermined point w in object o are both determined to be within the bounds of rectangle X'. Upon applying the second step of the containedness check, predetermined point v of object n is determined to have a column-position coordinate value which lies between the column-position coordinate values of two perimeter points of object m, both perimeter points having the same row-position coordinate value as point v. Object n is determined to be contained within object m. Object n is a single, smaller object contained within object m and may be subsequently deleted—i.e., not retained, if certain criteria are met. Upon applying the second step of the containedness check, point w of object o fails to have a column-position coordinate value which lies between the column-position coordinate values of two perimeter points of object m having the same row-position coordinate value as point w. Object o is therefore determined not to be contained within object m. Object o is neither a parent nor a child of object m and is therefore retained.

It is to be noted that the second step of the containedness check can be applied to all identified objects without first applying the first step (i.e., the box test). However, by sequentially applying the first and second step, the first step serves as an initial screen for the containedness check. The second step is then applied only if an object is found to be located within the rectangular box. This sequential use of the first and second steps is less computationally intensive, allowing redundancy determination to be conducted at a faster rate.

Figure 13A:
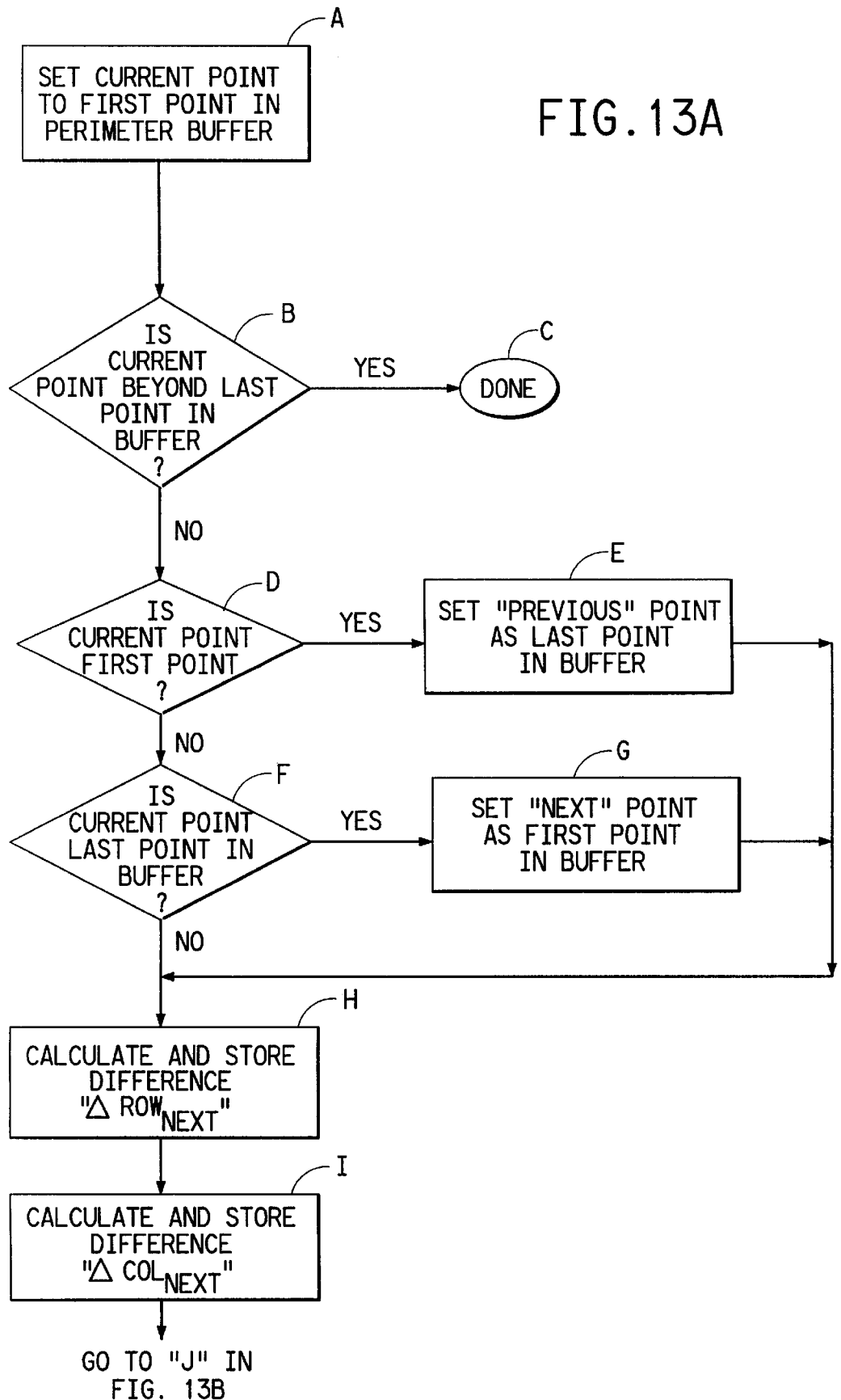
FIGS. 13A–13B are a flow chart showing the steps of the module, LOAD BUFFER, which creates a perimeter buffer comprising the perimeter points of an object.
Figure 13B:
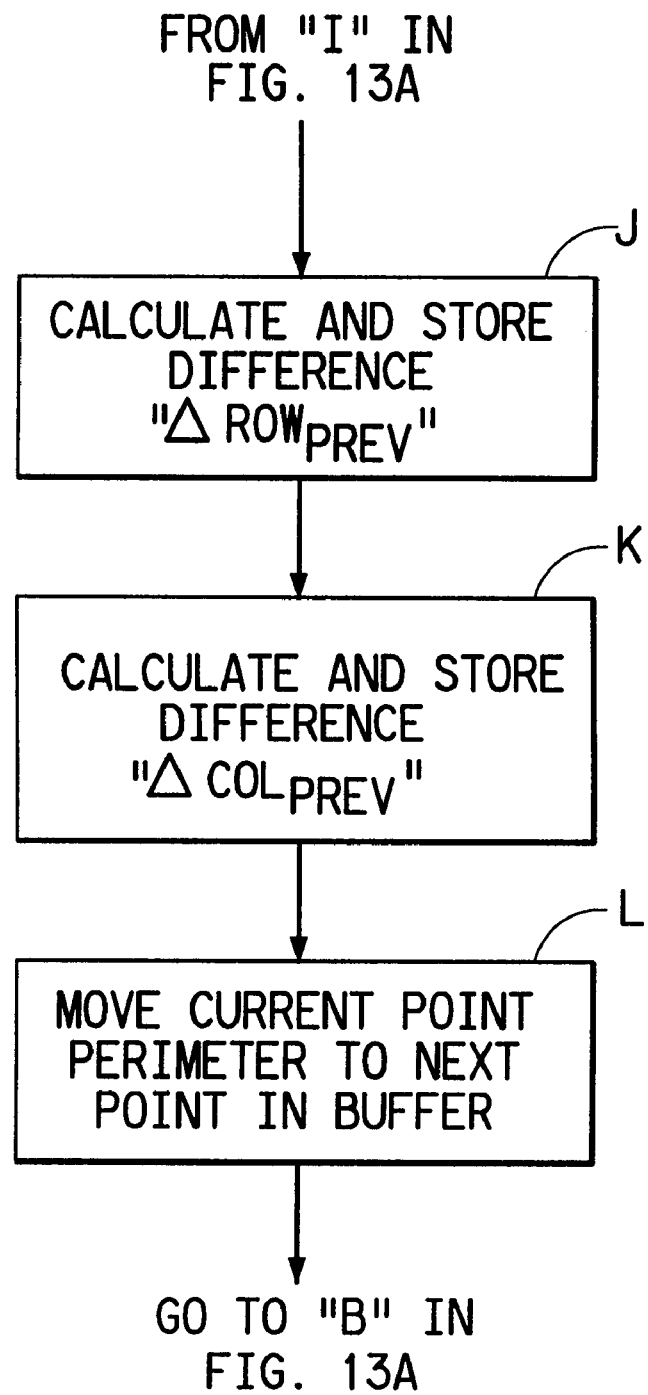

The steps of the module LOAD BUFFER, which creates a perimeter buffer, are illustrated in FIGS. 13A and 13B. In the first step as shown in block A, the current point is set to the first point in the perimeter buffer. Decision diamond B then asks whether the current point is beyond the last point in the buffer. If it is, then the LOAD BUFFER module is done as illustrated in oval C of FIG. 13A. If the current point is not beyond the last point in the buffer, then decision diamond D asks if the current point is the first point in the buffer. If it is, then block E sets the previous point as the last point in the buffer. If the current point is not the first point in the buffer, then decision diamond F asks if the current point is the last point in the buffer. If it is, then block G sets the next point as the first point in the buffer. After the previous point is set as the last point in the perimeter buffer, if the current point is the first point in the perimeter buffer, or the next point is set as the first point in the perimeter buffer, if the current point is the last point in the perimeter buffer, the difference in the row coordinate value between the next point and the current point is calculated and stored in the buffer as shown in block H in FIG. 13A. This difference is designated as $\Delta ROW_{NEXT}$. The difference in the column-position coordinate value between the next point and the current point is then calculated and stored in the buffer as shown in block I in FIG. 13A. This difference is designated as $\Delta COL_{NEXT}$. The difference in the row-position coordinate value between the current point and the previous point is then calculated and stored in the buffer as shown in block J in FIG. 13B. This difference is designated as $\Delta ROW_{PREV}$. Next, the difference in the column-position coordinate value between the current point and the previous point is calculated and stored in the buffer as shown in block K. This difference is designated as $\Delta COL_{PREV}$. The current point is then moved to the next perimeter point in the buffer as shown in block L, and the module returns to decision diamond B of FIG. 13A. The loop through B and D–L continues until the current point is beyond the last point in the buffer, at which point the LOAD BUFFER module is done as shown in oval C.

The perimeter points are then sorted first by row and then by column to create a row-column perimeter buffer. This sorting step is performed for tracing the object in either the clockwise or the counterclockwise direction. This sorting step is performed by the standard "Shell Sort" technique described by Robert Sedgewick in his textbook *Algorithms in C*, Addison Wesley, 1990. It should be noted that the "vector$_i$" information associated with each perimeter point moves with the point during the sort. It should be noted that a row and a column represent two orthogonal, independent coordinate values associated with each point in the image with respect to two reference axes which can be chosen arbitrarily. Thus, the perimeter points may alternatively be sorted first in the direction traditionally thought to be a row (a horizontal direction) and then in a direction orthogonal to this direction (a vertical direction) as explicitly explained below.

In one version of the first or fourth embodiment, the object is traced in the clockwise direction, and the perimeter points are sorted first by row to create a row-sorted perimeter buffer comprising at least one row-sorted perimeter point. The perimeter points are sorted in ascending order such that the points with the lowest row-position coordinate values are placed at the start (meaning the first element of the sequence of the buffer) of the buffer. Alternatively, the perimeter points are sorted in descending order such that the points with the highest row-position coordinate values are placed at the start of the buffer.

In this one version, the perimeter points in the row-sorted perimeter buffer are then sorted by column in order to create a row-column sorted perimeter buffer comprising at least one row-column sorted perimeter point. The step of sorting the perimeter points by column comprises sorting the perimeter points in ascending order. In the case where the buffer has been sorted by row in ascending order and subsequently by column, the point with the lowest column-position coordinate value and the lowest row-position coordinate value is placed at the start of the buffer. In the case where the buffer has been sorted by row in descending order and subsequently by column, the point with the lowest column-position coordinate value and the highest row-position coordinate value is placed at the start of the buffer.

In a second version of the first or fourth embodiment, the object is traced in the counterclockwise direction, and the perimeter points in the perimeter buffer are sorted by row to create a row-sorted perimeter buffer comprising at least one row-sorted perimeter point. The step of sorting the perimeter points by row comprises sorting the perimeter points in ascending order such that the points with the lowest row-position coordinate values are placed at the start of the buffer. Alternatively, the step of sorting the perimeter points by row comprises sorting the perimeter points in descending order such that the points with the highest row-position coordinate values are placed at the start of the buffer.

In this second version, the perimeter points in the row-sorted perimeter buffer are then sorted by column in order to create a row-column sorted perimeter buffer comprising at least one row-column sorted perimeter point. The step of sorting the row-sorted perimeter points by column comprises sorting the perimeter points in descending order. In the case where the buffer has been sorted first by row in ascending order and subsequently by column, the point with the highest column-position coordinate and lowest row-position coordinate is placed at the start of the buffer. In the case where the buffer has been sorted first by row in descending order and then by column, the point with the highest column-position coordinate and highest row-position coordinate is placed at the start of the buffer.

In a third version of the first or fourth embodiment, the object is traced in the clockwise direction, and the perimeter points in the perimeter buffer are sorted by column in order to create a column-sorted perimeter buffer comprising at least one column-sorted perimeter point. The step of sorting the perimeter points by column comprises sorting the perimeter points in ascending order such that the points with the lowest column-position coordinate values are placed at the start of the buffer. Alternatively, the step of sorting the perimeter points by column comprises sorting the perimeter points in descending order such that the points with the highest column-position coordinate values are placed at the start of the buffer.

In this third version, the perimeter points in the column-sorted buffer are then sorted by row in order to create a column-row sorted perimeter buffer comprising at least one column-row sorted perimeter point. The step of sorting the perimeter points by row comprises sorting the column-sorted perimeter points in descending order. In the case where the buffer has been sorted by column in ascending order and subsequently by row in descending order, the point with the highest row-position coordinate and lowest column-position coordinate is placed at the start of the buffer. In the case where the buffer has been sorted by column in descending order and then by row in descending order, the point with the highest row coordinate value and highest column coordinate value is placed at the start of the buffer.

In a fourth version of the first or fourth embodiment, the object is traced in the counterclockwise direction, and the perimeter points in the perimeter buffer are sorted by column to create a column-sorted perimeter buffer comprising at least one column-sorted perimeter point. The step of sorting the perimeter points by column comprises sorting the perimeter points in ascending order such that the points with the lowest column-position coordinate values are placed at the start of the buffer. Alternatively, the step of sorting the perimeter points by column comprises sorting the perimeter points in descending order such that the points with the highest column-position coordinate values are placed at the start of the buffer.

In this fourth version of the first embodiment, the perimeter points in a column-sorted perimeter buffer are then sorted by row to create a column-row sorted perimeter buffer comprising at least one column-row sorted perimeter point. The step of sorting the perimeter points by row in the column-sorted buffer comprises sorting the perimeter points in ascending order. In the case where the buffer has been sorted first by column in ascending order and subsequently by row in ascending order, the point with the lowest row-position coordinate value and lowest column-position coordinate value is placed at the start of the buffer. In the case where the buffer has been sorted first by column in descending order and subsequently by row in ascending order, the point with the lowest row-position coordinate value and highest-column-position coordinate value is placed at the start of the buffer.

A perimeter point status variable having one of a first and a second value is then assigned to each perimeter point. This step is performed in a module, CONTAIN STATUS, the flow chart for which is described below with respect to FIGS. 17A and 17B. The first value of the perimeter point status variable is "FILL", and the second value of the perimeter point status variable is "NO FILL". The value of the status variable is determined by the first and second direction code values $next_i$ and $prev_i$. Direction code values are determined in accordance with FIGS. 9 and 10, depending on the version of sorting the perimeter buffer which is employed. If the points in the perimeter buffer are sorted first by row and then by column, such as in the first version of the first embodiment, the direction code values in FIG. 9 are employed. If the points in the perimeter buffer are sorted first by column and then by row, such as in the second version of the first embodiment, then the direction code values illustrated in FIG. 10 are used. The rules for mapping $next_i$ and $prev_i$ to FILL or NO FILL are summarized for objects traced in a clockwise direction in a FILL look-up table (LUT) as shown in FIG. 14. The rules for mapping $next_i$ and $prev_i$ to FILL or NO FILL are summarized for objects traced in a counterclockwise direction in a FILL look-up table (LUT) as shown in FIG. 15. In the look-up tables of FIGS. 14 and 15, F stands for FILL and NF stands for NO FILL. The look-up tables of FIGS. 14 and 15 are empirically derived, based on the local concavity or convexity of the object.

Figure 16:
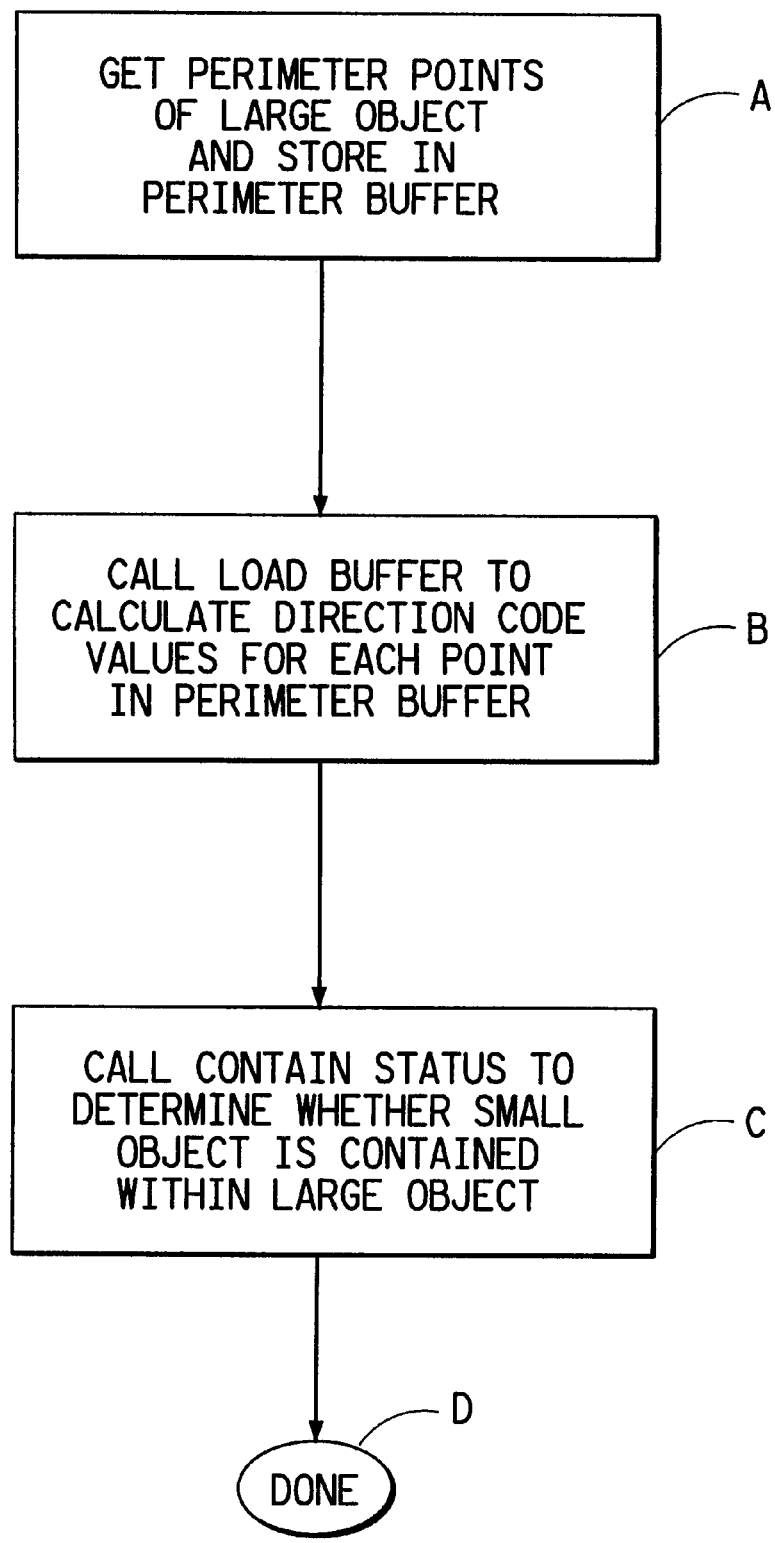
FIG. 16 is a flow chart showing the steps of the module CHECK CONTAIN, which is called by SET STATUS and which performs a check of whether a relatively smaller object is contained in a larger object for the first embodiment.

The steps of the module CHECK CONTAIN are illustrated in the flow chart of FIG. 16. The module CHECK CONTAIN performs a definitive test for containedness. The module CHECK CONTAIN calls the module GET PERIM as shown in FIG. 11, which determines the coordinates of the perimeter points of the larger object, and stores them in the perimeter buffer as shown in block A of FIG. 16. The module, LOAD BUFFER, as shown specifically in FIGS. 13A and 13B as described above, expands the perimeter buffer by including the direction code vectors from each perimeter point to the previous and next perimeter point in the perimeter buffer. This is really the second step of the SET STATUS module as described above with respect to FIG. 6.

Figure 17B:
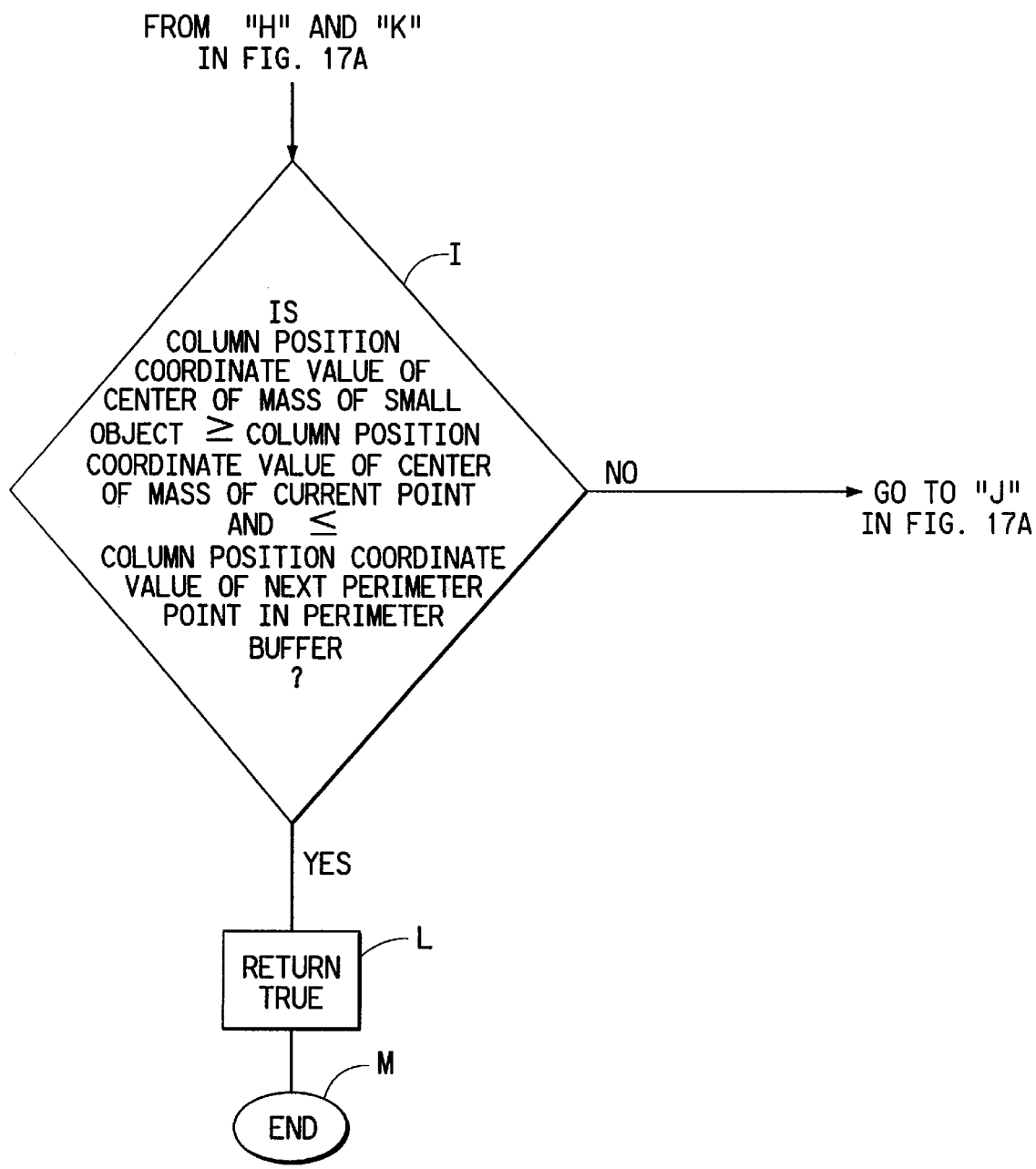

As described above with respect to FIG. 16, the module CHECK CONTAIN calls a module CONTAIN STATUS to determine whether the smaller object is contained within the larger object. The steps of the module CONTAIN STATUS are shown in FIGS. 17A and 17B. As shown in block AA of FIG. 17A, the first step of CONTAIN STATUS is to sort the perimeter buffer by row and column. Then, as shown in block A of FIG. 17A, the current point is set to the first point of the perimeter buffer of the larger object. Decision diamond B then asks whether the current point is beyond the last point of the perimeter buffer. If so, FALSE is returned as shown in block C, signifying that the smaller object is not contained within the larger object, the module is done as shown in oval D. If the current point is not beyond the last point, then decision diamond E asks whether the row-position coordinate value of the current point is equal to the row-position coordinate value of the center of mass of the smaller object. If the answer to decision diamond E is yes, then decision diamond F asks whether the current point is the same point as the next point in the perimeter buffer. If it is, then the current point is labeled as redundant as shown in block G. A redundant perimeter point is one which has been accessed or traversed more than once during the sequential tracing of the object. For example, this could occur at cross-over points, which is a point which has been crossed over more than once during the tracing step. When this redundant point checking is performed, the step of designating all points lying between each redundant perimeter point and the next perimeter point on the same line segment as the interior points of the object occurs only when all instances of each redundant perimeter point are assigned the first value of the perimeter point status variable (FILL).

Then decision diamond H asks if the status variable of the current point and the next point are equal to FILL. If the answer is yes, then CONTAIN STATUS goes to decision diamond I in FIG. 17B. Decision diamond I in FIG. 17B asks whether the column-position coordinate value of the center of mass of the smaller object is greater than or equal to the column-position coordinate value of the center of mass of the current point and is less than or equal to the column-position coordinate value of the next perimeter point in the perimeter buffer. If the answer to either or both of these questions is no, then the current point is set to the next point in the perimeter buffer as shown in block J in FIG. 17A, and the loop through B, E, F, G, H, I and J continues until the current point is beyond the last point. Then FALSE is returned as shown in block C, and the module CONTAIN STATUS is done as shown at oval D.

Returning to decision diamond E, if the row-position coordinate value of the current point is not equal to the row-position coordinate value of the center of mass of the smaller object, then the module CONTAIN STATUS moves to block J, and the loop through B, E, and J continues until the current point is beyond the last point. Then FALSE is returned, and the module CONTAIN STATUS is done as shown at oval D.

Returning to decision diamond F, if the current point is not the same point as the next point in the perimeter buffer, then decision diamond K asks if the status value of the current point is equal to FILL. If it is, then the module CONTAIN STATUS continues on to decision diamond I. If the answer to decision diamond I is no, the loop through B, E, F, K, I and J continues until the current point is beyond the last point. At this time, FALSE is returned, and the module CONTAIN STATUS is done as shown at oval D.

Returning to decision diamond H, if the status value of the current point and the next point is not equal to FILL, then the module CONTAIN STATUS sets the current point to the next point in the perimeter buffer as shown in block J. The loop through B, E, F, G, H and J continues until the current point is beyond the last point. At this time, FALSE is returned, and the module CONTAIN STATUS is done as shown at oval D.

Returning to decision diamond K, if the status value of the current point is not equal to FILL, then the current point is set to the next point in the perimeter buffer as shown in block J, and the module returns to decision diamond B. The loop through B, E, F and K continues until the current point is beyond the last point, at which time FALSE is returned, and CONTAIN STATUS is done as shown at oval D.

Returning to decision diamond I, if the column-position coordinate value of the center of mass of the smaller object is greater than or equal to the column-position coordinate value of the current point and is less than or equal to the column-position coordinate value of the next perimeter point in the perimeter buffer, TRUE is returned as shown in block L. The module CONTAIN STATUS is done as shown in oval M.

Figure 18:
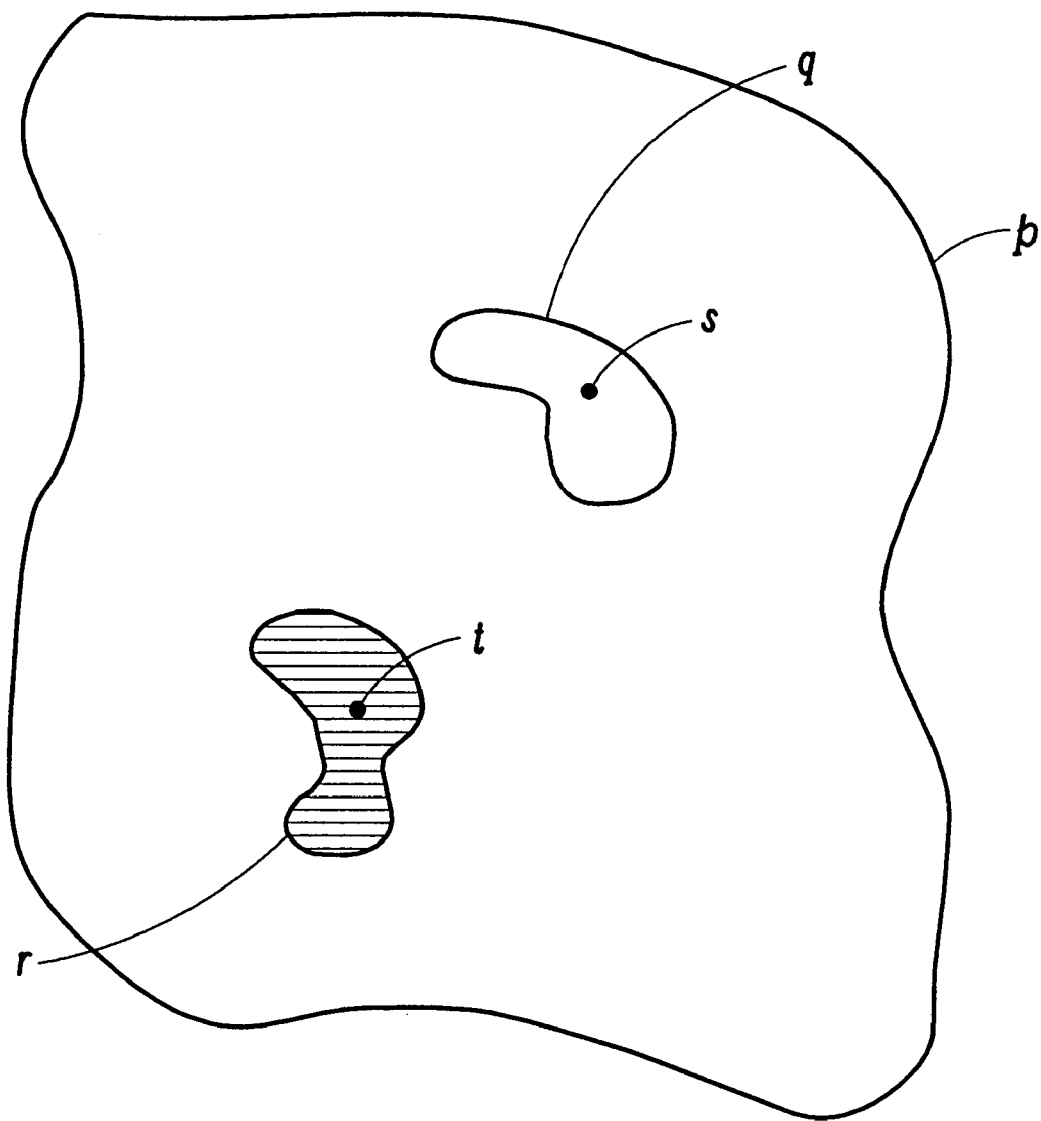
FIG. 18 is a schematic diagram of an object, illustrating the similarity check of the first and fourth embodiments of the present invention.

Another modification of the first and fourth embodiments of the present invention, termed the "piggyback method" for reasons discussed below, discriminates dissimilar colonies which spatially overlap. FIG. 18 is a schematic diagram illustrating the check for piggybacked objects, also referred to as the similarity check. FIG. 18 illustrates objects q, p and r. By using the containedness checks as described above with respect to FIGS. 5 and 12, both objects q and r are determined to be contained within object p. However, in the case of identifying objects using image analysis techniques, it is possible that although objects appear to be occupying the same spatial planar coordinates, they are actually distinct objects. An example of such an instance would be the case of living organisms where one organism completely dissimilar from a second organism grows upon a portion, or "piggybacks", on the second organism. Thus, a similarity check is conducted to determine whether there are distinct objects.

For illustration, a predetermined point s of object q as shown in FIG. 18 is determined to have a characteristic attribute, e.g., hue, that lies within a predetermined range of the hue value of the interior points of an object p. Object q is determined to be similar and redundant with object p. Object q is deleted. A predetermined point t of object r as shown in FIG. 18 is determined to have a characteristic hue value which lies outside the predetermined range of the hue value of the interior point of object p. Object r is determined to be distinct from object p. Both objects r and p are retained.

According to the piggyback method of the first embodiment, a characteristic attribute of at least one predetermined point of each second object which is redundant with the first object is determined. Thus, in one implementation of the first embodiment, a characteristic attribute of a predetermined point of each smaller object contained within a larger object is determined. The predetermined point may be the center of mass, although it need not necessarily be so. The characteristic attribute could be, for example, hue, or it could be any other textural or color parameter. The same characteristic attribute of the first object, or the larger object in the preferred implementation, is then determined. The first and second objects, which are the larger and the smaller objects, respectively, in the preferred implementation of the first and fourth embodiment, are retained and the object status variable of both the larger and smaller objects are set to the first value, which is "RETAIN BOTH" if the difference in the characteristic attribute of the predetermined point of the larger object with respect to the smaller object exceeds a predetermined minimum number. In a preferred implementation of the first embodiment, the determining step comprises determining the interior points of the larger object, excluding the interior points of the smaller object.

Figure 19:
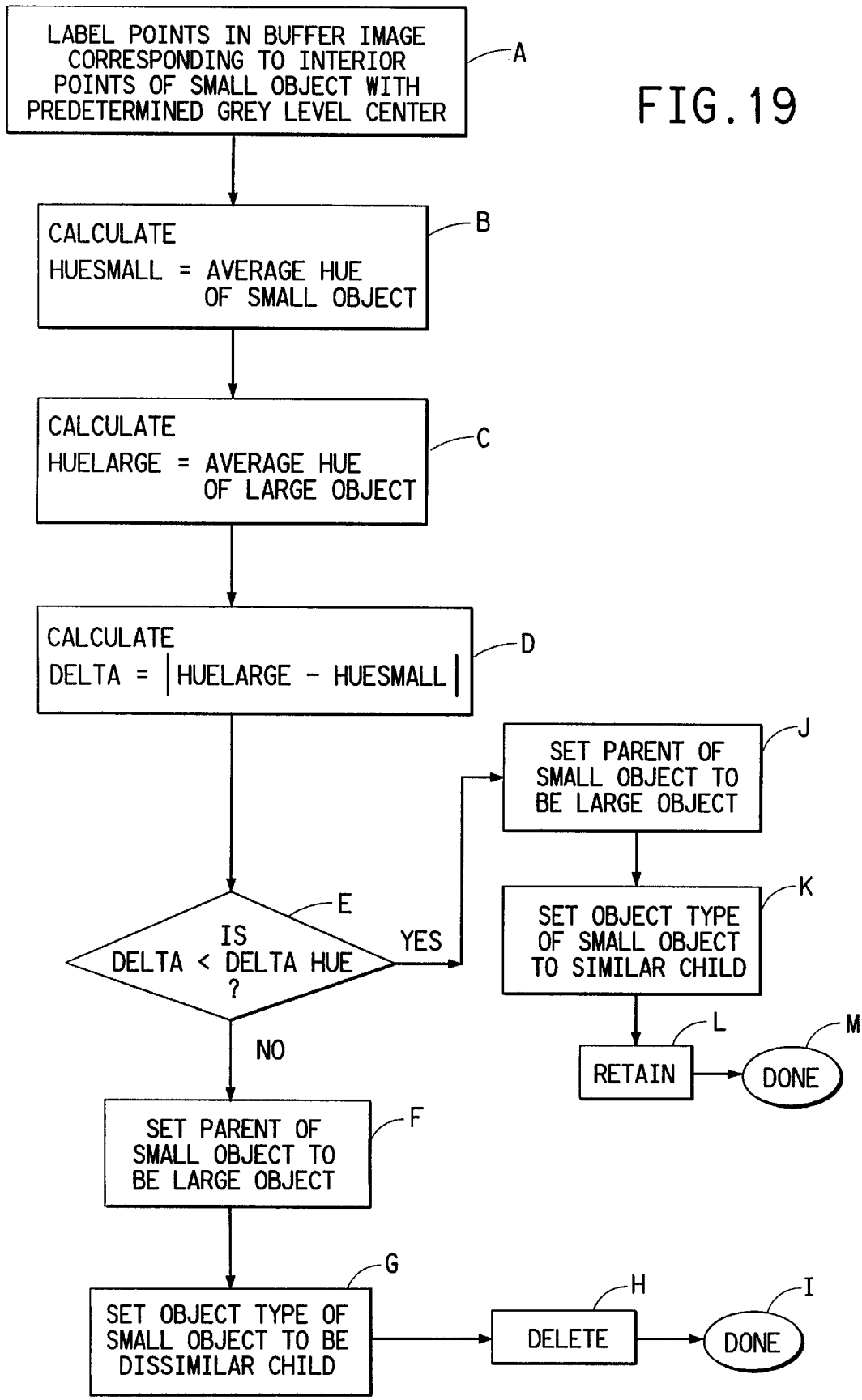
FIG. 19 is a flow chart showing the steps of the module, CHECK SIMILARITY, which is also called by SET STATUS, and which performs another portion of the check which determines if the hue of a smaller object is similar to the hue of a larger object for the first embodiment.

In the first embodiment, the piggyback method is performed by a module CHECK SIMILARITY, the steps of which are illustrated in FIG. 19. For purposes of clarity, the steps of CHECK SIMILARITY will be illustrated where the first object is a larger object, and the second object is a smaller object, it being understood that there may be cases where the first and the second objects may be redundant in ways other than spatial overlap, as noted above. As shown in block A of FIG. 19, the first step of CHECK SIMILARITY is to call the module WRITE BUF, which, as explained below with respect to FIGS. 20A and 20B, assigns a predetermined gray level value designated as "CENTER" to pixels in a buffer image corresponding to the interior points of the smaller object. By labeling these points with a predetermined gray level value, the module allows an accurate hue determination of the larger object without including the exterior points of the smaller object.

In the illustration above, a point in an object was designated and its hue was determined, rather than the average hue of the object. The predetermined point may be the center of mass to make a hue comparison between the smaller and the larger object. However, it has been found that by calculating average hue, a more robust comparison may be made. In this case, the average characteristic attribute of each smaller object which is contained within the larger object is used.

As shown in block B of FIG. 19, the second step of CHECK SIMILARITY is to calculate HUESMALL, the average hue of the smaller object. Then, the average hue of the larger object, HUELARGE, is calculated as shown in block C of FIG. 19. A value DELTA, equal to HUELARGE−HUESMALL, is calculated as shown in block D. Decision diamond E then asks whether DELTA is less than "DELTAHUE". "DELTAHUE" is a predetermined value indicative of how close the hues have to be for similarity to exist. If the answer is no, then the parent of the smaller object is set to be the larger object as shown in block F of FIG. 19, and the object type of the smaller object is set to be CHILD as shown in block G of FIG. 19. Then DELETE is returned as shown in block H, and the module CHECK SIMILARITY is done as shown in oval I of FIG. 19. Returning to decision diamond E, if DELTA is less than DELTAHUE, then the parent of the smaller object is set to be the larger object as shown in block J, and the object type of the smaller object is set to be a similar child as shown in block K. RETAIN is returned as shown in block L, and the module is done as shown by M.

In one implementation of the piggyback method, an average characteristic attribute of each interior point of each second object, for example, each smaller object, is determined. This implementation, which uses the average characteristic attribute, gives a better comparison than the implementation of the piggyback method which uses the characteristic attribute. This same average characteristic attribute of each interior point of each first object is then determined. In the preferred implementation, the first object is a larger object, the second object is a smaller object, and the average characteristic attribute is average interior hue, i.e., the average hue of all the interior points. The object status variable of each object is set to a first value, i.e., RETAIN BOTH, as described above if the difference in the average characteristic attribute of the interior points of the first object with respect to the average characteristic attribute of the interior points of at least one second object redundant with the first object exceeds a predetermined minimum number. Thus, in the preferred embodiment, both the first and second objects are retained if the difference in the average interior hue of the larger object with respect to the average interior hue of at least one smaller object contained within the larger object exceeds a predetermined minimum number.

Figure 20A:
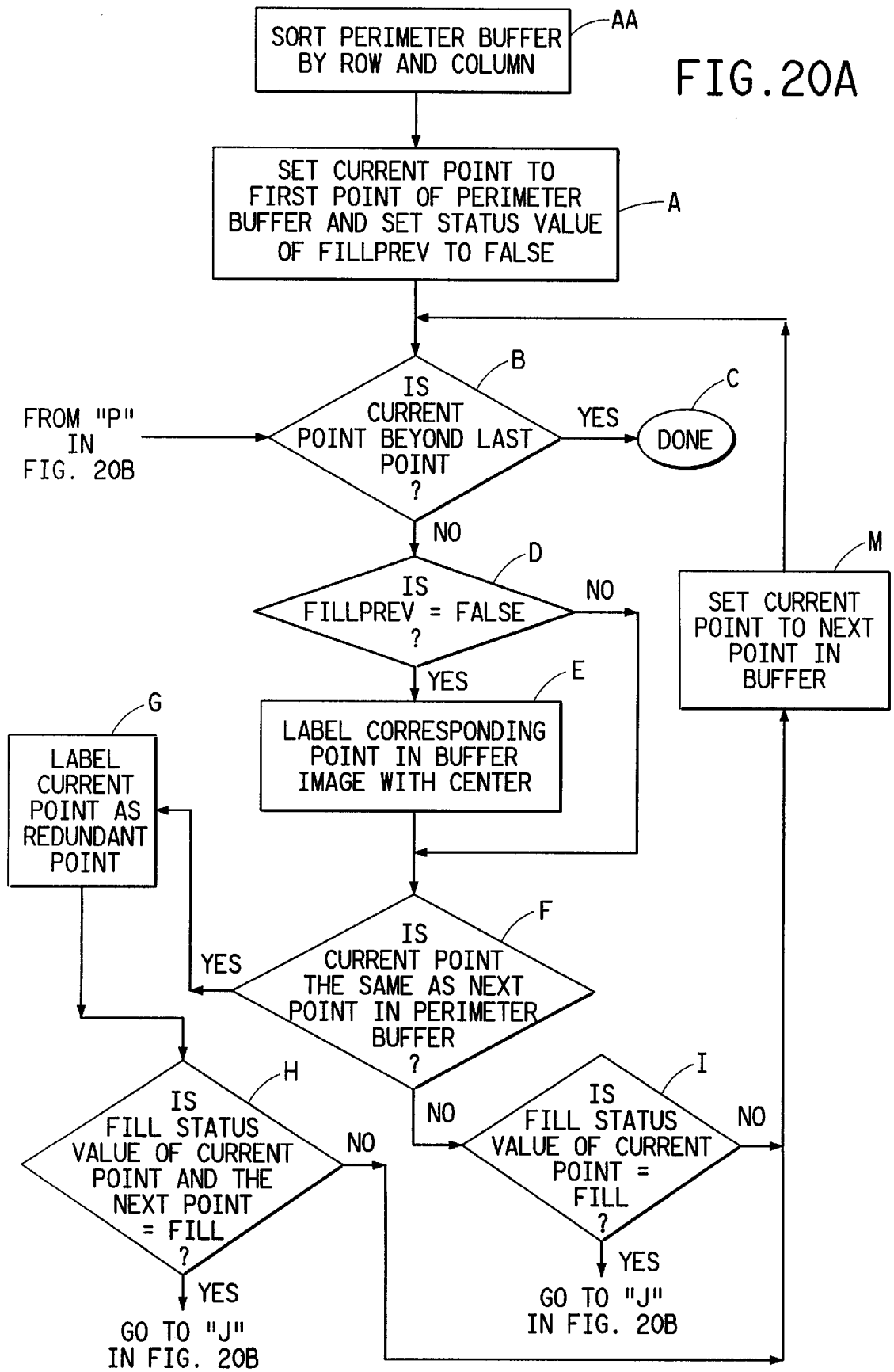
FIGS. 20A–20B are a flow chart showing the steps of the module, WRITE BUF, used in accordance with the first embodiment and which determines the interior points of the smaller object and labels them with a predetermined gray level value.
Figure 20B:
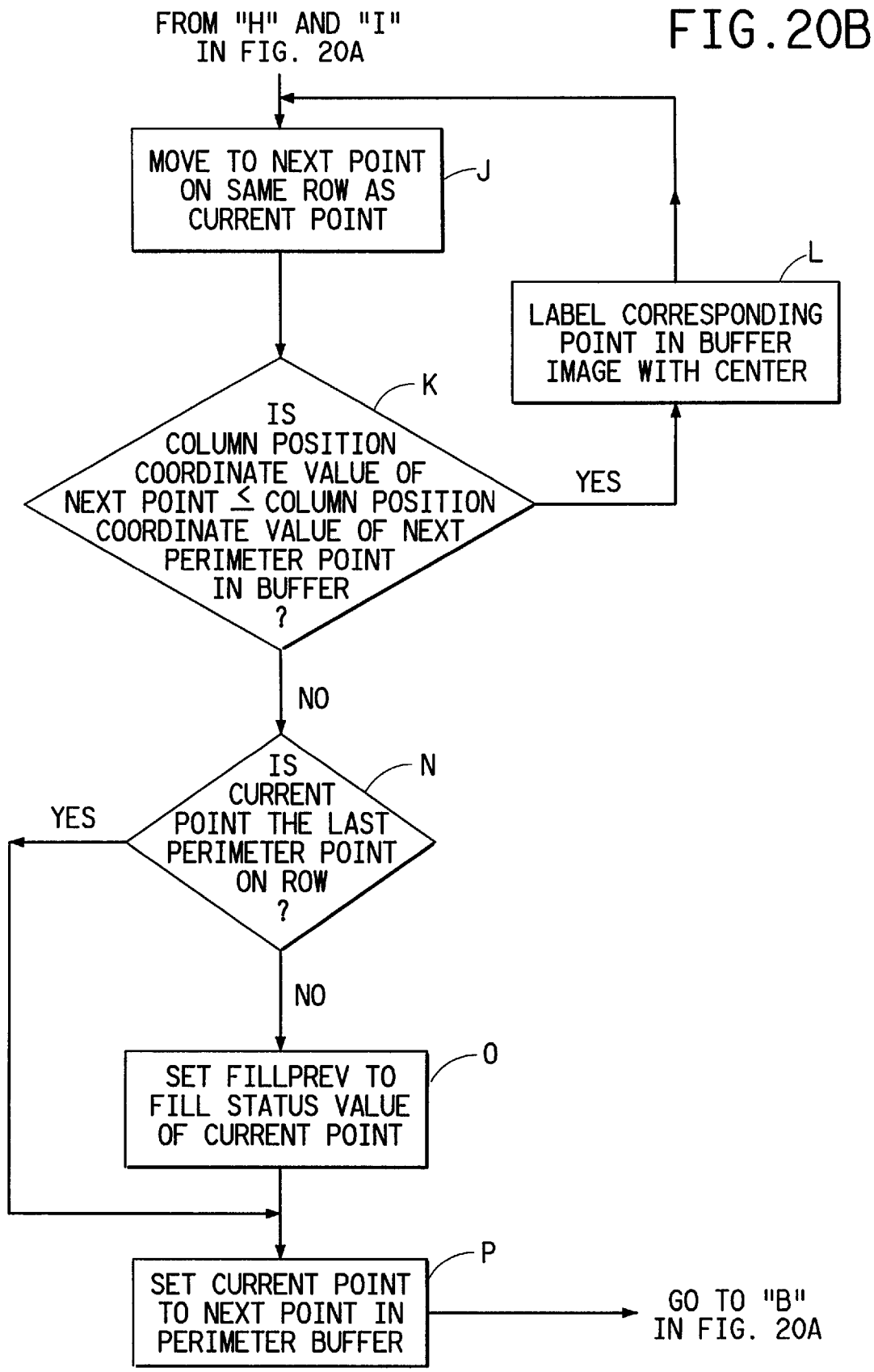

Referring now to FIGS. 20A and 20B, the steps of WRITE BUF for assigning a predetermined gray level value designated as CENTER to pixels in a buffer image corresponding to the interior points of a smaller object. As shown in block AA, the first step of WRITE BUF is to sort the perimeter buffer by row and column. As shown in block A of FIG. 20A, the current point is then set to the first point of the perimeter buffer, and the FILLPREV status is set to FALSE. FILLPREV is a status variable indicating the FILL status value of the point immediately preceding the current perimeter point. The status value for the FILLPREV status variable and the FILL status value is determined by the direction code vectors of the current points and the LUT's of FIGS. 14 and 15, depending on the direction of the trace. Decision diamond B then asks whether the current point is beyond the last point of the perimeter buffer. If so, the module is done as shown in oval C. If the current point is not beyond the last point, then decision diamond D asks whether the FILLPREV status of the current point is FALSE. If it is, then the corresponding point in the buffer image is labeled with the predetermined gray level value CENTER as shown in block E of FIG. 20A.

The module proceeds to decision diamond F. If the FILLPREV status of the current point is not equal to FALSE, then the module proceeds directly to decision diamond F. Decision diamond F asks whether the current point is the same as the next point in the perimeter buffer. If it is, then the current point is labeled as a redundant point as shown in block G. Decision diamond H then asks whether the status value of the current point and the next point equal to FILL. If it is not, then the current point is set to the next point in the buffer as shown in block M, and the module WRITE BUF returns to decision diamond B of FIG. 20A. The loop through B–M continues until the current point is beyond the last point in the perimeter buffer, at which point the module is done as shown in oval C of FIG. 20A.

Returning to decision diamond H, if the status value of the current point is equal to FILL, then the module proceeds to block J and moves to the next point on the same row as the current point. Then, decision diamond K asks whether the column-position coordinate value of the next point is less than or equal to the column-position coordinate value of the next perimeter point in the buffer. If it is, then the corresponding point in the buffer image is labeled with the value CENTER as shown in block L. The module WRITE BUF then moves to the next point on the same row as the current point as shown in block J, and the loop through J, K, and L continues until the column-position coordinate value of the next point is not less than or equal to the column-position coordinate value of the next perimeter point in the buffer.

Returning to decision diamond F, if the current point is not the same as the next point in the perimeter buffer, then the module proceeds to decision diamond I. Decision diamond I asks whether the status value of the current point is equal to FILL. If it is not, then the current point is set to the next point in the buffer as shown in block M, the module returns to decision diamond B of FIG. 20A, and the loop through B–I continues until the current point is beyond the last point in the perimeter buffer. At this point, the module is done as shown in oval C.

Returning to decision diamond I, if the status value of the current point is equal to FILL, then the module proceeds to block J and moves to the next point on the same row as the current point. Then, decision diamond K asks whether the column-position coordinate value of the next point is less than or equal to the column-position coordinate value of the next perimeter point in the buffer. If it is, then the corresponding point in the buffer image is labeled with the value CENTER as shown in block L. The module WRITE BUF then moves to the next point on the same row as the current point as shown in block J, and the loop through J, K, and L continues until the column-position coordinate value of the next point is not less than or equal to the column-position coordinate value of the next perimeter point in the buffer.

The module WRITE BUF then proceeds to decision diamond P, which asks whether the current point is the last perimeter point on the row. If it is not the last perimeter point on the row, the value of the FILLPREV status variable is set to the FILL status value of the current point, as shown in block Q. The current point is then set to the next point in the perimeter buffer as shown in block R, and the loop through B–P continues until the current point is the last perimeter point on the row. If it is the last perimeter point on the row, then the current point is set to the next point in the perimeter buffer as shown in block P, and the loop through B–P continues until the current point is beyond the last point in the perimeter buffer. At this point, the module WRITE BUF is done, as shown in oval C.

Figure 21A:
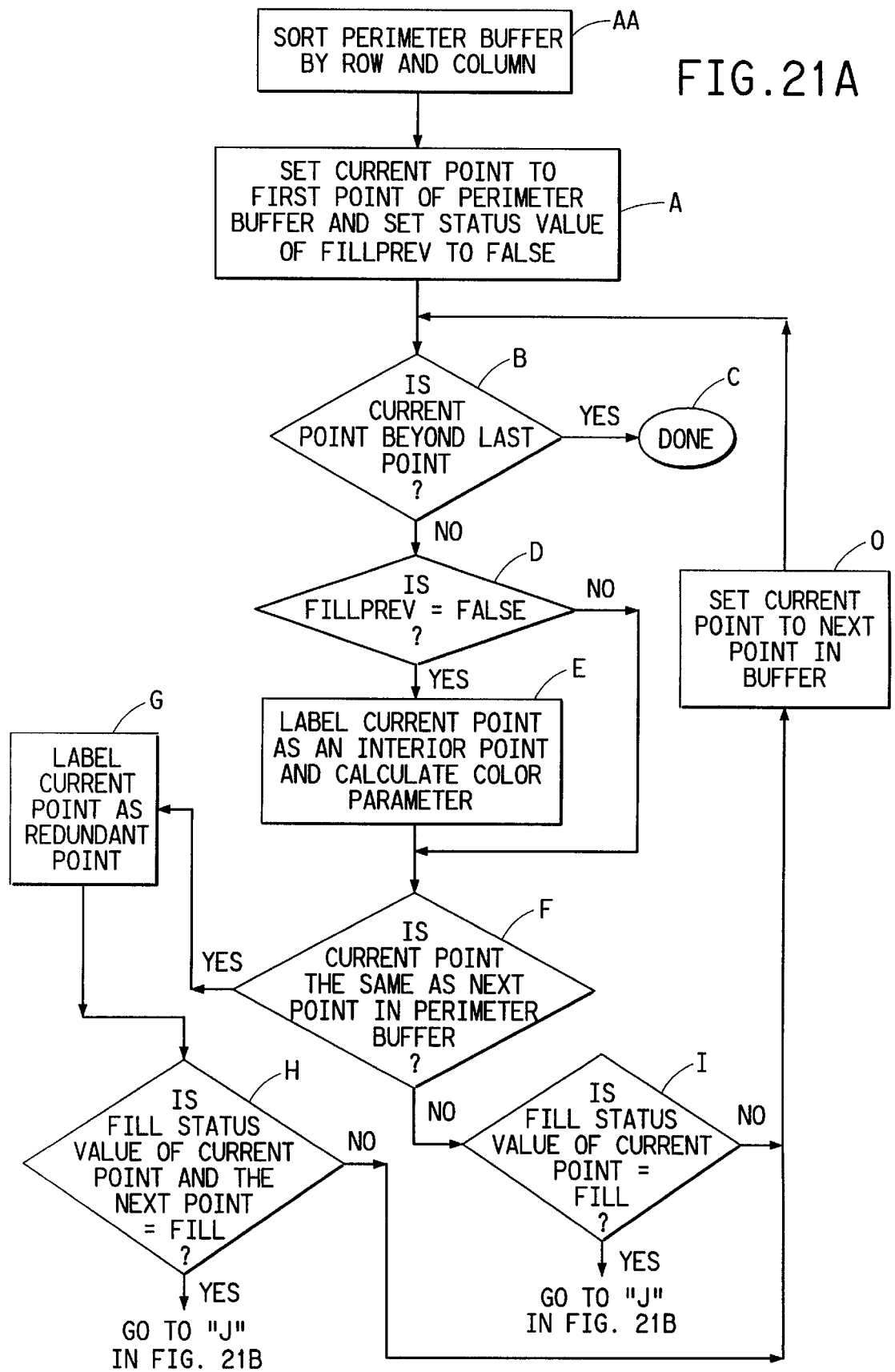
FIGS. 21A–21B are a flow chart showing the steps of a module, READ COLOR, which calculates the interior hue and hue magnitude of an object in accordance with the first embodiment.
Figure 21B:
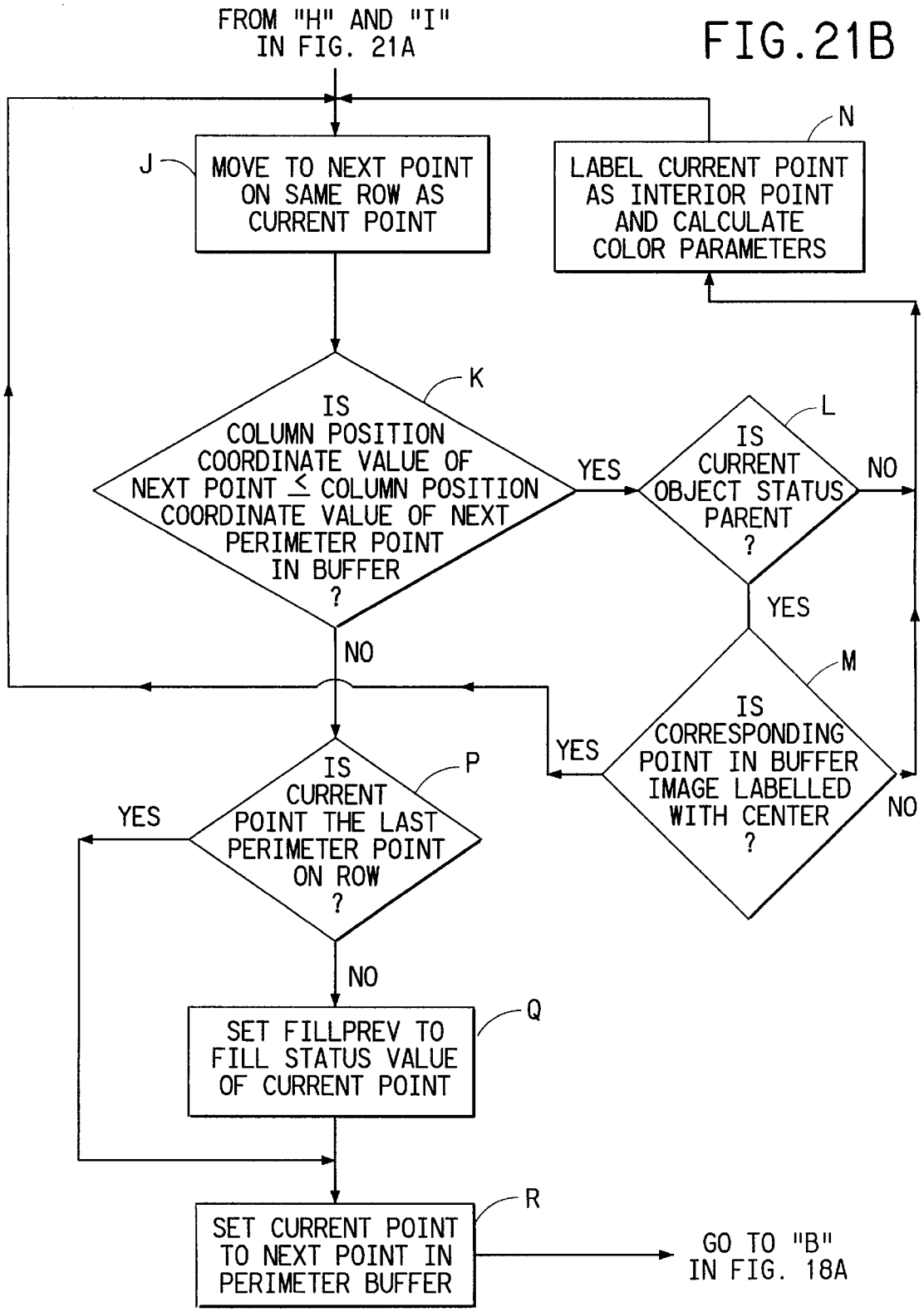

FIGS. 21A and 21B describe a module, READ COLOR, which computes the average hue of the objects as described above. As shown in block AA of FIG. 21A, the first step of READ COLOR is to sort the perimeter buffer by row and column. As shown in block A of FIG. 21A, the current point is set to the first point of the perimeter buffer, and the FILLPREV status is set to FALSE. FILLPREV is a status variable indicating the FILL status value of the point immediately preceding the current perimeter point. The status value for the FILLPREV and FILL status variables is determined by the direction code vectors of the current points and the LUT's of FIGS. 14 and 15, depending on the direction of the trace. Decision diamond B then asks whether the current point is beyond the last point of the perimeter buffer. If so, the module is done as shown in oval C. If the current point is not beyond the last point, then decision diamond D asks whether the FILLPREV status of the current point is FALSE. If it is, then the current point is labeled as an interior point, and color parameters are calculated as shown in block E. The module then proceeds to decision diamond F. If the FILLPREV status of the current point is not equal to FALSE, then the module proceeds directly to decision diamond F.

Decision diamond F asks whether the current point is the same as the next point in the perimeter buffer. If it is, then the current point is labeled as a redundant point as shown in block G. Decision diamond H then asks whether the status value of the current point and the next point is equal to FILL. If it is not, then the current point is set to the next point in the buffer as shown in block O, and the module READ COLOR returns to decision diamond B of FIG. 21A. The loop through B–O continues until the current point is beyond the last point in the perimeter buffer, at which point the module is done as shown in oval C of FIG. 21A.

Returning to decision diamond H, if the status value of the current point is equal to FILL, then the module proceeds to block J and moves to the next point on the same row as the current point. Then, decision diamond K asks whether the column-position coordinate value of the next point is less than or equal to the column-position coordinate value of the next perimeter point in the buffer. If it is, then decision diamond L asks whether the current object's object type is "PARENT", meaning, in the preferred embodiment, that this object is the larger object. If it is, then decision diamond M asks whether the corresponding point in the buffer image is labeled with the predetermined gray level value, referred to as CENTER. If the corresponding point in the buffer image is labeled with CENTER, then the module READ COLOR moves to the next point on the same row as the current point as shown in block J, and the loop through J, K, L and M continues until the corresponding point in the buffer image is not labeled with CENTER.

Then the module READ COLOR goes to block N of FIG. 21B. The next point is labeled as an interior point, and color parameters are calculated. The module then proceeds to block J, and the loop through J, K and L continues until the current object's object type is not equal to PARENT (i.e., it is not the larger object). The loop through N, J and K then continues until the column-position coordinate value of the next point is greater than the column-position coordinate value of the next perimeter point in the buffer as shown in decision diamond K. The module READ COLOR then proceeds to decision diamond P, which asks whether the current point is the last perimeter point on the row. If it is not the last perimeter point on the row, block Q sets the value of the FILLPREV status variable to the FILL status value of the current point. The current point is then set to the next point in the perimeter buffer as shown in block R, and the loop through B–P continues until the current point is the last perimeter point on the row. If the current point is the last perimeter point on the row, then the current point is set to the next point in the perimeter buffer as shown in block R, and the loop through B–P continues until the current point is beyond the last point in the perimeter buffer. At this point, the module is done as shown in oval C.

Returning to decision diamond F, if the current point is not the same as the next point in the perimeter buffer, then the module READ COLOR proceeds to decision diamond I. Decision diamond I asks whether the status value of the current point is equal to FILL. If it is not, then the current point is set to the next point in the buffer as shown in block O, the module returns to decision diamond B of FIG. 21A. The loop through B–I continues until the current point is beyond the last point in the perimeter buffer. At this point, the module is done as shown in oval C.

Returning to decision diamond I, if the status value of the current point is equal to FILL, then the module proceeds to block J and moves to the next point on the same row as the current point. Then, decision diamond K asks whether the column-position coordinate value of the next point is less than or equal to the column-position coordinate value of the next perimeter point in the buffer. If it is, then decision diamond L asks whether the current object's object type is PARENT. If it is, then decision diamond M asks whether the corresponding point in the buffer image is labeled with the predetermined gray level value, referred to as CENTER. If the corresponding point in the buffer image is labeled with CENTER, then the module READ COLOR moves to the next point on the same row as the current point as shown in block J, and the loop through J, K, L and M continues until the corresponding point in the buffer image is not labeled with CENTER.

Then the module READ COLOR goes to block N of FIG. 21B. The next point is identified as an interior point, and color parameters are calculated. The module then proceeds to block J, and the loop through J, K and L continues until the current object's object type is not equal to PARENT (i.e., it is not the larger object). The loop through N, J and K then continues until the column-position coordinate value of the next point is greater than the column-position coordinate value of the next perimeter point in the buffer as shown in decision diamond K. The module READ COLOR then proceeds to decision diamond P, which asks whether the current points is the last perimeter point on the row. If it is not the last perimeter point on the row, block Q sets the value of the FILLPREV status variable to the FILL status value of the current point. The current point is then set to the next point in the perimeter buffer as shown in block R, and the loop through B–P continues until the current point is the last perimeter point on the row. If the current point is the last perimeter point on the row, then the current point is set to the next point in the perimeter buffer as shown in block R, and the loop through B–P continues until the current point is beyond the last point in the perimeter buffer. At this point, the module is done as shown in oval C.

In a particular implementation of the first and fourth embodiments, the step of identifying a group of potentially redundant objects in an image comprises the sub-step of generating an image of the objects and the background. The background may be either fixed or varying. The hardware used to implement the method of the first and fourth embodiments must first be initialized when the image is generated. The image of the object and the background may be generated by a camera. Although a CCD camera is generally used with the present invention, any type of camera may be used without departing from the general principles of the present invention. The image is then digitized and stored by a frame grabber or a video digitizer.

The method of the present invention also comprises the step of defining a data space representative of the image comprising a plurality of sub-spaces. The data space may be based on at least one predetermined attribute value of a valid object. Alternatively, the data space may be based on at least one predetermined attribute value of a previously identified object. Moreover, the data space may comprise the gray level values of the image. A histogram is an example of a one-dimensional data space constituting the gray level values associated with each point in the image. This example will be explained in more depth as a preferred implementation below. Alternatively, the data space may comprise a color space of the image. This color space may be the R,G,B color space, or the LAB color space. Such color spaces are examples of three-dimensional data spaces. Alternatively, the data space may comprise a space resulting from the transformation of gray level values of an image. This resulting space may be, for example, contrast, hue magnitude or edge intensity. The data spaces described in this paragraph are meant to be exemplary only, with the scope of the present invention extending beyond these examples.

Figure 22:
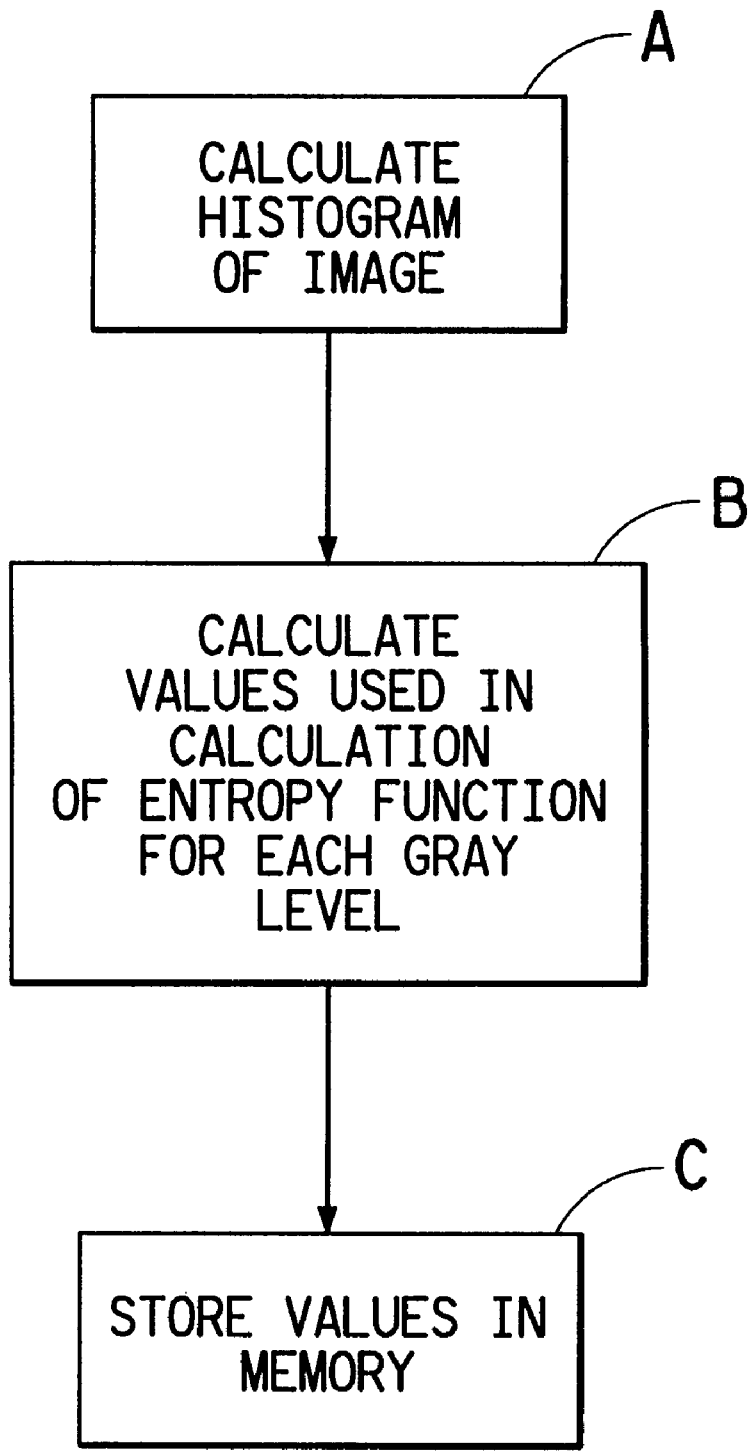
FIG. 22 is a flow chart illustrating the steps of a module HISTOGRAM which is used to generate a gray level histogram of an image.

In the preferred implementation of the first and fourth embodiments, the step of identifying a group of potentially redundant objects in an image also comprises the sub-step of generating a histogram representative of the entire image, where the gray level histogram has an entropy function. A threshold gray level value is entropically selected such that the entropy function of the histogram is maximized. A module, HISTOGRAM, is used to generate the gray level histogram of the region of interest of the image. The steps for generating the gray level histogram are shown in the flow chart of FIG. 22. As shown in block A of FIG. 22, HISTOGRAM first calculates a histogram of the region of interest of the image. It then calculates the values to be used subsequently in the calculation of the entropy function, $H_s$, for each gray level, s, as shown in block B of FIG. 22. The results of this calculation are stored in memory as shown in block C. This ensures that for subsequent calculations of the entropic threshold gray level, only a simple look-up operation is required.

The method of the first and fourth embodiments also includes the step of selecting at least one sub-space. This step is shown in block C of FIG. 1. The sub-space is a bounded portion of the data space—i.e., it does not span the entire data space. The sub-space may be a pair of gray level values, or a range of gray level values. Moreover, the sub-space may be selected based on the way that for instance, gray level values, or color parameters, cluster in the respective spaces, although it should be noted that the sub-space is not limited to these examples.

Figure 23:
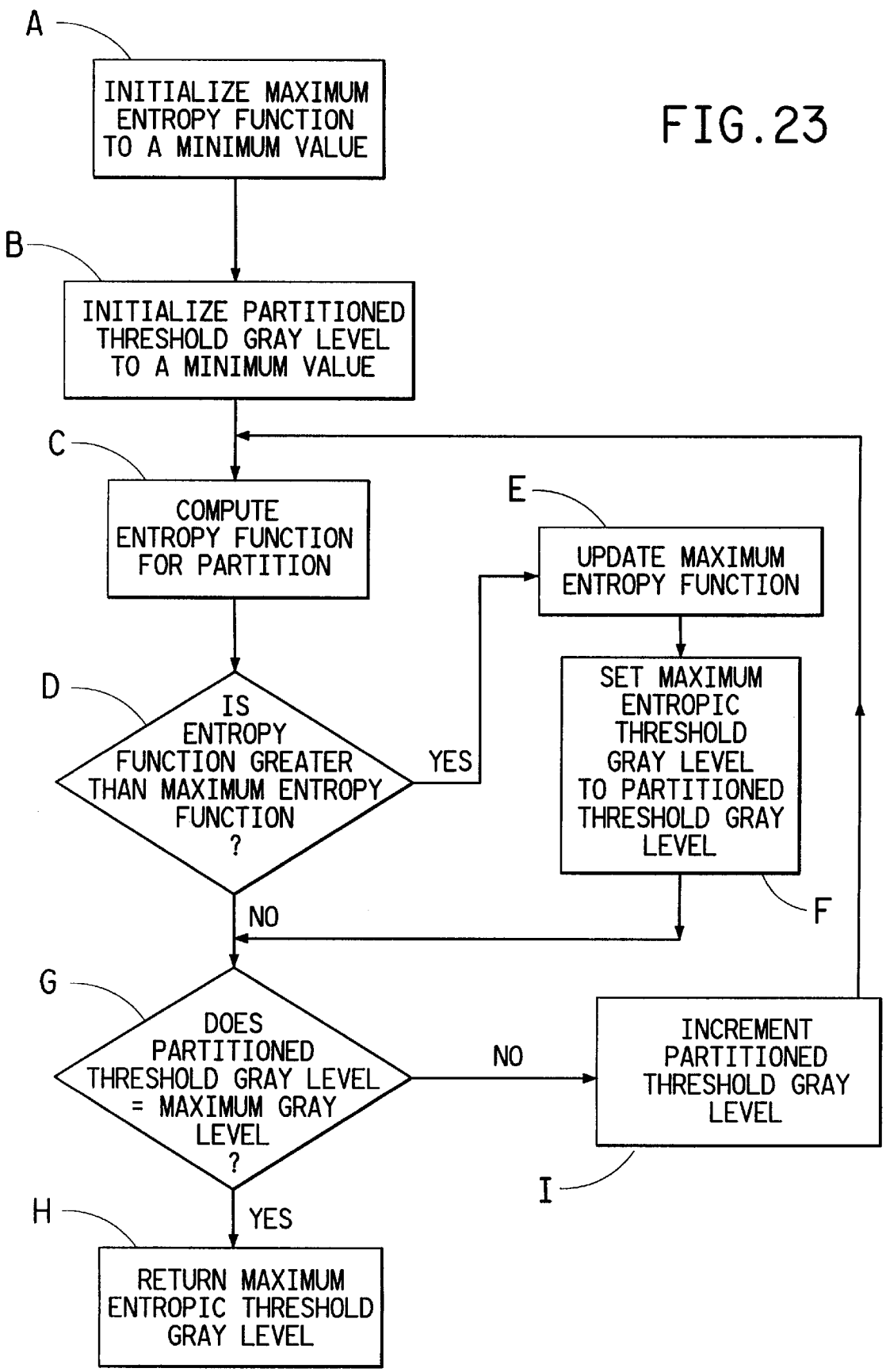
FIG. 23 is a flow chart showing the steps of a module, ENTROPY, which is used to entropically select a threshold gray level such that the entropy function of the histogram is maximized.

In the preferred implementation of the first and fourth embodiments, the method also includes the step of entropically selecting a threshold gray level value such that the entropy function of the histogram is maximized. The idea of using entropy to analyze a gray level histogram of an image was originally proposed by Pun in an article entitled "Entropic Thresholding, a New Approach", Comp. Graphics and Image Proc., Vol. 16, 1981, pp. 210–239. The entropy analysis of Pun was further refined by Kapur et al. in an article entitled "A New Method for Grey-Level Picture Thresholding Using the Entropy of the Histogram", Comp. Graphics and Image. Proc. 29, 1985, pp. 273–285. Alternatively, an automatically calculated entropic threshold may be determined from a co-occurrence matrix as described in Pal and Pal in the article entitled "Entropic Thresholding", Signal Processing, Vol. 16, 1989, pp. 97–108. The step of entropically selecting a threshold gray level as used with the present invention is performed by a ENTROPY module as shown in FIG. 23. As shown in block A of FIG. 23, the first step in maximizing the entropy function of the histogram is to initialize the maximum entropy function to a minimum value.

Figure 24:
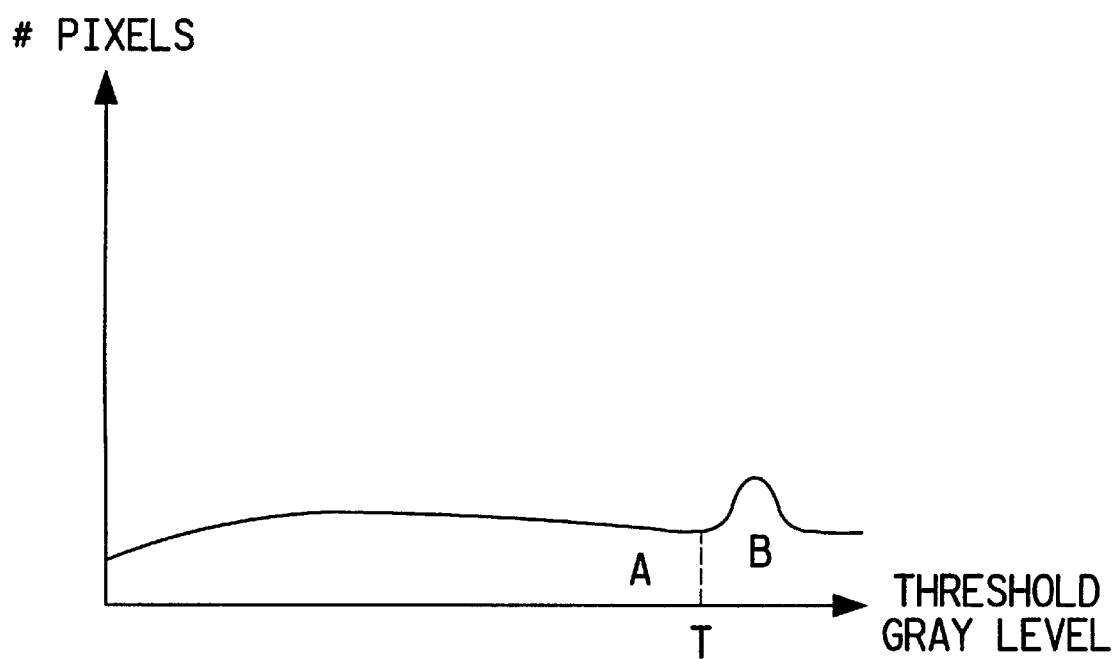
FIG. 24 is a gray level histogram of an image of a single, simple object in a varying background.

In a preferred implementation of the first and fourth embodiments, the step of generating a plurality of gray level upper and lower histograms of the image from the histogram. Each gray level upper and lower histogram has a respective entropy function. The step of entropically selecting a threshold gray level includes the sub-step of sequentially partitioning the gray level histogram at each gray level value into a first partition and a second partition. To illustrate the simple case where a single, simple object in a varying background is identified, a gray level histogram of an image is shown in FIG. 24. The first and second partitions are shown in the histogram of FIG. 24, where the gray level values of the background are represented by a first partition A, and the gray levels of the valid object are represented by a second partition B. In the ENTROPY module, the partitioned threshold gray level value is initialized to a minimum value as shown in block B of FIG. 23.

The step of identifying a group of potentially redundant objects in an image also comprises the sub-step of entropically selecting a plurality of threshold gray level values for each upper and lower histogram such that the entropy function of each histogram is maximized. The step of entropically selecting a threshold gray level also includes the sub-step of computing the entropy function for each partition, where the total entropy function of the histogram is defined as the sum of the entropy function $H_s(A)$ of first partition, A, and the entropy function $H_s(B)$ of second partition, B. This step is shown in block C of FIG. 23 and is mathematically expressed as follows:

For a given threshold gray level value, s,:

$$H_s(A) = -\sum_{i=1}^{s} \frac{p_i}{p_s} \ln\left(\frac{p_i}{p_s}\right) \tag{1}$$

$$\text{with } p_i = \frac{f_i}{N}, p_s = \frac{1}{N}\sum_{i=1}^{s} f_i \tag{2}$$

-continued $$\text{Thus, } \frac{p_i}{p_s} = \frac{f_i}{\sum_{i=1}^{s} f_i} = \frac{f_i}{N_s} \text{ with } N_s = \sum_{i=1}^{s} f_i \tag{3}$$

$$\text{So, } H_s(A) = -\sum_{i=1}^{s} \frac{f_i}{N_s} \ln\left(\frac{f_i}{N_s}\right) \tag{4}$$

$$= \frac{-1}{N_s}\sum_{i=1}^{s} f_i \ln f_i + \ln N_s$$

$$\text{Similarly, } H_s(B) = \frac{-1}{N_{s'}}\sum_{i=s+1}^{N_{gray}} f_i \ln f_i + \ln N_{s'} \tag{5}$$

where $N_{s'} = N - N_s$ and $$H_s(A) + H_s(B) = \ln N_s + \ln N_{s'} - \frac{1}{N_s}\sum_{i=1}^{s} f_i \ln f_i - \frac{1}{N_{s'}}\sum_{i=s+1}^{N_{gray}} f_i \ln f_i \tag{6}$$

The sum $H_s(A)+H_s(B)$ represents the total entropy function of the gray level histogram of the image. The maximum entropic threshold gray level value is the value of s which maximizes the total entropy function.

Decision diamond D of FIG. 23 asks whether the entropy function of the histogram is greater than the maximum entropy function as initialized in block A. If it is, then the maximum entropy function is updated using the partitioned threshold gray level as shown in block E of FIG. 23. The maximum entropic threshold gray level value is then set to the partitioned threshold gray level value as shown in block F. After the maximum entropic threshold gray level value has been set, or if the entropic function of the histogram is not greater than the maximum entropy function, then decision diamond G of the ENTROPY module as illustrated in FIG. 23 asks whether the partitioned threshold gray level value equals the maximum threshold gray level value. If so, the maximum entropic threshold gray level value is returned as shown in block H of FIG. 23. If not, then the partitioned threshold gray level value is incremented as illustrated in block I of FIG. 23, and the incremented partitioned threshold gray level value is returned to block C, where the entropy function of the incremented, partitioned threshold gray level value is computed. The loop through C–G is repeated until the partitioned threshold gray level value equals the maximum threshold gray level value, at which point the maximum entropic threshold gray level value is returned as shown in block H.

The probability distributions are renormalized in $H_s(A)$ and $H_s(B)$ to include only the gray level values within each of the partitions. With this renormalization, the maximum entropy function occurs right at the edge of the object peak in the gray level histogram as shown at T in FIG. 24. Thus, a new threshold gray level value is selected such that the entropy function of the histogram is maximized. With this maximum choice of threshold for the simple case as illustrated in FIG. 24, the renormalized distribution of the background becomes the least peaky and the most uniform. The total entropy function of the histogram is dominated by the entropy function of the background, since the number of gray level values in the background partition is much larger than the number of gray level values in the object partition.

The method of the first and fourth embodiments also includes the step of multiply searching the image for at least one representation of a candidate object using each selected sub-space. This step may comprise either scanning the image once using each of the sub-spaces simultaneously, or scanning the image multiple times using a selected sub-space for each scan.

In a preferred implementation of the first and fourth embodiments, the step of identifying a group of potentially redundant objects in an image also comprises the sub-step of searching the image using the automatically selected threshold gray level value for at least one candidate object. The candidate object has at least one candidate object attribute value. The searching sub-step further includes the sub-step of scanning the image for at least one object using the entropically selected threshold gray level value. More specifically, the portion of the image scanned may comprise a plurality of pixels, and each pixel has a gray level value less than the upper delimiter plus an increment. In certain applications, the increment could be set to zero. The upper delimiter also has the notation MAX. The increment is equal to the difference between MAX, the maximum gray level value of the region being searched, and MIN, the minimum gray level value of the region being searched, resulting in a new maximum gray level value, Gray level$_{max}$:

$$\text{Gray level}_{max} = 2 \times \text{MAX} - \text{MIN} \qquad (7)$$

Regions in the image where the gray level value exceeds gray level$_{max}$ are ignored in the search.

Figure 26:
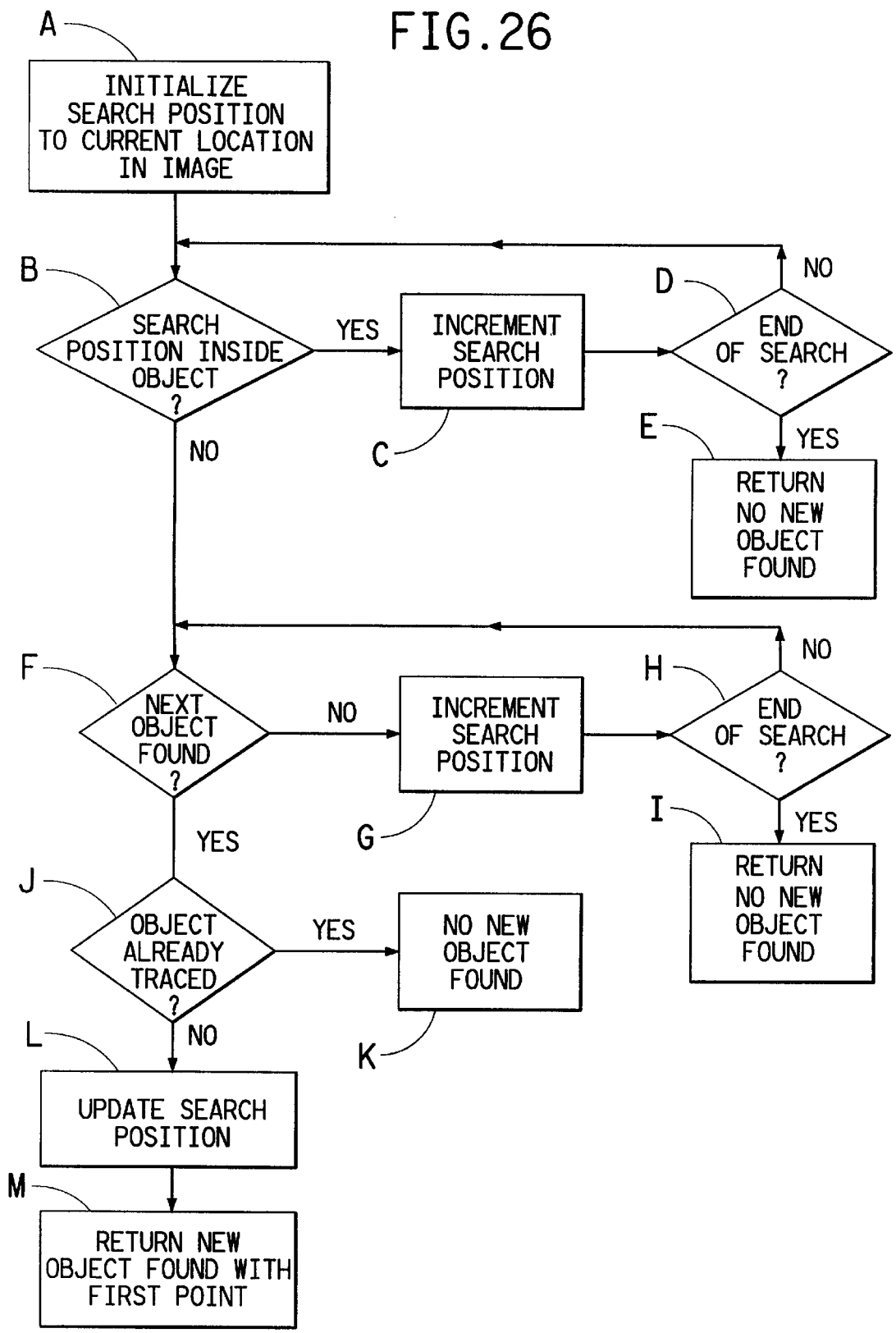
FIG. 26 is a flow chart illustrating the steps of a module, FIND OBJECT, which is also used to search the image for the first embodiment.
Figure 27A:
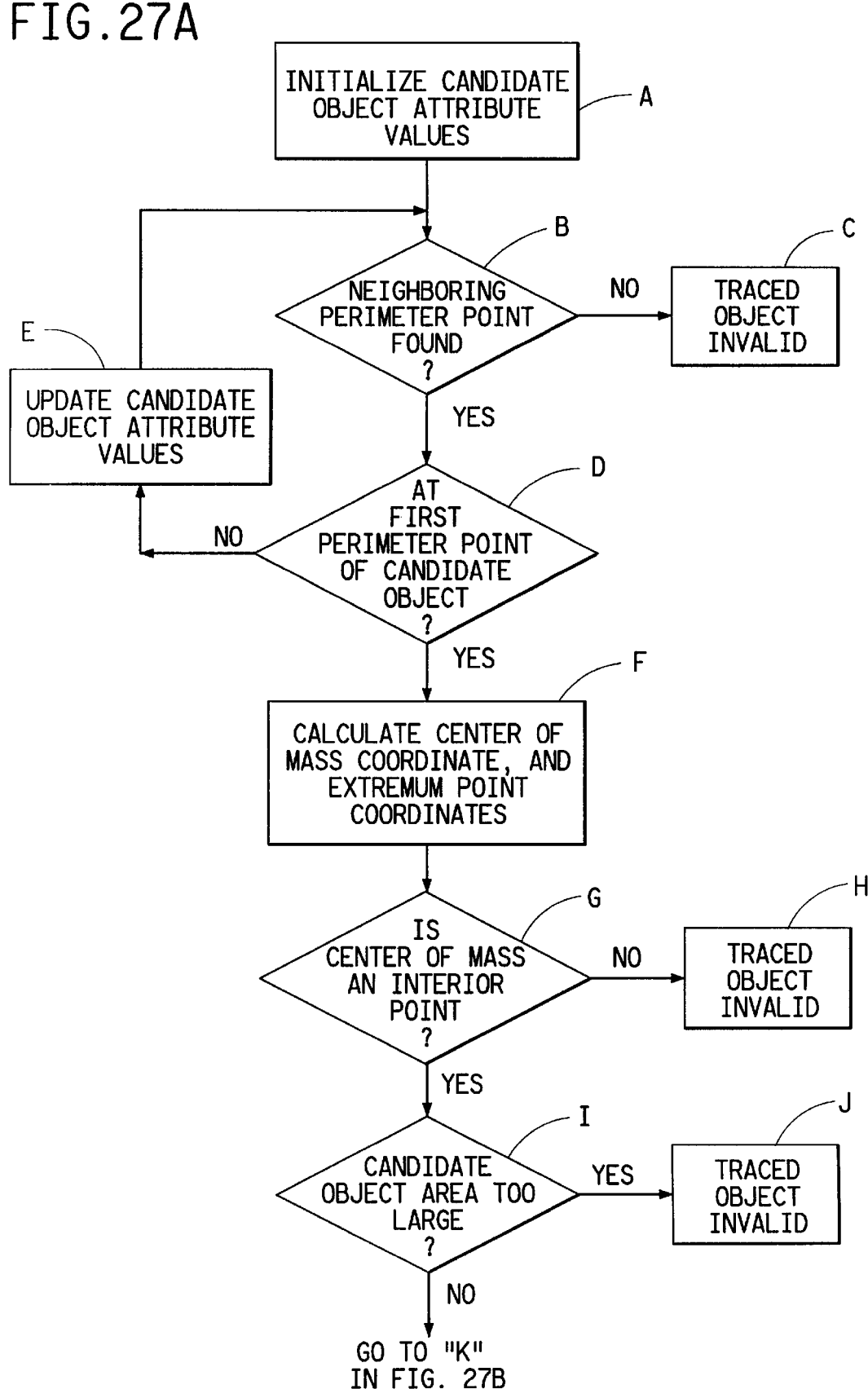
FIGS. 27A–27B are a flow chart showing the steps of a module, TRACE OBJECT, which is used to trace objects for the first embodiment.
Figure 27B:
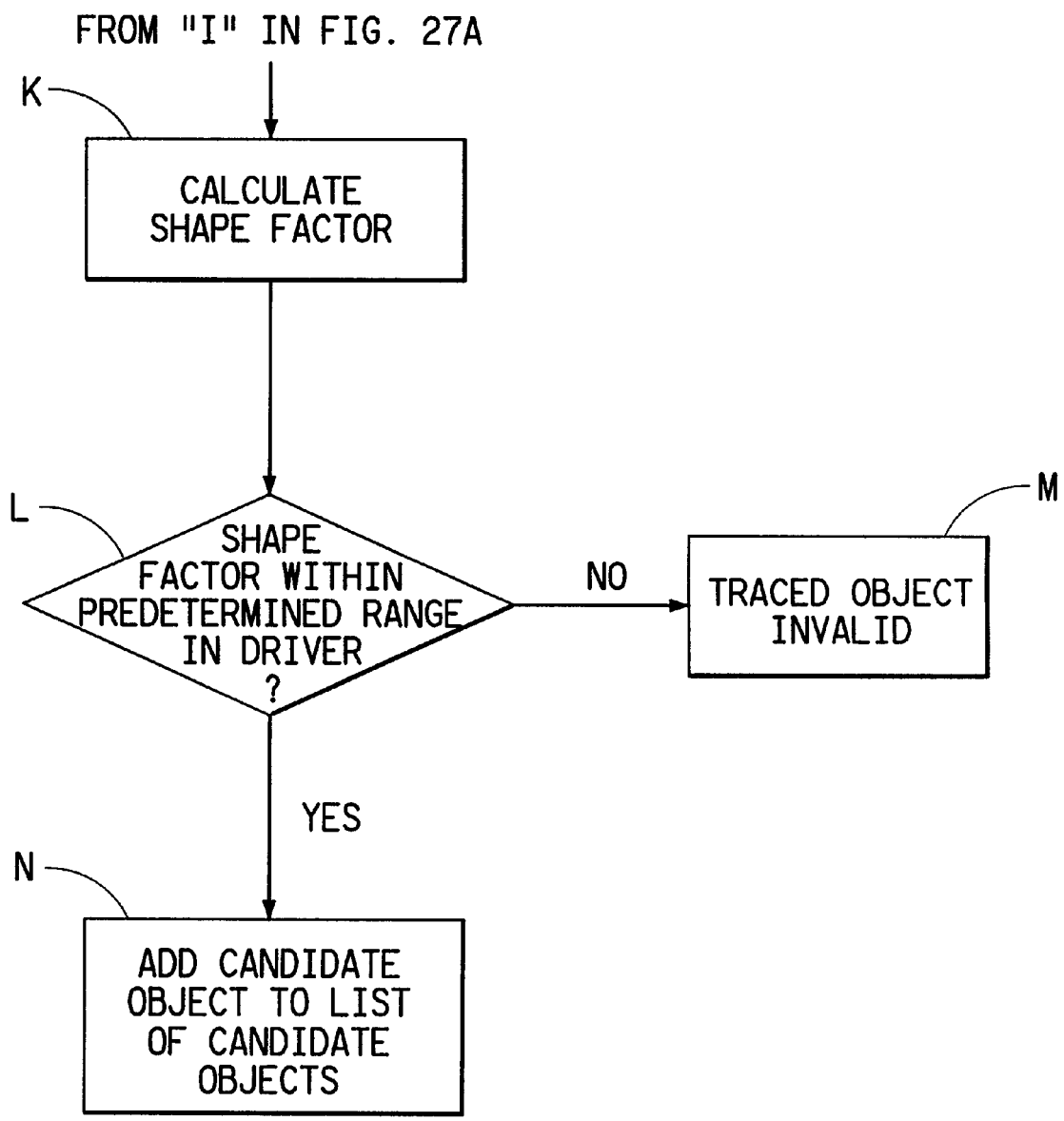

The searching sub-step further includes the sub-step of tracing the candidate object having boundary gray level values determined by the entropically selected threshold gray level value. The searching step of the first embodiment is performed by a module SEARCH IMAGE as shown in FIG. 25, a module FIND OBJECT as shown in FIG. 26, and the module TRACE OBJECT as shown in FIGS. 27A and 27B.

Figure 25:
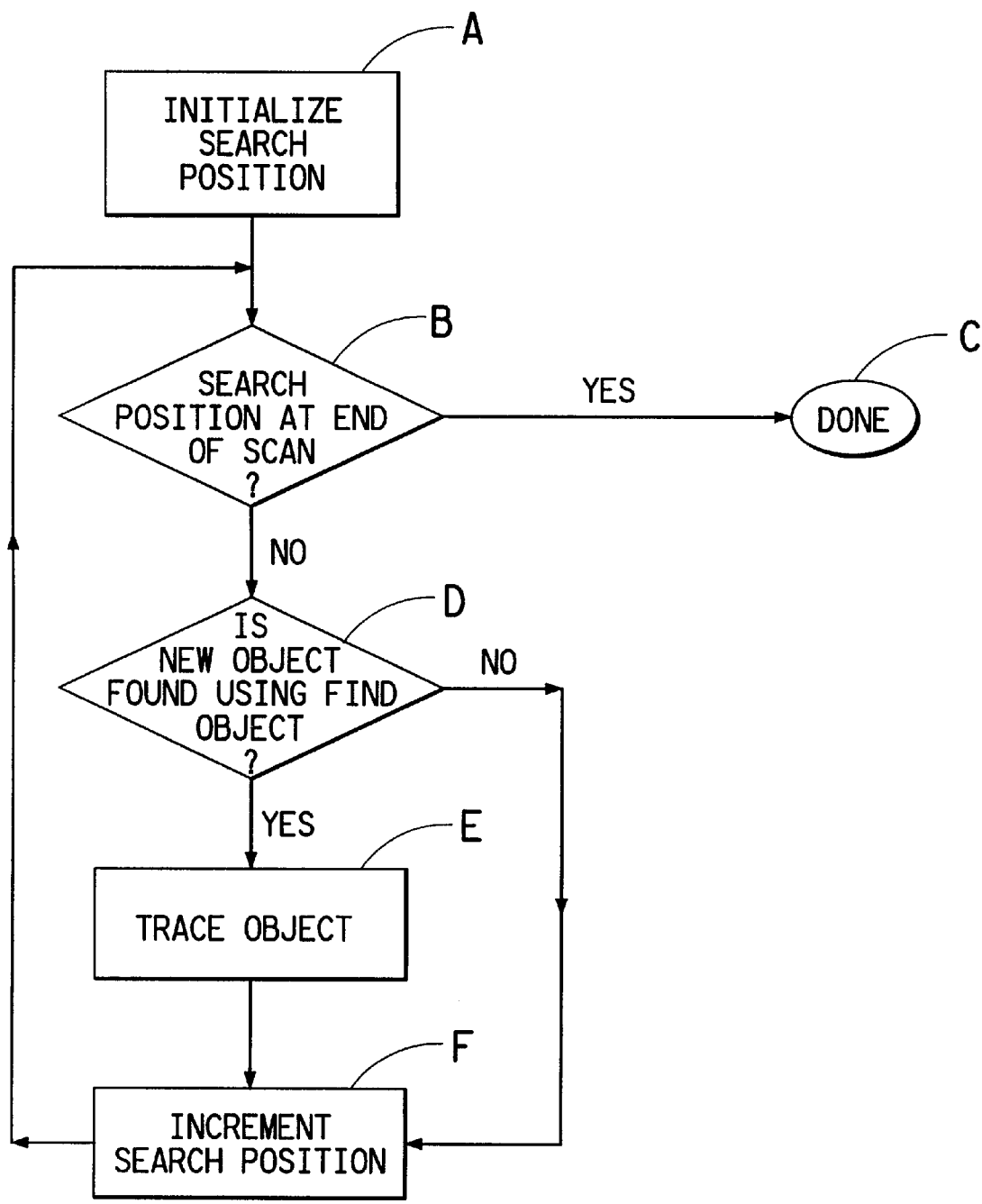
FIG. 25 is flow chart showing the steps of a module, SEARCH IMAGE, which is used to search an image for at least one candidate object for the first embodiment.

As illustrated by block A of FIG. 25, the first step of SEARCH IMAGE is to initialize the search position. The module SEARCH IMAGE searches the region of interest with the current entropically selected threshold gray level value. Decision diamond B of FIG. 25 then asks whether the search position is at the end of the scan. If so, SEARCH IMAGE is done.

If the search position is not at the end of the scan, then the module SEARCH IMAGE searches the region of interest with the current entropically selected threshold gray level value until it finds a point which has a gray level value exceeding the entropically selected threshold gray level value using a module FIND OBJECT. To identify objects darker than the background, the image is inverted immediately after it has been generated. Such a point might be the first point of a new object. Decision diamond D of FIG. 25 asks whether a new object has been found using the module FIND OBJECT. If the object has not already been traced in the current search, the module SEARCH IMAGE proceeds to trace the object by running the module TRACE OBJECT, as shown by block E of FIG. 25.

After the object has been traced, the search position is incremented as illustrated in block F of FIG. 25. The loop through B–F is continued until the module SEARCH IMAGE is at the end of the search as indicated by decision diamond B. Alternatively, if a new object has not been found as indicated by decision diamond D, then the search position is incremented as illustrated in block F, thus bypassing the tracing step, and the loop through B–I is continued until SEARCH IMAGE is at the end of the search.

The steps of the module FIND OBJECT are illustrated in FIG. 26. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether the FIND OBJECT is at the end of its search. If so, then no new object is found as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 26, and decision diamond H asks whether SEARCH IMAGE module is at the end of its search. If so, then no new object found is returned as indicated by block I. If not, then decision diamond F again asks whether a next object has been found using the incremented search position. This process of looping through F–I continues until a next object has been found. Decision diamond J asks whether the object which has been found has already been traced. If so, the new object found is returned as indicated by block K. If the object which has been found has not already been traced, then the search position is updated as illustrated by block L, and a new object found is returned as indicated by block M of FIG. 26. By running SEARCH IMAGE, FIND OBJECT and TRACE OBJECT as described above, the object returned in block M of FIG. 26 is returned to decision diamond D of FIG. 26.

The basic principles of the TRACE OBJECT module are similar to those described in "Digital Image Processing" by Rafael C. Gonzalez and Paul Wintz, Second Ed., Addison-Wesley Publishing Company, Reading, Mass. (1987). As shown in block A of FIG. 27A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 27A. The loop through B–E is then repeated, using the updated candidate object attribute values, until the TRACE OBJECT module is at the first perimeter point of the candidate object. The center of mass coordinate and the row-position and column-position coordinate values of the extremum points are then calculated as shown in block F of FIG. 27A. Decision diamond G then asks if the center of mass is an interior point. If it is not, then traced object is INVALID as shown in block H. If the answer to decision diamond G is yes, the module goes to decision diamond I, which asks if the candidate object area is too large. If it is, the traced object is invalid as indicated by block J of FIG. 27A.

If the candidate object area is not too large, then a shape factor is calculated as shown in block K in FIG. 27B. The definition of the shape factor may vary, depending on the geometry of the object being identified. For instance, the definition of the shape factor for circular objects is:

$$\text{Shape Factor} = 1 - \frac{P^2}{4\pi A} \qquad (8)$$

where: P is the perimeter of a candidate object; and
A is the area of the candidate object.
TRACE OBJECT then checks if the shape factor is within a predetermined range as contained in the driver as shown in decision diamond L in FIG. 27B. If the shape factor does not fall within the predetermined range, then the traced object is INVALID as illustrated by block M of FIG. 27B. If the shape factor falls within the predetermined range, then the candidate object is added to the list of valid objects maintained by the kernel as shown in block N.

The step of identifying a group of potentially redundant objects in an image of the first and fourth embodiments also comprises the sub-step of validating the candidate object having the valid object predetermined attribute value to identify the potentially redundant objects. This sub-step is done to identify potentially redundant objects. The validating sub-step includes the sub-steps of calculating the candidate object attribute values and comparing the candidate object attribute values to the valid object predetermined attribute values to validate candidate objects. The calculating sub-step further includes the sub-step of storing the candidate object attribute values. Part of the validating sub-step is performed by the TRACE OBJECT module. In the first embodiment of the present invention as described herein, TRACE OBJECT uses only size and shape factor as valid object predetermined attribute values. In general, other attribute values may be used for the valid object predetermined attribute values.

In order to validate candidate objects, the method of the present invention employs a driver and a kernel for validating candidate objects. The driver stores the attribute values of the valid object, where each value represents the definition of a valid object, e.g., color, edge contrast, area, shape, etc. The driver of the present invention is specific to a given application. In an object-oriented environment, it is straightforward in many instances to describe an object via a list of attributes such as size, shape, color, etc. For more complex objects, where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object is used to drive the searching process, which in turn identifies further candidate objects.

The driver drives the kernel. The kernel performs several functions. It automatically calculates an entropically selected threshold gray level value, searches the image and calculates the attribute values for a candidate object. In addition, it performs a validity check on candidate objects by comparing the attribute values of the candidate objects with the predetermined attribute values for the valid objects, which, as noted above, are contained in the driver.

The entropic thresholding method as described thus far can be referred to as a screening process. For example, it can be used to screen for the presence of pathological bacteria in food or in blood or soil samples. A screening process results in a yes—no answer; absolute quantitation is not necessary. In this case, the method of the present invention may be used to identify objects contained within each other, such as void objects contained within non-void objects. For a more stringent identification process, it is necessary to recursively apply entropic thresholding. By so doing, searching and validation are performed recursively. When these steps are done, the method of the first embodiment resolves multiple identifications of objects after a recursive search for all objects is completed.

The recursive version of entropic thresholding may further comprise the steps of subdividing the gray level histogram into an upper histogram and a lower histogram using the entropic threshold gray level which was selected to maximize the entropy function of the histogram as an upper delimiter and a lower delimiter. The selection, searching, validating and subdividing steps are recursively repeated for each of the upper and lower histograms. The repetition of the selection step selects a next successive entropic threshold gray level, thereby recursively partitioning the gray level histogram to identify the valid objects until a predetermined minimum number of new valid objects is identified. In the preferred implementation of this application, the predetermined minimum number is zero. However, there may be cases where the predetermined number is greater than zero, such as when a complete identification is not required. In addition, other criteria may be selected to stop a recursion, such as minimum gray level partition width.

Figure 28A:
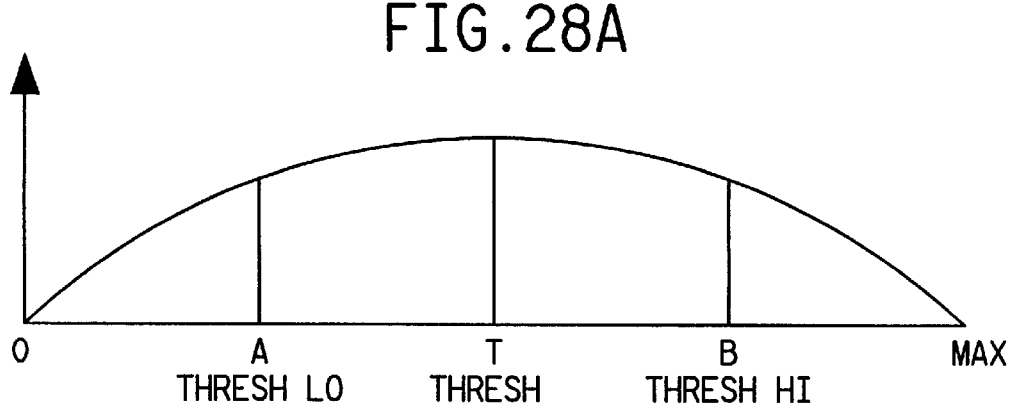
FIGS. 28A–28C are original, upper and lower gray level histograms, respectively, of an image.
Figure 28B:
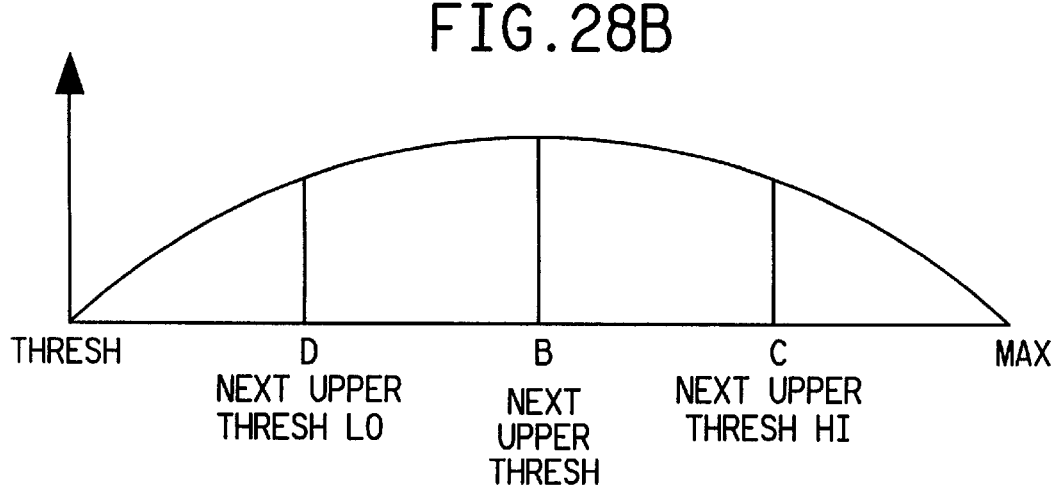
Figure 28C:
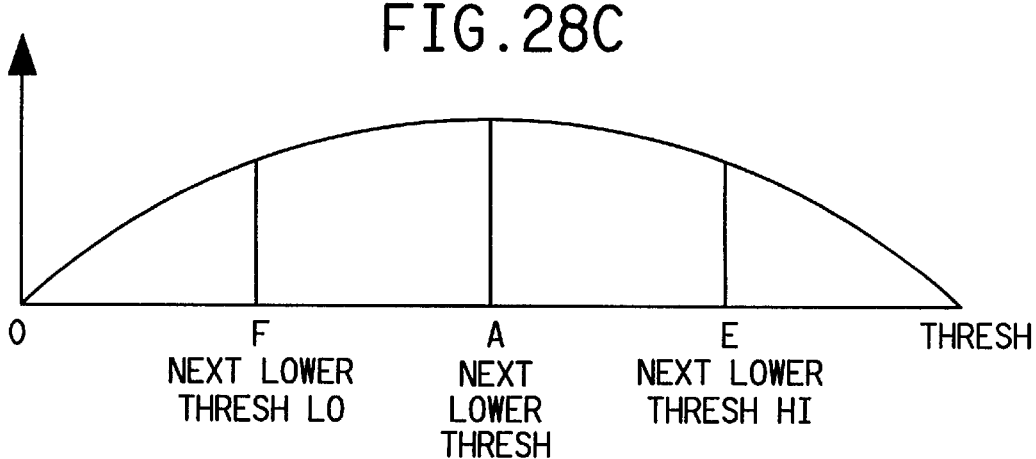

FIGS. 28A–28C illustrate the concept of subdividing a histogram into an upper histogram and a lower histogram. An original histogram is shown in FIG. 28A. THRESH, as shown at T in FIG. 28A, is the entropically selected threshold gray level for the gray level histogram corresponding to the gray level region between the minimum gray level being searched and the maximum gray level being searched. For the original histogram as shown in FIG. 28A, the minimum gray level being searched is zero and the maximum gray level being searched is MAX. THRESH HI, as shown at B, is the entropically selected threshold gray level for the gray level histogram corresponding to the gray level region between THRESH and MAX. THRESH LO, as shown at A, is the entropically selected threshold gray level for the gray level histogram corresponding to the gray level region between zero and THRESH.

According to the recursive version of the entropic thresholding method, the subdividing, selection, searching and validating steps are then recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less than or equal to the predetermined minimum number.

The upper histogram is shown in FIG. 28B. The repetition of the subdividing step subdivides the upper histogram into a next successive upper and lower histogram as shown in FIG. 28B. The repetition of the selection step for the upper histogram selects a next upper successive entropic threshold gray level value, as shown at B in FIG. 28B. Thus, point B, which was THRESH HI in the original histogram, becomes the threshold for the upper histogram, or NEXT UPPER THRESH. In FIG. 28B, the minimum gray level value being searched is now THRESH and the maximum gray level value being searched is now MAX. The NEXT UPPER THRESH HI, shown at C, is the entropically selected threshold gray level value for the gray level histogram corresponding to the gray level region between B and MAX. The NEXT UPPER THRESH LO, shown at D, is the entropically selected threshold gray level value for the gray level histogram corresponding to the gray level region between THRESH and B. The selection, searching and validating steps are then repeated recursively using the next upper successive entropic threshold gray level value, B, as the entropic threshold gray level value.

FIG. 28C shows the lower histogram. The repetition of the subdividing step subdivides the lower histogram into a next successive upper and lower histogram as shown in FIG. 28C. The repetition of the selection step for the lower histogram selects a next lower successive entropic threshold gray level value, as shown at A in FIG. 28C. Thus, point A, which was THRESH LO in the original histogram, becomes the threshold for the partitioned lower histogram, or NEXT LOWER THRESH. In FIG. 28C, the minimum gray level value being searched is now zero and the maximum gray level value being searched is now THRESH. The NEXT LOWER THRESH HI, shown at E, is the entropically selected threshold gray level value for the gray level histogram corresponding to the gray level region between A and THRESH. The NEXT LOWER THRESH LO, shown at F, is the entropically selected threshold gray level value for the gray level histogram corresponding to the gray level region between zero and A. The selection, searching and validating steps are then repeated recursively for the lower histogram using the next lower successive entropic threshold gray level value, A, as the entropic threshold gray level value.

The ANALYZE module as shown in FIG. 29 constitutes the core recursive kernel of the recursive version of the entropic thresholding method as employed for the first embodiment. The ANALYZE module effectively zooms in on a specific region in gray level space to search for instances of the candidate object and recursively partitions the histogram. The first step in the ANALYZE module as shown in FIG. 29 is to calculate the entropically selected threshold gray level values THRESH, THRESH HI AND THRESH LO as described above and as shown in block A of FIG. 29. As shown in block B, the module SEARCH IMAGE is run using the gray level values contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the gray level values contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 29. With the present invention, there is some latitude in selecting the range of values of the number of attributes to be checked for in the validation step during the recursive process.

In accordance with the first and fourth embodiments of the present invention, there is provided an image analysis system for resolving redundant identifications of an object in an image. A block diagram of the system of the present invention is shown in FIG. 30. A system for resolving redundant identifications of an object in an image is shown generally at 10 in FIG. 30.

The system of the first and fourth embodiments comprises means for generating an image of the object and a background. As shown in FIG. 30, the means for generating an image of the object and the background comprises a camera 12. Although a CCD camera is generally used with the present invention, any type of camera may be used without departing from the general principles of the present invention, as noted above.

The system of the first and fourth embodiments also comprises means for digitizing and storing the image. The means for digitizing and storing the image comprises a frame grabber 14 as shown in FIG. 30. The frame grabber digitizes and stores the video image in one frame, as known to one skilled in the image processing art. Alternatively, the means for digitizing and storing the image comprises a video digitizer, which also digitizes and stores the image, although not necessarily in one frame. The system of the present invention further comprises means for displaying the image. The means for displaying the image comprises a monitor 16 as shown in FIG. 30.

The system of the first and fourth embodiments also comprises computer means. The computer means comprises a computer system 18 as shown in FIG. 30. The computer system comprises a central processing unit (CPU) and a memory. The computer means also includes a driver 20, a kernel 22 and a post-scan filter 26 as shown in FIG. 30. Driver 20 stores the definition of a non-redundant object. Entropic kernel 22 calculates an entropic threshold, searches the image for at least one potentially redundant object and identifies the redundant object. The non-redundant objects are represented by box 24 in FIG. 30. The driver and the kernel may comprise software incorporated in the memory. Alternatively, the driver and the kernel may be programmed into a programmable, read-only memory (PROM) from which the software may be retrieved. Box 28 designates the redundancy checking scheme performed by the module FILTER OBJECTS, as described above with respect to FIGS. 4A–4E. A post-scan filter is shown at 26 in FIG. 30 and performs a further validation of the non-redundant objects.

In accordance with a second embodiment of the present invention, there is provided a method of resolving redundant identifications of each identified object in an image. This method provides a quick and simplified way to check for redundancies. The method of the second embodiment is particularly useful when the image is searched multiple times and when multiple representations of a single object are identified. The method of the second embodiment resolves multiple identifications of objects after a recursive search for all objects is completed. As in the first embodiment, the method of the second embodiment may alternatively be useful for identifying void, or donut-shaped objects when only a single search of the image is performed. Further, the method of the second embodiment has been found to be valuable in resolving several distinct objects where other image analysis methods have identified a single object.

Figure 31:
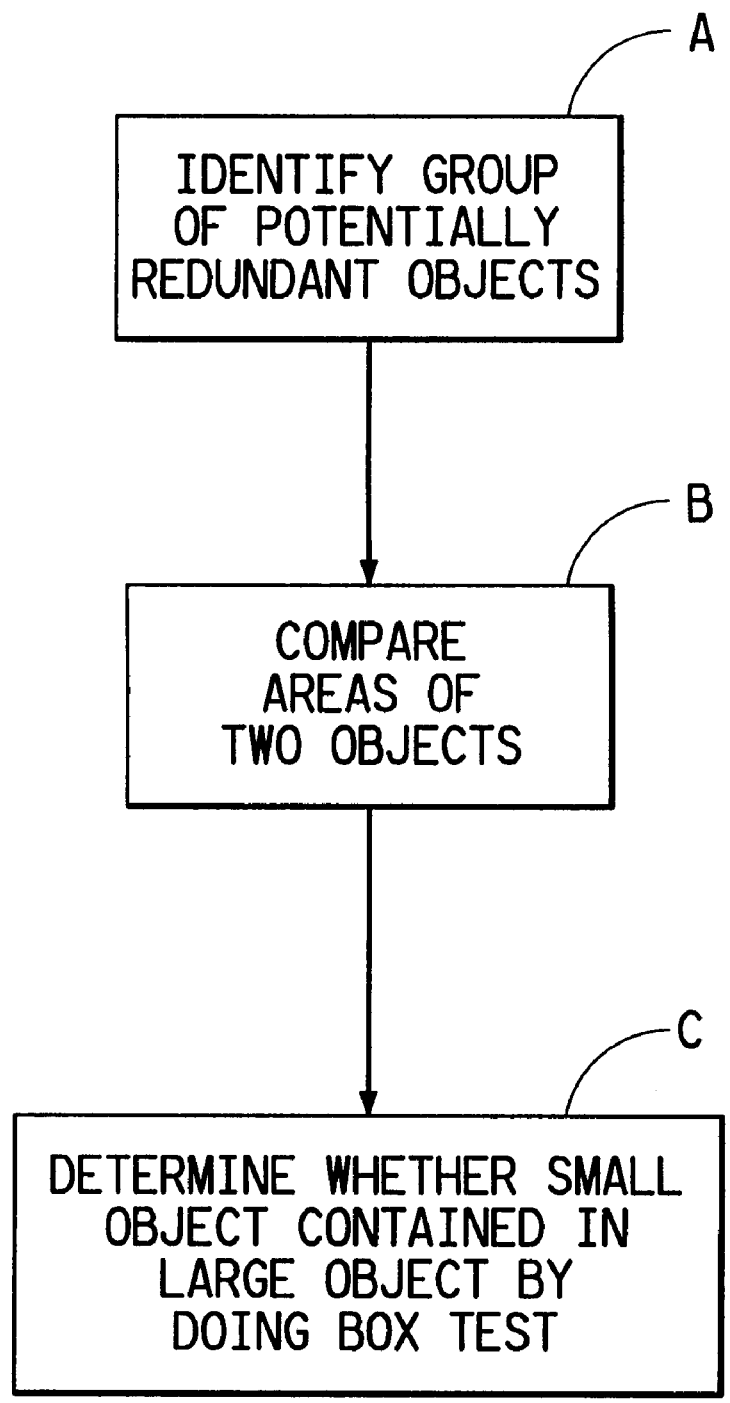
FIG. 31 is a block diagram showing the steps of the overall method according to a second embodiment of the present invention.

A system such as that used in FIG. 30 may be used to perform the method of the second embodiment. The steps of the method of the second embodiment are shown generally in FIG. 31. The method comprises the step of identifying a group of potentially redundant objects. This step is shown in block A of FIG. 31. This step may be done in a variety of ways, as described above with respect to the first embodiment.

The method of the second embodiment also comprises the step of comparing the area of two identified objects. This step is shown in block B of FIG. 31. One of the objects is designated as a relatively larger object as compared to the other object, and the other object as a relatively smaller object as compared to the larger object. The method also comprises the step of determining whether the smaller object is contained within the larger object. This step is shown in block C of FIG. 31. This step is done by the box test as discussed above with respect to FIG. 5 and the module SET STATUS as described above with respect to FIG. 6. Specifically, this determination step is done by determining the four extremum points of the larger object, where each extremum point has a row-position coordinate value and a column-position coordinate value. This step is done as described with respect to FIGS. 27A–27B above. The determination step is also done by constructing a rectangle bounding the larger object by using the row-position coordinate value and the column-position coordinate values of the four extremum points. This step is done as described with respect to FIGS. 5 and 6 as described above.

The method of the second embodiment further comprises the step of designating the smaller object as contained within the larger object if the predetermined point of the smaller object is contained within the rectangle, thereby resolving redundant identifications of each identified object in the image. This step is done as described with respect to FIGS. 5 and 6 above. The predetermined point is contained within the rectangle bounding the larger object if both the following conditions are met. First, the row-position coordinate value of the predetermined point of the smaller object lies between the minimum and the maximum values for the row-position coordinate values of the rectangle bounding the larger object. Second, the column-position coordinate value of the predetermined point of the smaller object lies between the minimum and maximum values for the column-position coordinate values of the rectangle bounding the larger object. This is determined as described above with respect to FIGS. 7 and 13 above.

Further in accordance with a third embodiment of the present invention, there is provided a method for resolving redundant identifications of a valid object having at least one predetermined attribute value in a background. The method of the third embodiment performs redundancy checking as it performs validation at each stage of multiple searching, such as recursion, in contrast to the first and second embodiments, which do redundancy checking at the end of multiple searching. The method of the third embodiment is particularly useful when the image is searched multiple times and when multiple representations of a single object are identified. Alternatively, as in the first and second embodiments, the method of the third embodiment may be useful for identifying void, or donut-shaped objects when only a single search of the image is performed. Further, the method of the third embodiment has been found to be valuable in resolving several distinct objects where other image analysis methods have identified a single object, as in the first embodiment.

Figure 32:
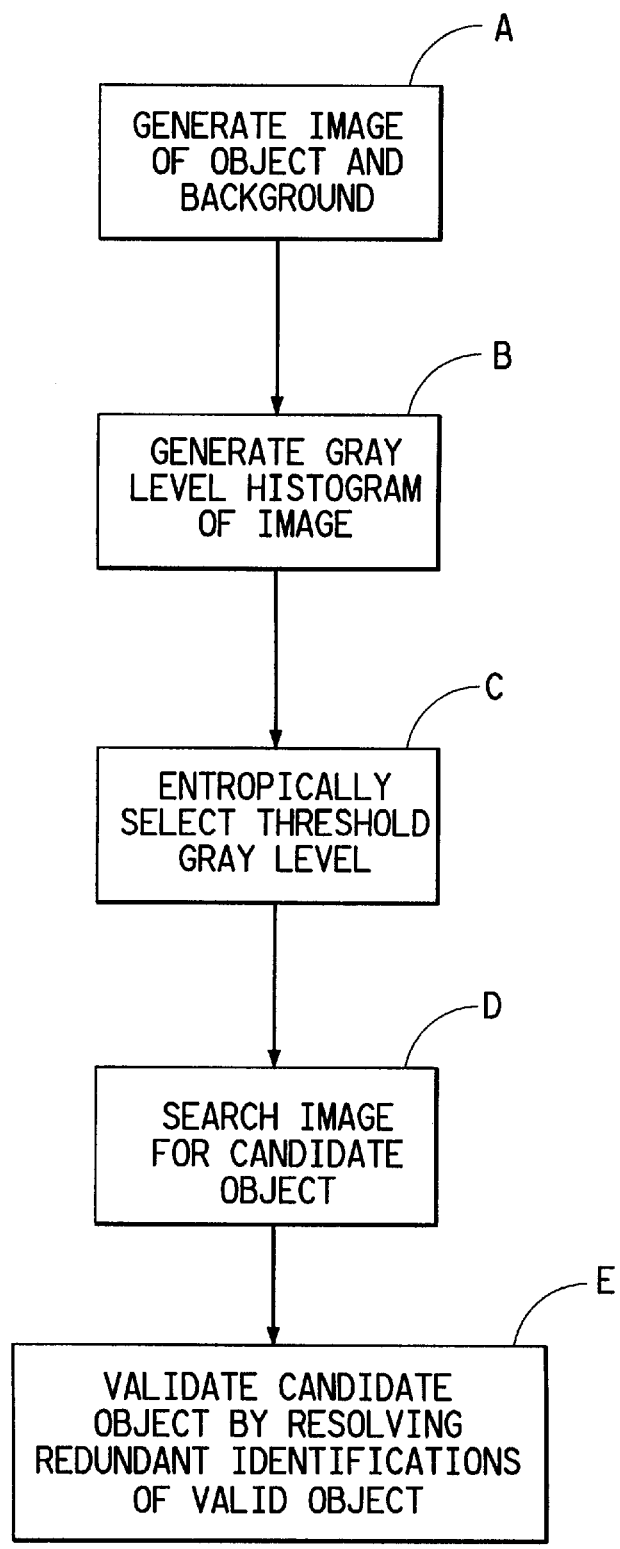
FIG. 32 is a block diagram showing the steps of the overall method according to a third embodiment of the present invention.

FIG. 32 is a block diagram showing the overall method of the third embodiment of the present invention. As shown in block A of FIG. 32, the first step of the method of the third embodiment is to generate an image of an object and a background. This step is done as described above with respect to the first embodiment.

The redundancy resolving method of the third embodiment also comprises the step of generating a gray level histogram of the image, where the gray level histogram has an entropy function. This step is shown in block B of FIG. 32 and is done as described above with respect to FIG. 22.

The redundancy resolving method of the third embodiment also comprises the step of entropically selecting a threshold gray level value such that the entropy function of the histogram is maximized. This step is shown in block C of FIG. 32 and is performed as described above with respect to FIG. 23.

The redundancy resolving method of the third embodiment also comprises the step of searching the image using the entropically selected threshold gray level value for at least one candidate object, where the candidate object has at least one candidate object attribute value. This step is shown in block D of FIG. 32 and is performed as described above with respect to FIGS. 25–27.

The redundancy resolving method of the third embodiment also comprises the validating the candidate object having the valid object predetermined attribute value to identify the valid object. This step is shown in block D of FIG. 32 and is performed as described above with respect to FIGS. 25–27.

In the method of the third embodiment, one performs a redundancy check after each scan during the recursive process. In order to perform the redundancy checking sub-step after each scan, valid objects are classified as either homogeneous or inhomogeneous. Here homogeneity refers to the uniformity of the gray level values of the interior points. Inhomogenous objects are described in the example given below, where color colonies are identified. Valid objects are also further classified as either a relatively larger valid object or a smaller valid object. In addition, valid objects are classified as either contained in another valid object (interior valid objects), or never contained in another valid object (exterior valid objects).

According to the third embodiment of the present invention, the validating step may be performed to resolve redundant identifications of inhomogeneous objects. When it is, the validating step includes the sub-step of deleting the larger object when the larger object contains more than one smaller object. Also, when the redundancy checking sub-step is performed to delete inhomogeneous valid objects, the method of identifying valid objects also includes the sub-steps of calculating the average edge contrast of the larger and the smaller valid objects. The sub-step of calculating the average edge contrast of the larger and smaller objects is performed by a module, EDGE CONTRAST, as illustrated below in FIG. 33. The sub-step of deleting the object having the smaller edge contrast when the larger object contains only one smaller object is performed by a module, CHK LIST, as shown in FIGS. 34A–34D for inhomogeneous valid objects.

In order to calculate the edge contrast of the smaller and the larger objects, the extremum points must first be calculated. This is done by the module TRACE OBJECT as illustrated with respect to FIGS. 27A–27B above. For each extremum point, the local gray level value difference between that extremum point and the neighboring extremum point is then calculated. The edge contrast of the object, whether smaller or larger, is then calculated to be the sum of the gray level differences of each of the extremum points. These steps are performed by the module EDGE CONTRAST as illustrated in the flow chart of FIG. 33.

In order to calculate edge contrast, the four extremum points of an object, as illustrated in FIGS. 5 and 12, are determined by a module GET PERIM, as described above with respect to FIG. 11. As shown in block A of FIG. 33, the current extremum point is set to the first extremum point, and the edge contrast is set to zero. Decision diamond B asks whether the current extremum point is beyond the last extremum point. If it is, then the module EDGE CONTRAST is done, as shown in oval C. The local gray level value difference between the current extremum point and the local exterior is then calculated as shown in block D. The edge contrast is then set to equal the edge contrast plus the gray level value difference as shown in block E. The current extremum point is then incremented as shown in block F. The module EDGE CONTRAST then returns to decision diamond B, and the loop through B, D, E and F continues until the current extremum point is beyond the last extremum point. At this point, the module EDGE CONTRAST is done, as shown in oval C.

Figure 33:
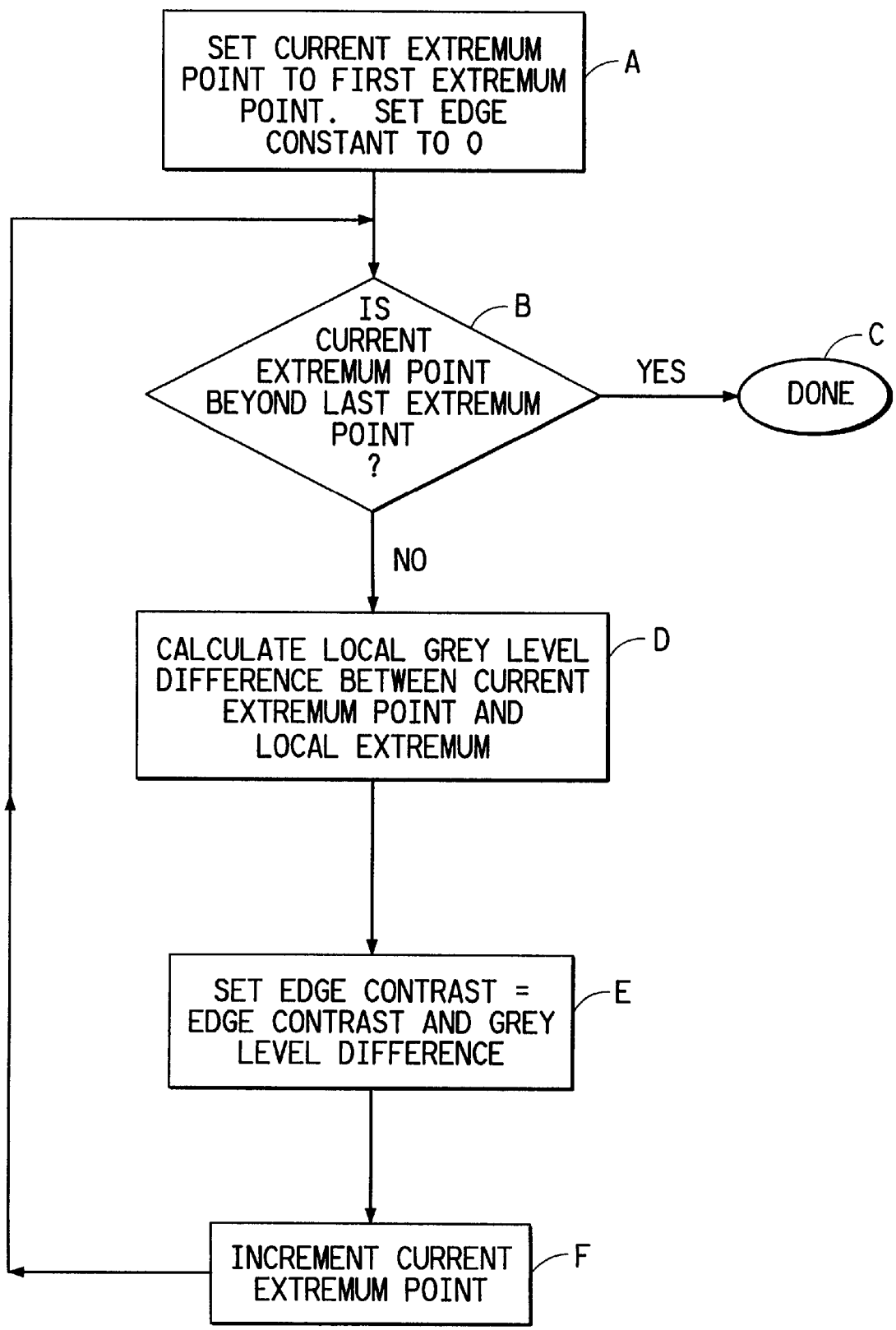
FIG. 33 is a flow chart illustrating the steps of a module, EDGE CONTRAST, which is used to calculate the edge contrast of an object in the third and fourth embodiments.

The module CHK LIST as illustrated in FIGS. 34A–34D uses the edge contrast information calculated as shown in FIG. 33 in order to delete the object having the smaller edge contrast when the larger object contains only one smaller object. As shown in block A of FIG. 34A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

If the object count is greater than the previous count, CHK LIST advances to the first object in the total object list as shown in block A of FIG. 34B. Decision diamond B of FIG. 34B asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B–E continues until the next object of block E is the last object, at which point CHK LIST advances to the first object in the total object list as shown in block F. The object status attribute values for all the objects is set to "TRUE" as shown in block G. "TRUE" in this context means valid, and "FALSE" means invalid. Decision diamond H then asks if CHK LIST is at the last object.

Figure 34A:
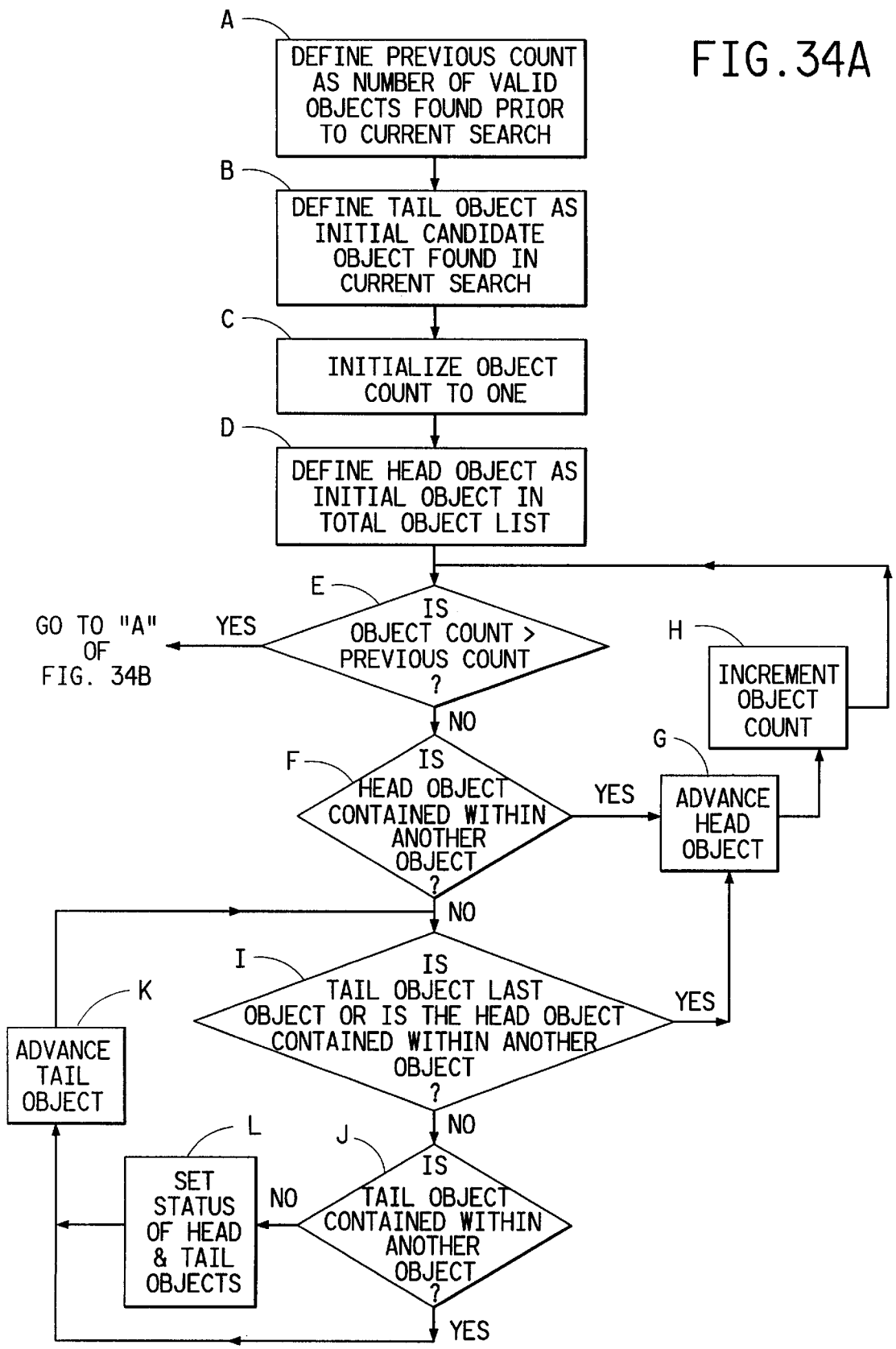
Figure 34C:
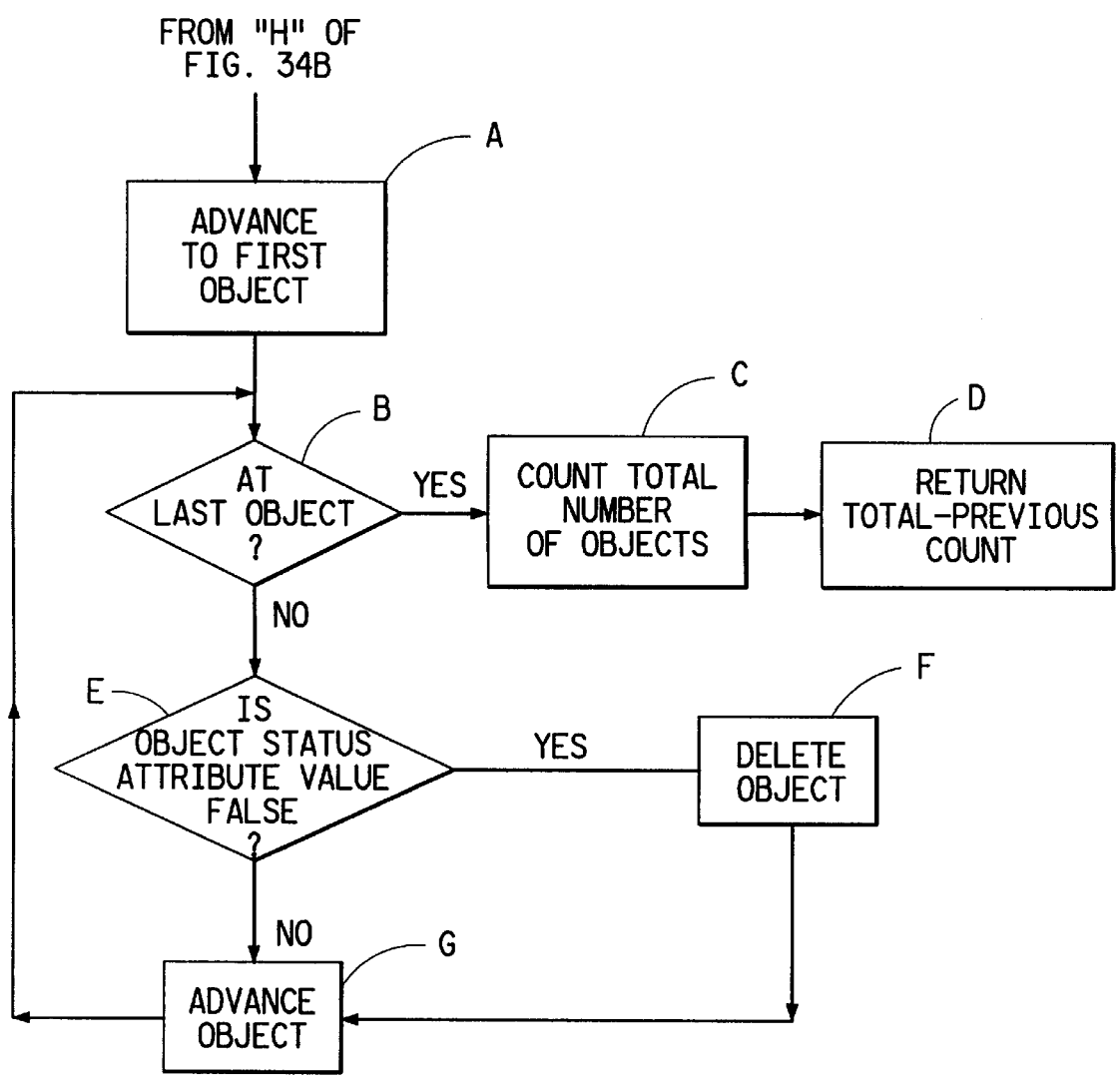

If it is, CHK LIST advances to the first object as shown in block A of FIG. 34C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is FALSE. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Figure 34D:
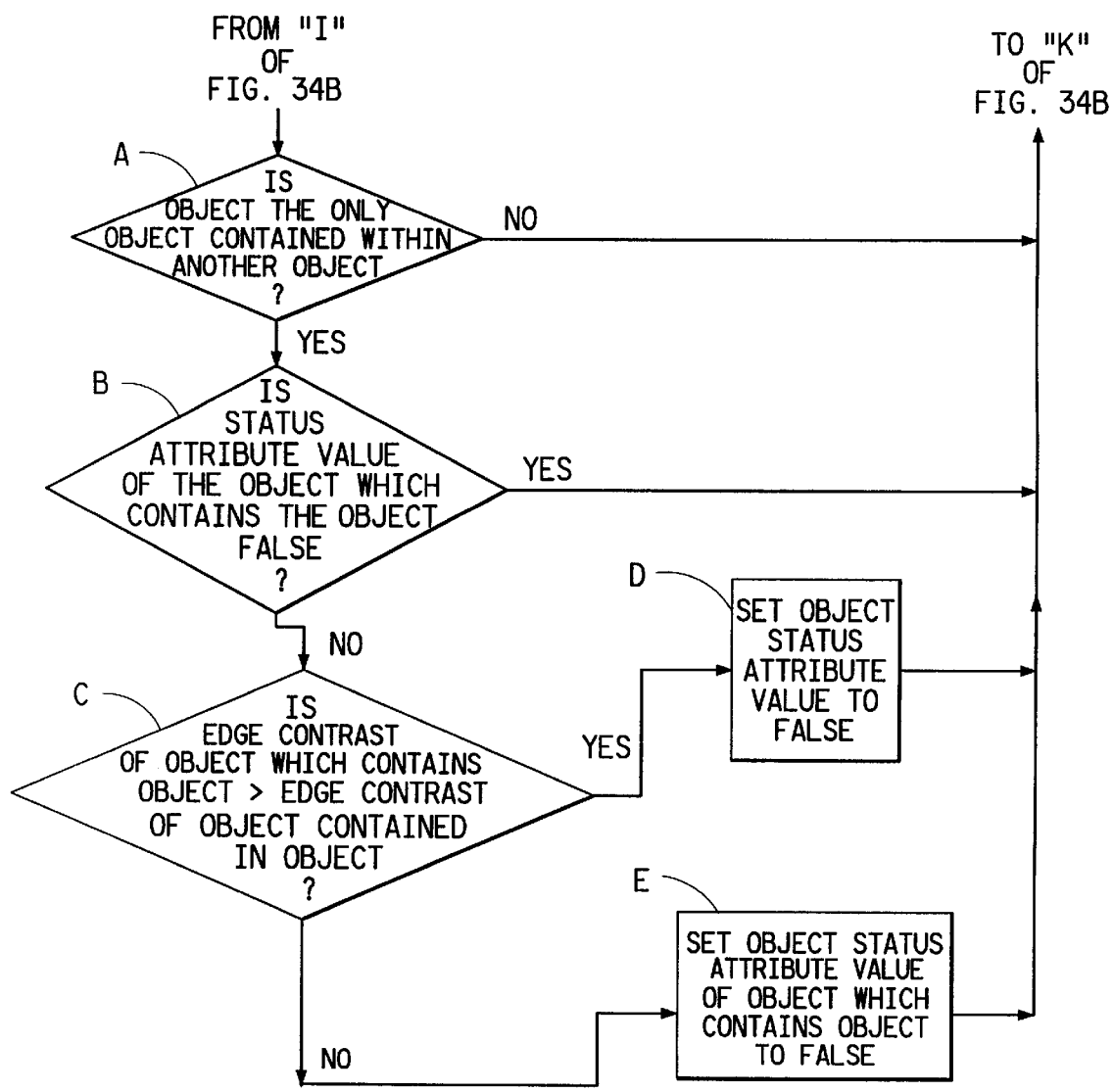

Returning to decision diamond H in FIG. 34B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 34D asks if the object is the only object contained within another object. If not, then CHK LIST advances to the next object as shown in block K of FIG. 34B, and the loop through H–K of FIG. 35B and A of FIG. 34D is repeated until the object is the only object contained within another object. If the object is the only object contained within another object, then decision diamond B asks whether the status attribute value of the object which contains the object is false. If so, then CHK LIST advances to the next object as shown in block K of FIG. 34B, and the loop through H–K of FIG. 34B and A–B of FIG. 34D is repeated until the status attribute value of the object which contains the object is not FALSE. At this point, decision diamond N asks whether the edge contrast of the object which contains another object is greater than the edge contrast of the object. If so, then CHK LIST sets the object status attribute value to FALSE as shown in block D, it advances to the next object as shown in block K in FIG. 34B, and the loop through H–K of FIG. 34B and A–C of FIG. 34D is repeated until the edge contrast of the object which contains another object is not greater than the edge contrast of the object contained in another object. Then CHK LIST sets the status of the object which contains the object to FALSE as shown in block E of FIG. 34D, and it advances to the next object as shown in block K of FIG. 34D until it is at the last object.

Returning to decision diamond E in FIG. 34A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 34B as explained above. If the incremented count is not greater than the previous count, the loop through F, G, H and E in FIG. 34A is repeated until the head object is not contained within another object. Then CHK LIST advances to decision diamond I of FIG. 34A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 34A, and the loop through I, J and K is repeated until the tail object is not contained within another object. Then CHK LIST goes to the module SET STAT as shown in FIG. 35 to set the status of the head and tail objects as shown in block L of FIG. 34A.

The redundancy checking sub-step further includes the sub-steps of comparing the areas of a plurality of valid objects and designating one of the valid objects as a larger valid object and the other of the first and second valid objects as a smaller valid object and determining whether the smaller valid object is contained in the larger valid object.

Figure 35:
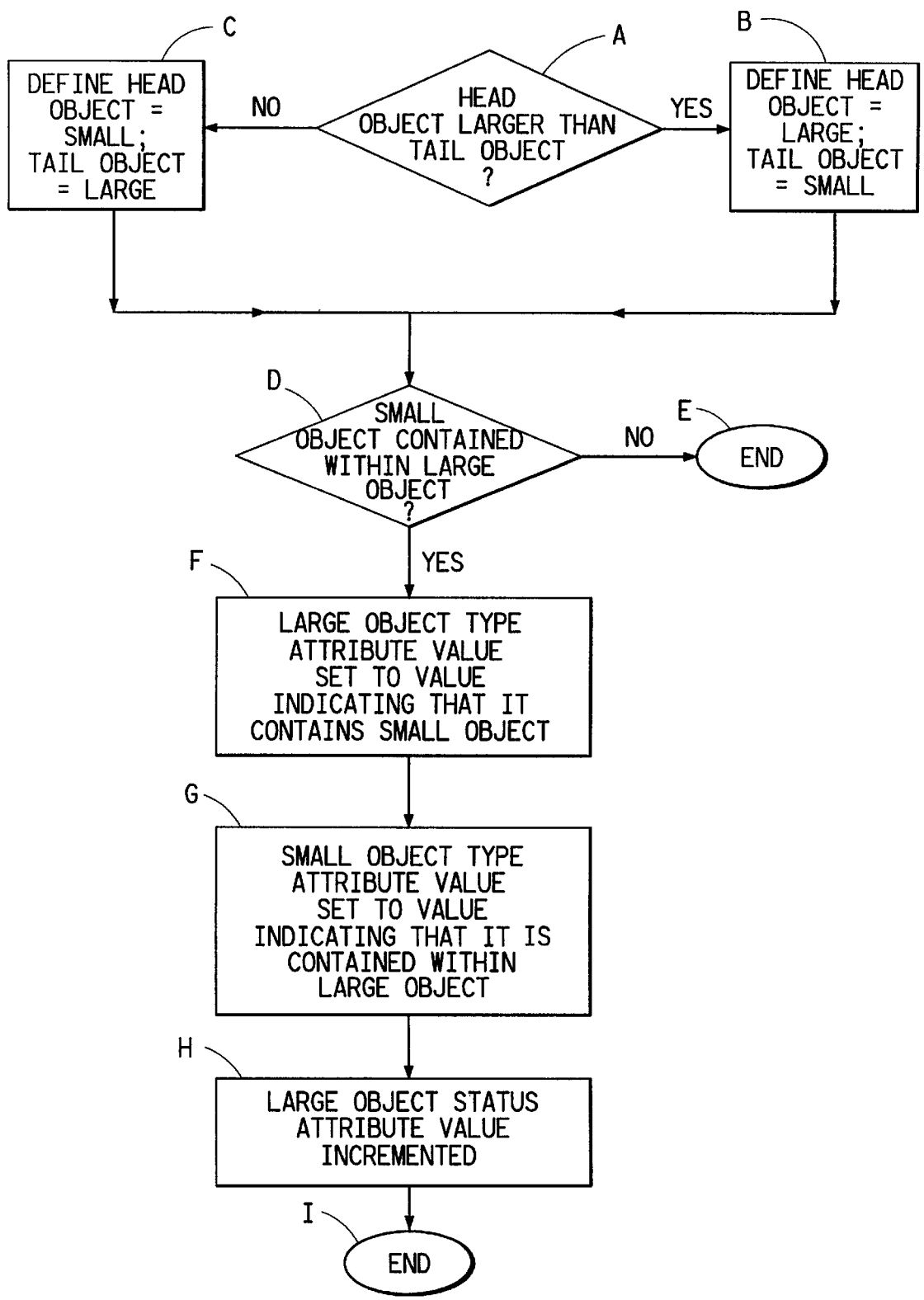
FIG. 35 is a flow chart showing the steps of a module, SET STAT, which is used with the module CHK LIST as shown in FIGS. 34A–34D.

The module SET STAT as shown in FIG. 35 performs, for inhomogeneous objects, the sub-steps of comparing the areas of a plurality of valid objects and designating one of the valid objects as a larger valid object and the other of the first and second valid objects as a smaller valid object and determining whether the smaller valid object is contained in the larger valid object. The determination of whether the smaller valid object is contained in the larger valid object is performed by the box test, as described above.

Returning to the specifics of the module SET STAT as shown in FIG. 35, the first step of SET STAT as shown in decision diamond A is to ask whether the head object is larger than the tail object. If so, then the head object is defined as the larger valid object, and the tail object is defined as the smaller valid object as shown in block B. If the head object is not larger than the tail object, then the head object is defined as the smaller valid object, and the tail object is defined as the larger valid object as shown in block C. Then decision diamond D asks whether the smaller object is contained within the larger object. If not, then SET STAT is finished, as indicated by END oval E. If the smaller object is contained within the larger object, then the larger object type attribute value is set to a value indicating that it contains a smaller object as shown in block F. The type attribute value tells SET STAT whether an object is contained within another object or whether the object contains another object. Also, the smaller object type attribute value is set to a value indicating that it is contained within a larger object as shown in block G. Finally, the larger object status attribute value is incremented as shown in block H. SET STAT is then finished, as indicated by the END oval I and returns to block L of FIG. 34A.

According to the third embodiment of the present invention, the redundancy checking sub-step may alternatively be performed to resolve redundancies in the homogeneous objects. When it is, the third embodiment further includes the sub-steps of calculating the edge contrast of the larger and smaller valid objects and deleting the larger object, where the average edge contrast of the larger object is less than the average edge contrast of the smaller object and is less than a predetermined minimum edge contrast. The redundancy checking sub-step for resolving redundancies also includes the sub-steps of calculating the edge contrast of the larger and smaller valid objects and deleting the smaller object where the average edge contrast of the larger object is greater than the average edge contrast of the smaller object and is greater than the predetermined minimum contrast. The sub-steps of calculating the average edge contrast are performed by the module EDGE CONTRAST as described above with respect to FIG. 33. The deleting sub-steps are performed using the module CHK LIST for homogeneous objects as illustrated by the flow charts of FIGS. 36A and 36B.

Figure 36A:
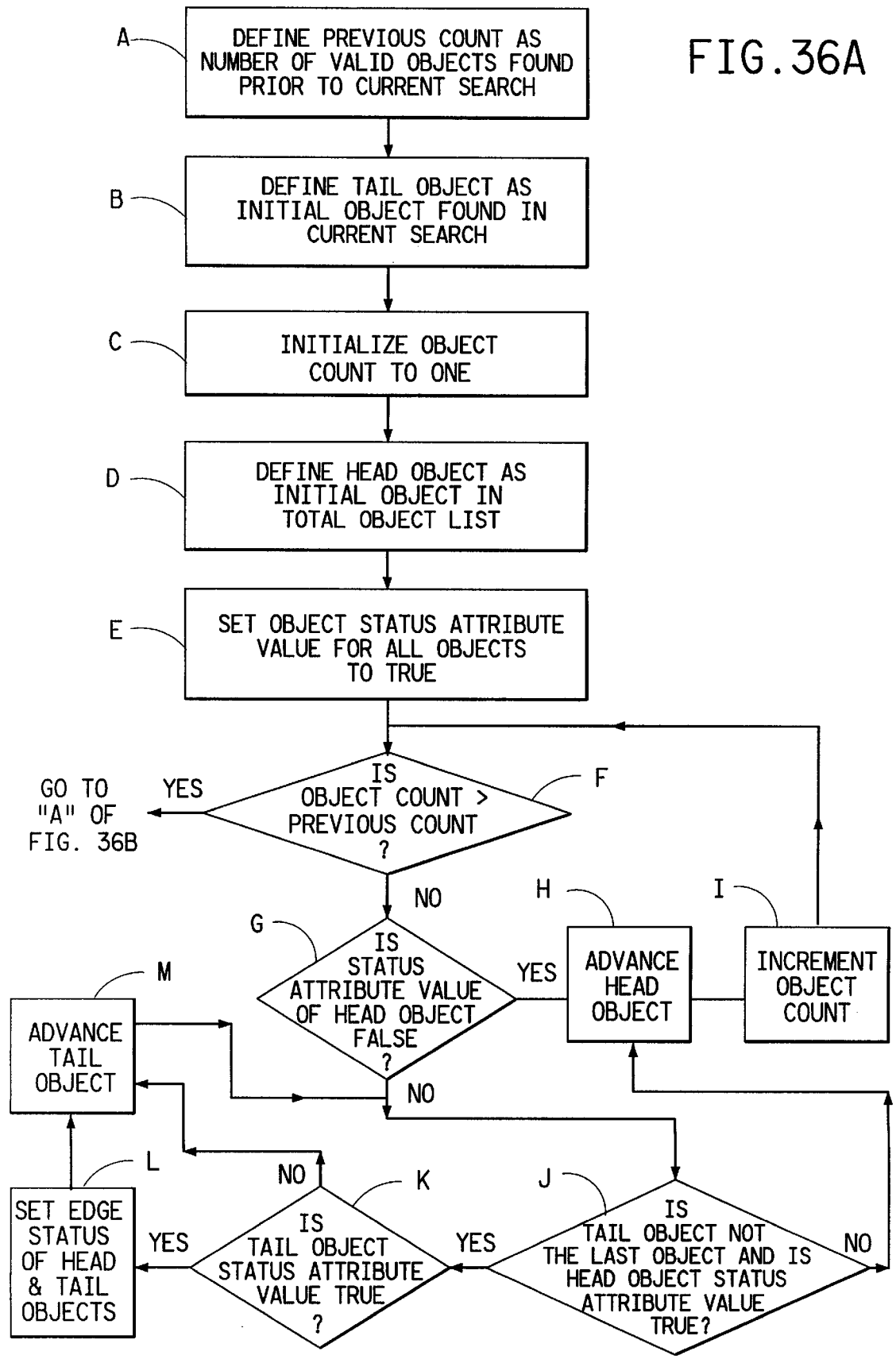
FIGS. 36A–36B are a flow chart showing the steps of a module, CHK LIST, which is used to resolve redundancies in homogeneous objects in the third embodiment.

As shown in block A of FIG. 36A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to TRUE for all objects as shown in block E. Decision diamond F asks whether the object count is greater than the previous count.

Figure 36B:
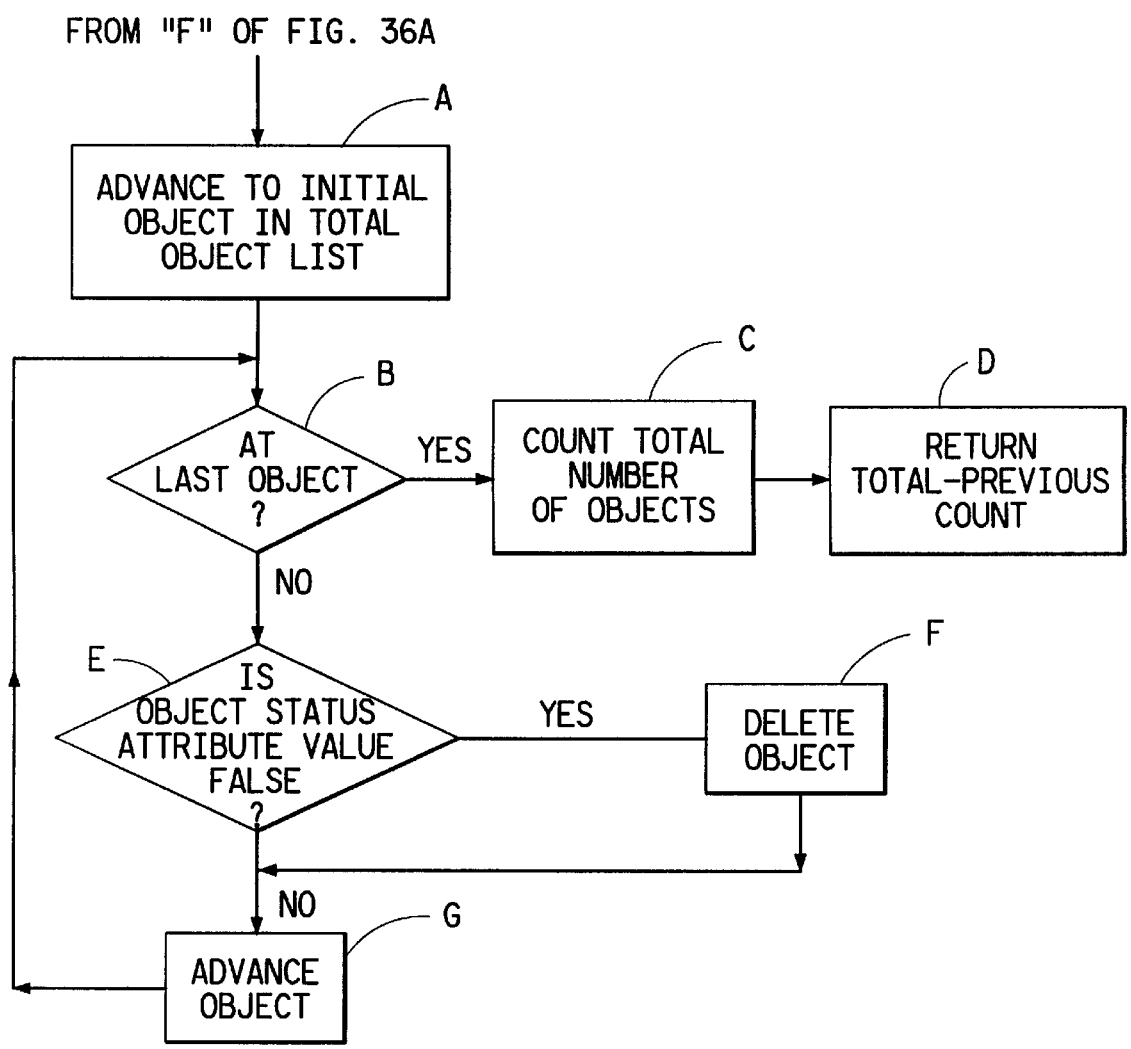

If the object count is greater than the previous count, CHK LIST advances to the initial object in the total object list as shown in block A of FIG. 36B. Decision diamond B of FIG. 36B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is FALSE. If so, the object is deleted as shown in block F. If the object status is NOT FALSE, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 36A, if the object count is not greater than the previous count, then decision diamond G of FIG. 36A asks if the status attribute value of the head object is FALSE. If it is, then the head object is advanced as shown in block H, and the count is incremented as shown in block I. Decision diamond F then asks if the incremented object count is greater than the previous count. If so, CHK LIST advances to block A of FIG. 36B as explained above. The loop through G, H and I in FIG. 36A is repeated until the status of the object is NOT FALSE. Then CHK LIST advances to decision diamond J of FIG. 36A, which asks if the tail object is not the last object and if the head object status attribute value is TRUE. The answer to both these questions must be yes. If not, then CHK LIST advances the head object as shown in block H, and the count is incremented as shown in block I. The loop through F, G, H, I and J is repeated until the tail object is the last object and the head object status attribute value is TRUE. Decision diamond K then asks whether the tail object status attribute value is TRUE. If it is, then the edge status of the head and tail object is set as shown in block L of FIG. 36A and as shown in detail in FIG. 37 by a module SET STAT. CHK LIST then advances the tail object as shown in block M, and the loop through J, K, L and M is repeated. If the tail object status is NOT TRUE, then CHK LIST advances the tail object as shown in block M, and the loop through J, K and M is repeated.

The module SET STAT as shown in FIG. 37 performs the sub-steps of comparing the areas of a plurality of valid objects and designating one of the valid objects as a larger valid object and the other of the first and second valid objects as a smaller valid object and determining whether the smaller valid object is contained in the larger valid object as defined by the four extremum points of the larger object for homogeneous objects. As shown in decision diamond A of FIG. 37, the first step of SET STAT is to ask whether the head object is larger than the tail object. If so, the head object is defined as a larger valid object, and the tail object is defined as the smaller valid object as shown in block B. If the head object is not larger than the tail object, then the head object is defined as the smaller valid object, and the tail object is defined as the larger valid object. Decision diamond D of SET STAT then asks whether the smaller object is contained within the larger object. If not, SET STAT stops running as shown by oval E. If the smaller object is contained within the larger object, then decision diamond F asks whether the edge contrast of the larger object is greater than the edge contrast of the smaller object, and whether the edge contrast of the larger object is greater than the predetermined minimum edge contrast. If the answer to both of these questions is yes, then the larger object status attribute value is set to TRUE, and the smaller object status attribute value is set to FALSE as indicated by block G, and the module stops running as indicated by oval H. If the answer to at least one of the questions in decision diamond F is no, then the smaller object status attribute value is set to TRUE, the larger object status attribute value is set to FALSE as indicated by block I, and the module stops running as indicated by oval J.

The third embodiment of the present invention further includes the step of performing a final check for redundancies of the valid object and resolving the redundancies to prevent redundant identification of the valid object. The final redundancy checking step further includes the sub-steps of comparing the areas of a plurality of valid objects and designating one of the valid objects as a larger valid object and the other of the first and second valid objects as a smaller valid object and removing the larger valid object when the smaller valid object and the larger valid object overlap. The final redundancy checking step is performed by a module, FINAL CHK, as illustrated by the flow chart of FIGS. 38A and 38B and a module INT STAT, as illustrated by the flow chart of FIG. 39. The modules FINAL CHK and INT STAT are the same for both homogeneous and inhomogeneous objects, and are thus only illustrated once.

Figure 38A:
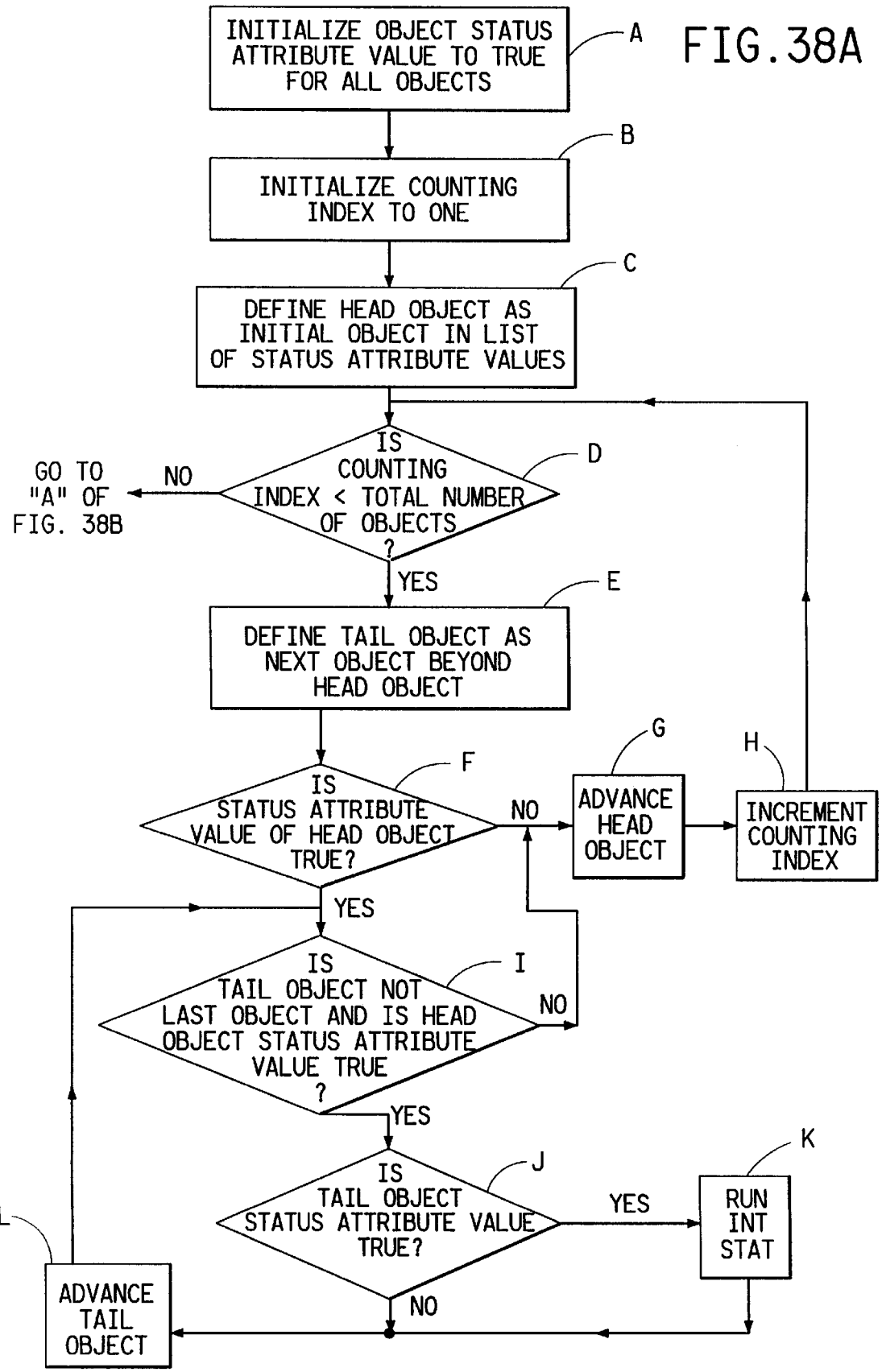
FIGS. 38A–38B are a flow chart showing the steps of a module, FINAL CHK, which is used to perform a final check to resolve redundancies in inhomogeneous and homogeneous objects in the third embodiment.

The first step of FINAL CHK is to initialize the object attribute value to TRUE for all objects as shown in block A of FIG. 38A. The counting index for counting valid objects is the initialized to one as shown in block B. The head object is defined as the initial object in a list of status attribute values as illustrated in block C. Decision diamond D then asks whether the counting index is less than the total number of objects. If not, the module FINAL CHK goes to block A of FIG. 38B.

Figure 38B:
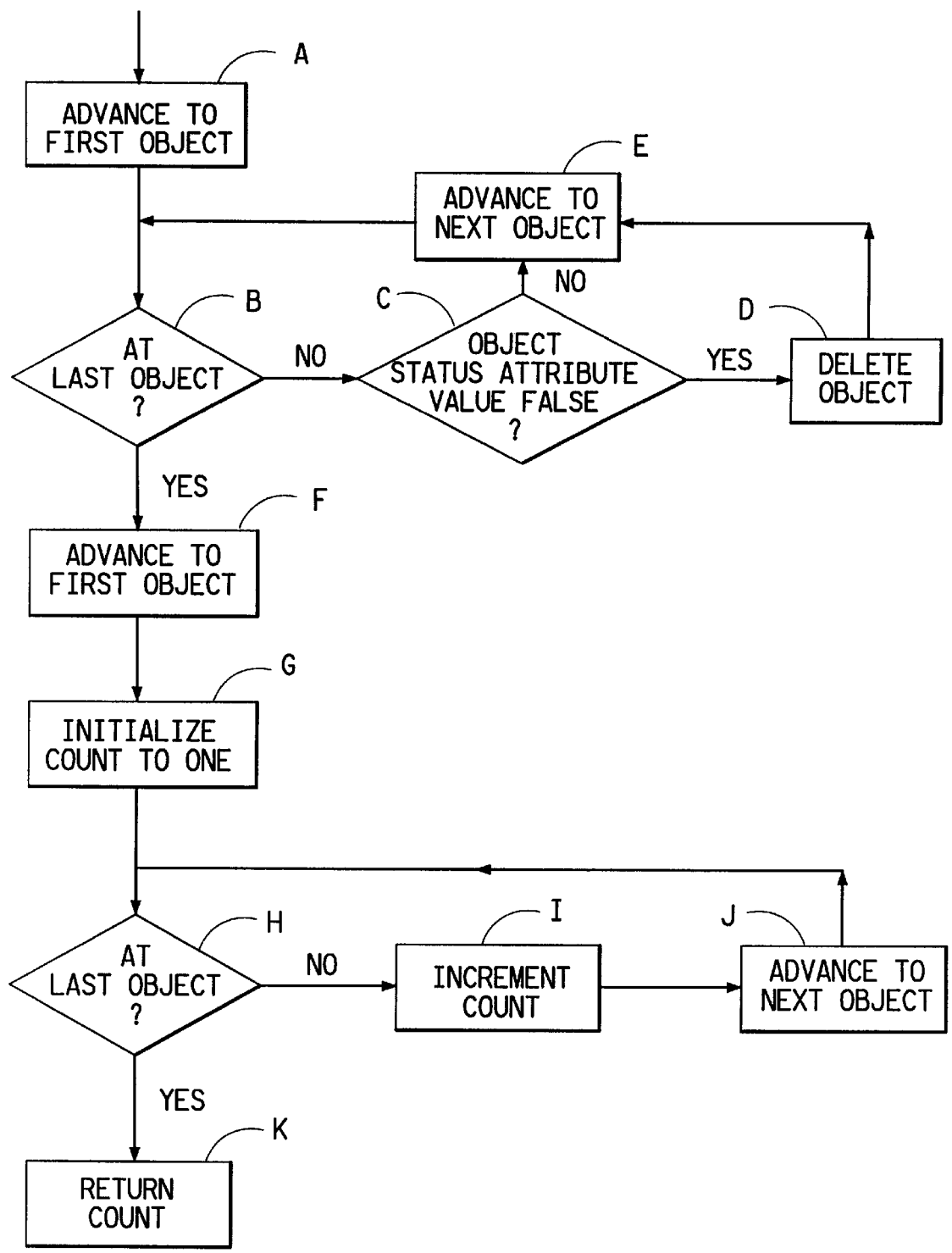

As shown in block A of FIG. 38B, FINAL CHK advances to the first object. Decision diamond B asks whether FINAL CHK is at the last object. If it is not, then decision diamond C asks whether the object status attribute value is FALSE. If not, then FINAL CHK advances to the next object as shown in block E, and decision diamond B again asks whether FINAL CHK is at the last object. The loop through B, C and E continues until FINAL CHK is at the next object. If the object status attribute value is FALSE, then the object is deleted as shown in block D. FINAL CHK then advances to the next object as shown in block E, and decision diamond B asks whether the FINAL CHK at the last object. The loop through B–E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 38B.

Returning to decision diamond D of FIG. 38A, if the counting index is less than the total number of objects, then the tail object is defined as the next object beyond the head object as shown in block E. Decision diamond F then asks if the status attribute value of the head object is TRUE. If not, the FINAL CHK advances the head object as shown in block G and increments the counting index as shown in block H. FINAL CHK then returns to decision diamond D, and the loop through D–I continues until the status attribute value of the head object is TRUE. Then decision diamond I asks whether the tail object is not the last object and whether the head object status attribute value is true. If at least one of these conditions is not met, then FINAL CHK advances the head object as shown in block G and increments the index as shown in block H. FINAL CHK then returns to decision diamond D, and the loop through D–I continues until the answer to both questions in decision diamond I is yes. Then decision diamond J asks whether the tail object status attribute value is TRUE. If not, FINAL CHK advances the tail object as shown in block L of FIG. 38A, and the loop through I, J and L is repeated until the tail object status attribute value is TRUE. Then FINAL CHK runs a module INT STAT, as shown in block K of FIG. 38A and advances the tail object as shown in block L.

Figure 39:
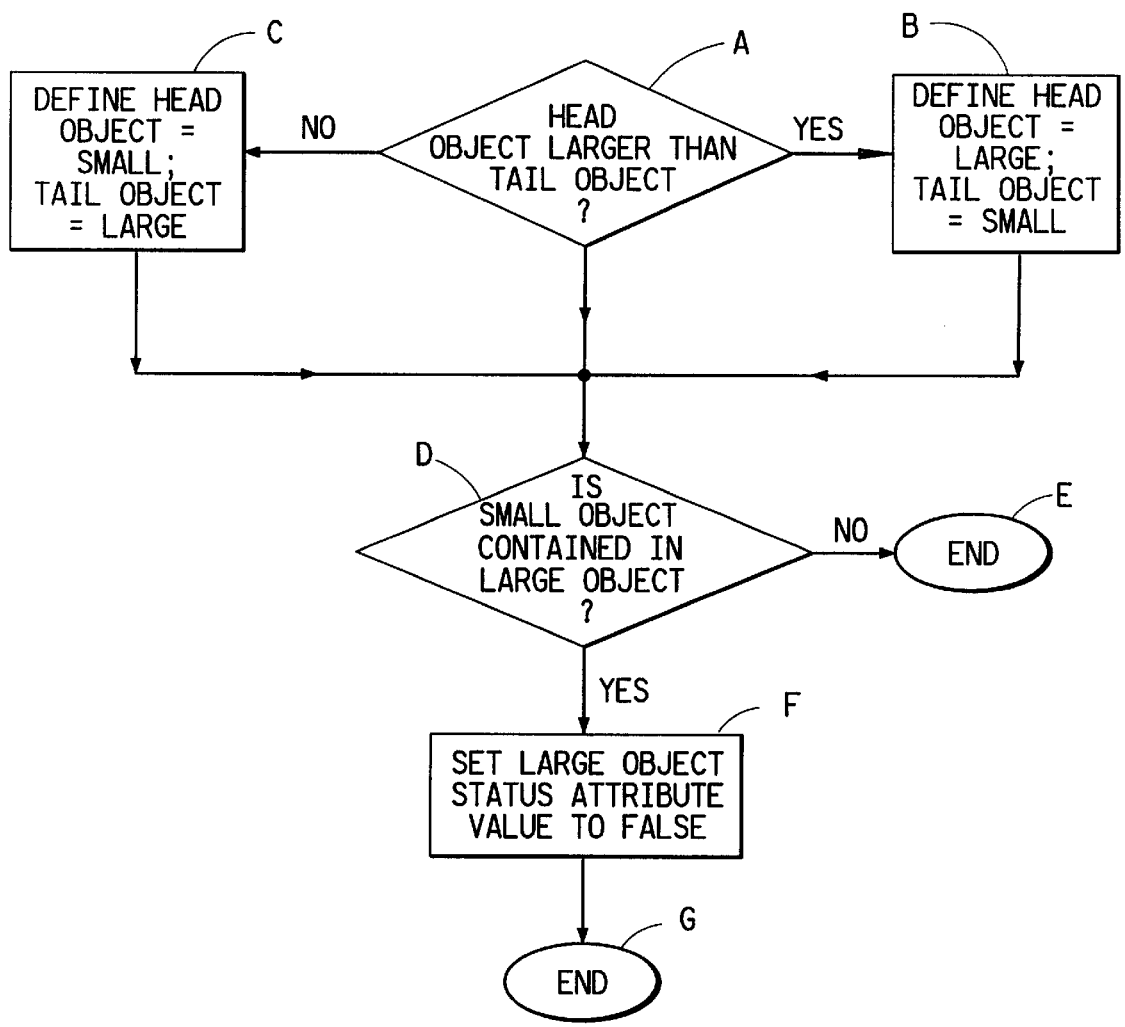
FIG. 39 is a flow chart showing the steps of a module, INT STAT, which is used with the module FINAL CHK as shown in FIGS. 38A–38B.

The steps of the module INT STAT as illustrated in block K of FIG. 38A are shown in detail in FIG. 39. Decision diamond A of FIG. 39 asks whether the head object is larger than the tail object. If so, the head object is defined as the larger valid object, and the tail object is defined as the smaller valid object as shown in block B. If the head object is not larger than the tail object, then the head object is defined as the smaller valid object, and the tail object is defined as the larger valid object as shown in block C. Decision diamond D then asks whether the smaller valid object is contained in the larger valid object. If not, then INT STAT is at its end, as shown by oval E. If the smaller valid object is contained in the larger valid object, then the larger object status attribute value is set to FALSE as shown in block F, and INT STAT is at its end as shown by oval G.

A post-scan filter, which performs a final validation using more stringent criteria contained in the driver, may be performed after the step of performing a final check for redundancies.

Figure 40:
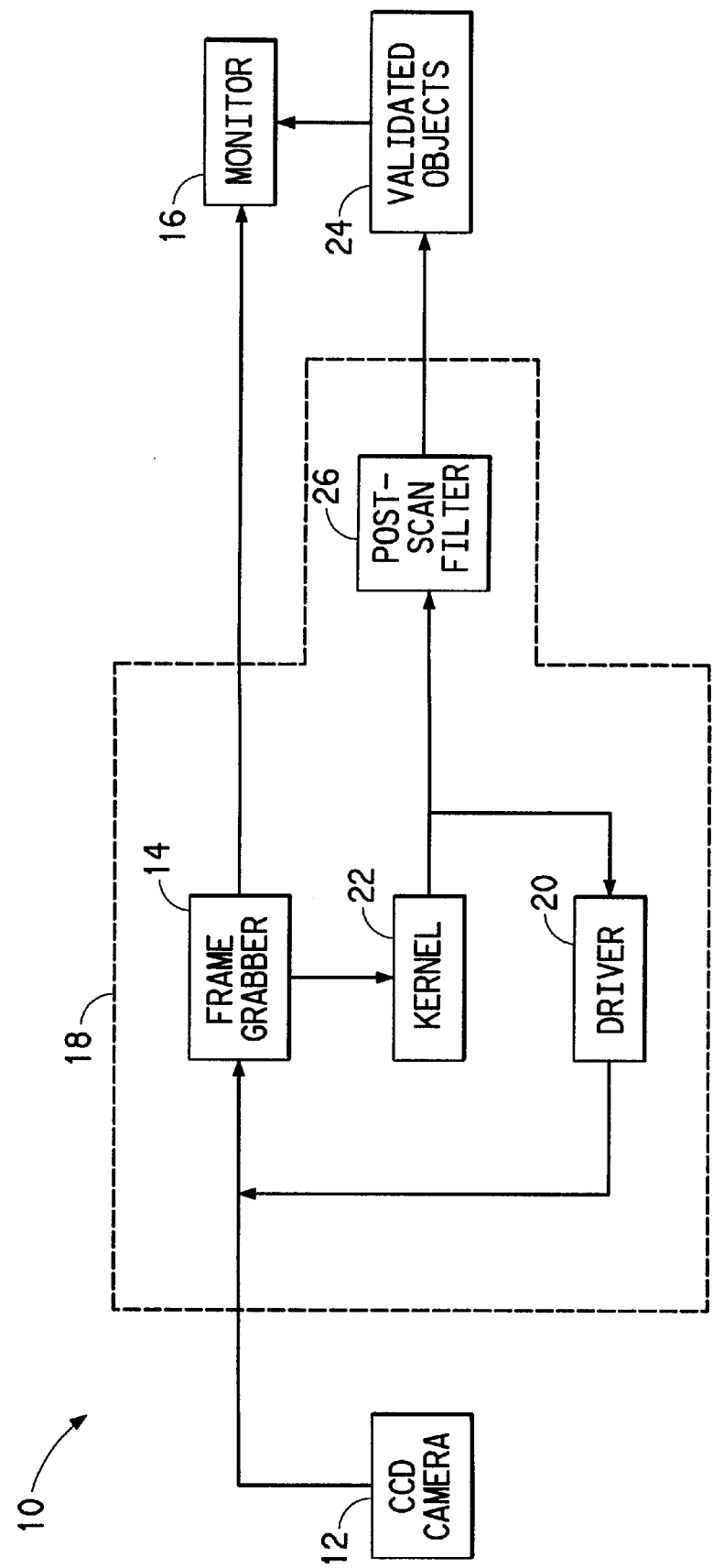
FIG. 40 is a schematic diagram showing the components of a system used with the third embodiment of the present invention.

In accordance with the third embodiment of the present invention, there is provided an image analysis system for resolving redundant identifications of an object in an image. A block diagram of the system of the third embodiment of the present invention is shown in FIG. 40. A system for resolving redundant identifications of an object in an image is shown generally at 10' in FIG. 40.

The system of the third embodiment of the present invention comprises means for generating an image of the object and a background. As shown in FIG. 40, the means for generating an image of the object and the background comprises a camera 12'. Although a CCD camera is generally used with the present invention, any type of camera may be used without departing from the general principles of the present invention, as noted above.

The system of the present invention also comprises means for digitizing and storing the image. The means for digitizing and storing the image comprises a frame grabber 14' as shown in FIG. 40. As in the first and second embodiments above, the frame grabber digitizes and stores the video image in one frame. Alternatively, the means for digitizing and storing the image comprises a video digitizer, which also digitizes and stores the image, although not necessarily in one frame. The system of the present invention further comprises means for displaying the image. The means for displaying the image comprises a monitor 16' as shown in FIG. 40.

The system of the third embodiment of the present invention also comprises computer means. The computer means comprises a computer system 18' as shown in FIG. 40. The computer system comprises a central processing unit (CPU) and a memory. The computer means also includes a driver 20', a kernel 22', a post-scan filter 26' as shown in FIG. 40. Driver 20' stores the definition of the valid object. The entropic kernel 22' generates a gray level histogram of the image and entropically selects a threshold gray level such that the entropy function of the histogram is maximized. Entropic kernel 22' also searches the image for at least one candidate object and validates the candidate object having the valid object predetermined attribute value to identify the valid object. Validation in the kernel includes redundancy checking as described with respect to FIGS. 34–39 above. The validated objects are represented by box 24' in FIG. 40. The driver and the kernel may comprise software incorporated in the memory. Alternatively, the driver and the kernel may be programmed into a programmable, read-only memory (PROM) from which the software may be retrieved. The post-scan filter is shown at 26' in FIG. 40 and performs a further validation after the redundant objects have been deleted.

Figure 41:
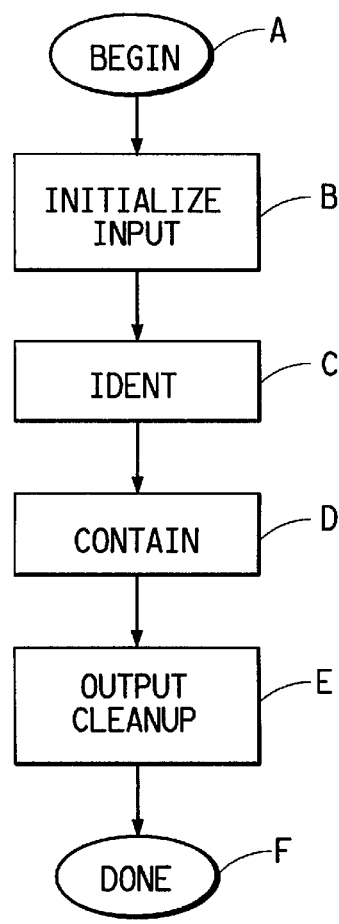
FIG. 41 is a flow chart illustrating the steps of a module, LOCATE, which performs the overall steps of a method for resolving redundant identifications of an object according to a fourth embodiment of the present invention.

The method of the fourth embodiment is conceptually similar to the method described in the first embodiment, with some differences in the architecture of the method. FIG. 41 sets forth the overall steps of a module LOCATE, which is the umbrella module for locating and resolving redundant identifications of an object in an image. LOCATE begins as shown in oval A in FIG. 41, and initializes the input as shown in block B. As shown in block C, the module LOCATE then runs a module, IDENT, which is the main module for identifying redundant objects, as will be described below with respect to FIG. 44. As shown in block D, the module LOCATE then runs a module CONTAIN, as will be described below with respect to FIG. 48, which performs the steps of the containedness check, similar to the two steps of the containedness check as described above with respect to FIGS. 5 and 12, respectively. The module LOCATE then performs output, as will be described below with respect to FIG. 59, and clean-up as shown in block E. The module LOCATE is then done as shown in oval F.

Figure 42:
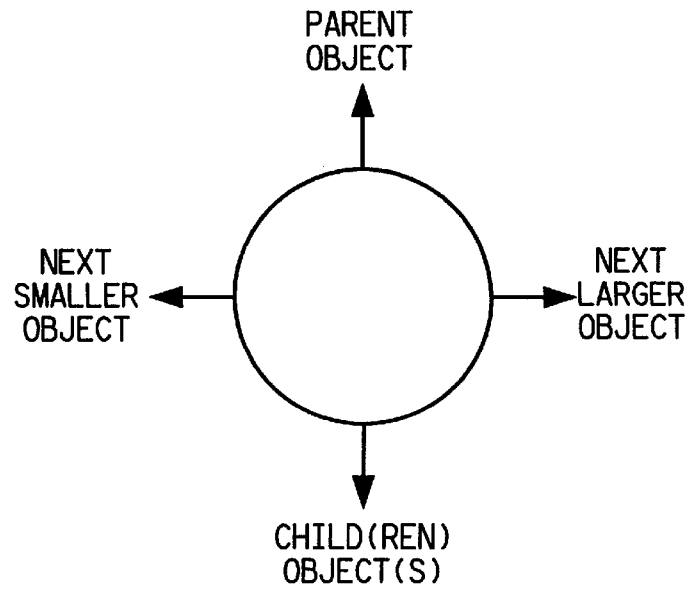
FIG. 42 is a schematic diagram showing the relationships among objects as described with respect to the fourth embodiment.

A preferred implementation of the fourth embodiment will be illustrated with respect to FIG. 42, where, for purposes of ease of visualization, redundancy determination is based on the characteristic value of size—i.e., whether a smaller object is contained within a larger object. Thus, to the left of the object as shown in FIG. 42 is the next smaller object. Conversely, to the right of the object as shown in FIG. 42 is the next smaller object. Moreover, in the redundancy determination scheme of the fourth embodiment, objects are associated with each other as either a "parent" or a "child" based on containedness. That is, an object contains its child or children and is contained by its parent. Thus, above the object as shown in FIG. 42 is the parent object, and below the object as shown in FIG. 42 is the child, or children of the object.

Figure 43:
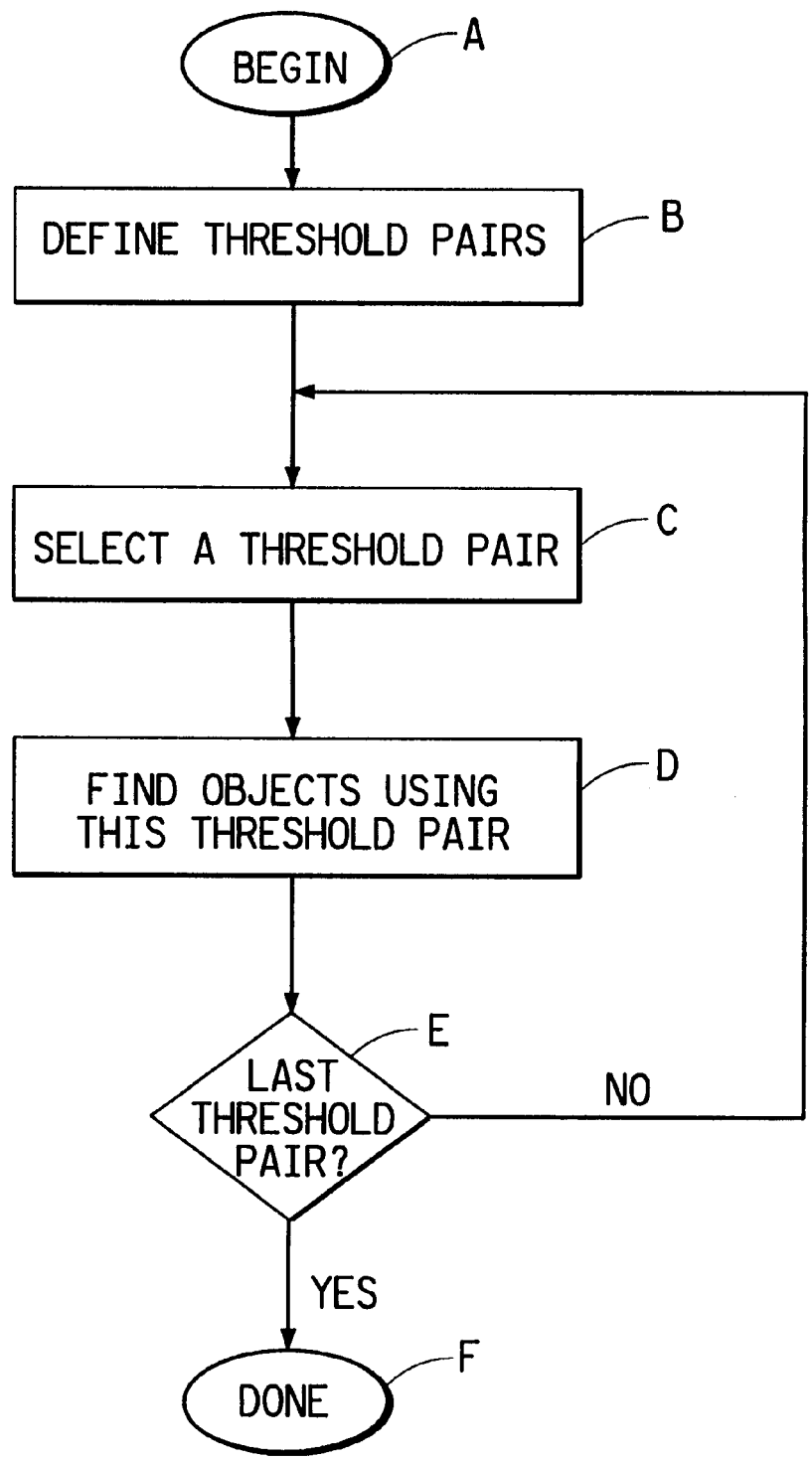
FIG. 43 is a flow chart illustrating the steps of a module, IDENT, which is the main module for identifying redundant objects.

In order to identify the group of potentially redundant objects, a module IDENT as described with respect to FIG. 43 is run. The module IDENT begins as shown in oval A of FIG. 43, and then defines at least one threshold pair as shown in block B. This is done using a "dual thresholding" method as will be described below and in particular, with respect to FIG. 44. A threshold pair is then selected as shown in block C of FIG. 43. The module IDENT then finds objects using the selected pair of threshold gray level values. This may be performed by modules similar to the modules SEARCH IMAGE, FIND OBJECT and TRACE OBJECT as described above with respect to FIGS. 25–27, and in particular may be performed recursively as described with respect to FIGS. 28A–28C and FIG. 29. It should be noted that in the fourth embodiment, the gay level histogram of FIG. 28 A is initially searched between A, THRESH HI, and B, THRESH LO, in order to identify candidate objects which may span that gray level space. Decision diamond E in FIG. 43 then asks whether IDENT is at the last threshold pair. If it is, then the module is done as shown in oval F. If it is not, then the module IDENT continues back to block C, and the loop through C–E continues for each additional threshold pair in turn until the module is done, as shown in oval F.

The method of entropic thresholding used for identifying valid objects as described above with respect to the first through third embodiments is ideal in that it uses the information contained in the image to optimally find all objects. However, this method does result in many objects being found that are not desired—i.e., artifacts. Often, the number of artifacts exceeds, by an order of magnitude, the number of desired, objects. With this method, there is much a priori information which is available, but not used. After performing the method of identifying valid objects as described above over time, one obtains information on the aggregate of images previously processed. Thus, a method which uses this information is particularly useful for an image on which one has no a priori information. With such a method, one can determine which conditions result in desired objects and which result in other non-desired objects, e.g., as in the optimization of conditions for doing the locate function, as performed by the LOCATE module as described above with respect to FIG. 41. The dual thresholding method, which is implemented with the fourth embodiment, uses entropic thresholding and generates a fixed threshold list from which to select a desired threshold pair based on the a priori information obtained from images previously processed.

Thus, in a preferred implementation of the fourth embodiment, the multi-dimensional data space is a gray level histogram representative of the entire image. A plurality of gray level upper and lower histograms each having a respective entropy function is generated from the histogram. The at least one sub-space is a plurality of pairs of threshold gray level values for each upper and lower histogram. A pair of threshold gray level values is selected such that the entropy function of each upper and lower histogram is maximized. The image is multiply searched using the selected pair of threshold gray level values for each upper and lower histogram for at least one candidate object.

Briefly, the dual thresholding method processes a set of images, keeping track of the threshold pair used to find each object. This data is used to correlate the threshold pair used to obtain each object trace to the classification of objects as either desirable or not desirable. For each thresholding pair, the dual thresholding method determines if most of the objects found were of a desired class or not. The dual thresholding method then contructs a list of threshold pairs that preferentially identify desirable objects. This new threshold list is then used in the future for identifying objects and resolving redundancies of such objects in other images. It may be desirable to fix a set of threshold pairs for the processing of the image to obtain as many desired objects, and as few non-desirable objects, as possible. Several methods may be used to do this, including: binary division of the gray level space; using a set of threshold pairs entropically determined from a representative image; or constructing a combined histogram of a set of images and entropically determining the set from that combined histogram, as for example, illustrated in FIG. 44.

Figure 44:
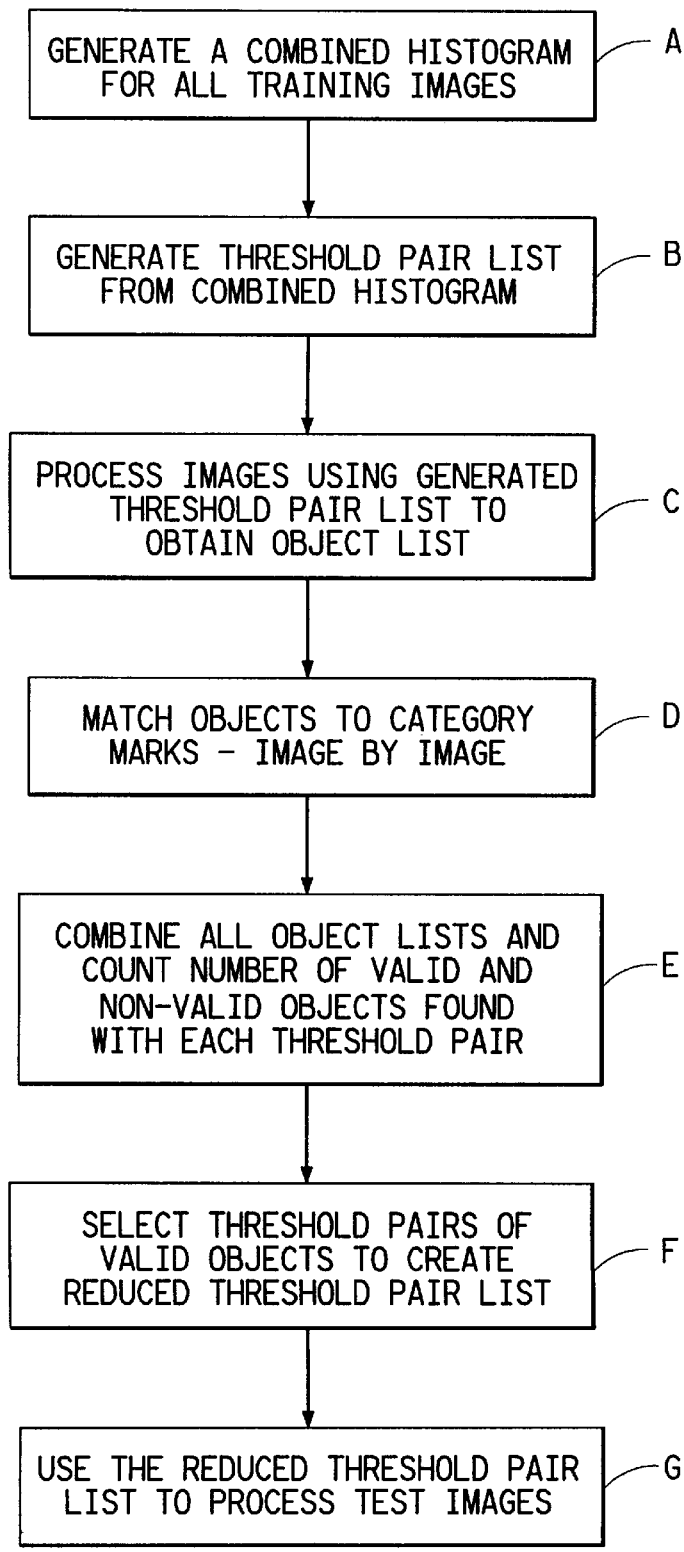
FIG. 44 is a flow chart showing the steps of the dual thresholding method performed in accordance with the fourth embodiment.

FIG. 44 is a flow chart illustrating the steps of the dual thresholding method. As shown in block A of FIG. 44, a combined histogram for all "training image" is generated. The set of training images comprises a set of images representative of images for which application of this method is desired. These images must be marked. The combined histogram may then be processed as described above with respect to FIGS. 28A–28C, except that, as noted above with respect to the fourth embodiment, the gray level histogram is intially searched between A, THRESH LO, and B, THRESH HI, in order to identify candidate objects which may span that gray level space. The processing of the combined histogram is shown in block B, where a threshold pair list is generated from the combined histogram. This could be done, for example, using entropic thresholding, although, as noted above, other methods may be used to determine the set of threshold pairs. The training images are then processed—i.e., searched for candidate objects using the generated threshold pair list in order to obtain an object list as shown in block C. The list includes the threshold pair which generates the object trace. The objects are then matched to category marks used to identify desired objects, image by image, as shown in block D. Each image has its own list from block C. Each is matched in block D. These object lists are then combined as shown in block E. The number of desired and not-desired objects found with each threshold pair is then counted, as also shown in block E. The desired threshold pairs are selected to create a reduced threshold pair list as shown in block F. As shown in block G, the reduced threshold pair list is then used to process "testing images" to confirm actual performance, or new images for which object classification is desired. The set of testing images again comprises images representative of images for which application of this method is desired, but not in the set of training images. These testing images should be manually counted to assist in judging the accuracy of this method.

Figure 45:
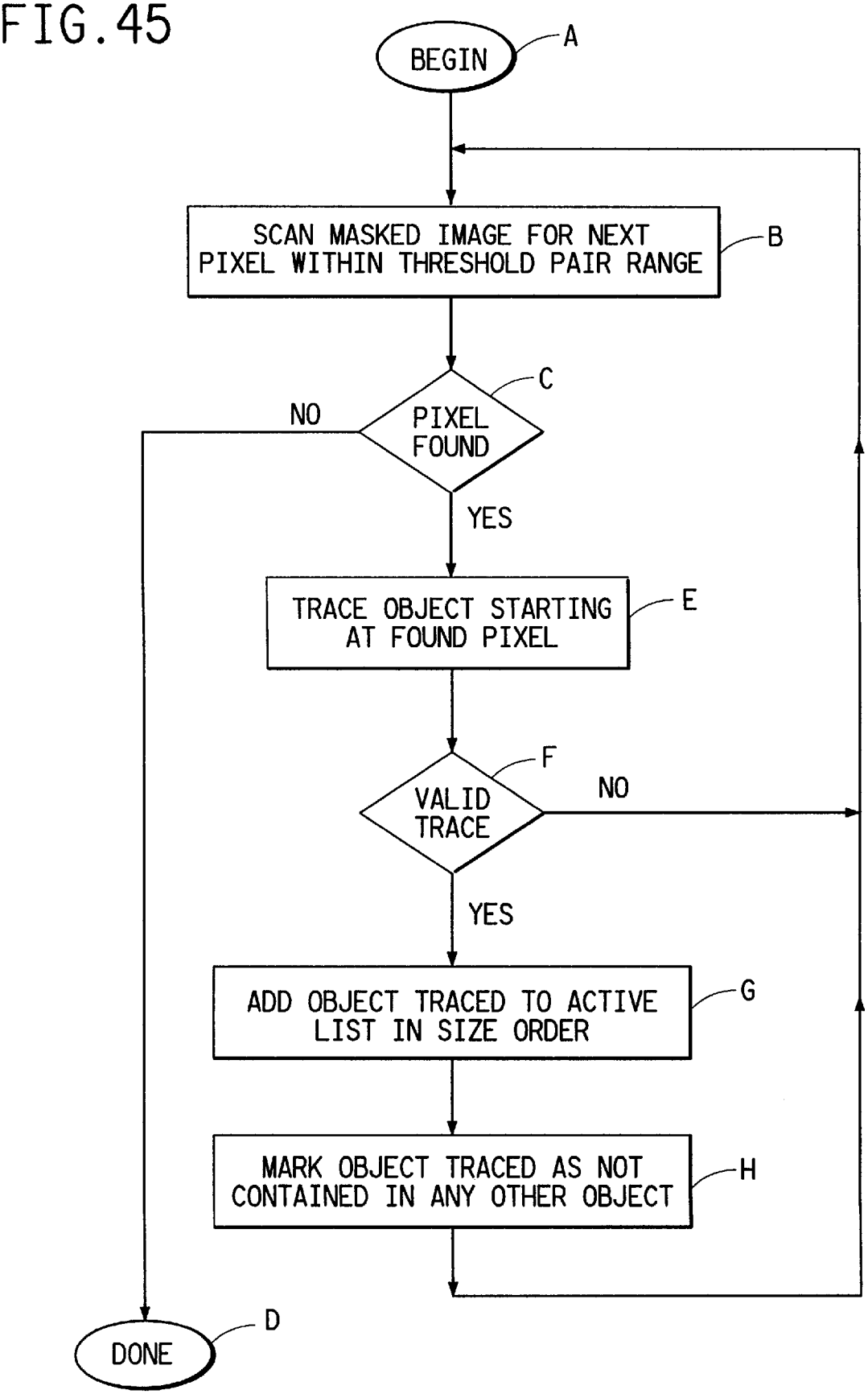
FIG. 45 is a flow chart illustrating the steps of a module called by IDENT, which finds objects using a given threshold pair.

FIG. 45 is a flow chart of a module called by IDENT, which searches for objects using a given threshold pair. As noted above, the searching sub-step includes the sub-step of scanning the image for at least one object using the threshold gray level value. More specifically, the portion of the image scanned comprises a plurality of pixels, and each pixel has a gray level value less than the upper delimiter plus an increment, as described above with respect to the first through third embodiments. In the fourth embodiment, this increment is set to zero. This scanning sub-step is illustrated in block B in FIG. 45. Specifically, after the module begins as shown in block A, the masked image—i.e., one which has been cropped to allow certain portions of the image to not be processed, is scanned for the next pixel within a threshold pair range. Decision diamond C of FIG. 45 asks whether the next pixel within a threshold pair range is found. If it is, then the module is done as shown in oval D. If the next pixel within a threshold pair range is found, then the object is traced, starting at the found pixel, as shown in block E. Decision diamond F asks whether a valid object has been traced. If a valid object has been traced, it is added to an "active list" i.e., a list of valid objects in sorted order, according to size, as shown in block G. The object traced is then marked as not contained in any other object as shown in block H, and the module returns to block B. Also, from decision diamond F, if non-valid object has been traced, the module returns to block B. The loop through B–C and E–H continues until the next pixel is not found, at which time, the module is done, as shown in oval D. As discussed above with respect to FIG. 43, block D, the module IDENT finds objects using the selected threshold pair. This may be done recursively in a manner similar to that described above with reference to the histogram of FIGS. 28A–28C, except that, as noted above, the gray level histogram is initially searched between A and B in the fourth embodiment.

In the fourth embodiment, certain criteria are applied in order to determine whether a valid object has been traced. The number of perimeter pixels must be less than a maximum limit. The object must have been traced in the clockwise direction. Also, the object area must be greater than a minimum limit. The shape factor must be less than a maximum limit. In addition, the object "center point" must be interior to the object. It should be noted that the center point, as calculated above with respect to the first embodiment, may be moved to make it an interior point. The implementation of redundancy checking of the fourth embodiment requires an interior point. As the center point normally is interior and is needed for no other purpose, it is used as this interior point. If it is not interior, then it is moved to make it so. Thus, the object "center point" is truly not a center point, as much as it is an interior point.

Figure 46:
FIG. 46 is a schematic diagram showing the relationships among objects after the module IDENT has been run.

As noted above, in a preferred implementation of the fourth embodiment, the characteristic value is indicative of size, so that the first object in the list is the smallest object, and the last object in the list is the largest object. In the fourth embodiment, the sorting step is done within the context of finding a valid object using a given threshold pair as illustrated in FIG. 45. In particular, as noted in block G of FIG. 45, the traced valid objects are added to the active list in size order. The active list of traced valid objects, after IDENT has been run, is illustrated in FIG. 46. Object A in FIG. 46 is the smallest object, and object Z is the largest. At the left of FIG. 46, "SA" references the smallest object. At the right of FIG. 46, "LA" references the largest object.

The module CONTAIN as described with respect to FIG. 27 performs the containedness check of the fourth embodiment. After beginning as shown in oval A of FIG. 47, CONTAIN calls three modules. As shown in block B, CONTAIN first calls LINK FAMILY, which is described below with respect to FIG. 49. LINK FAMILY performs the containedness check, which results in generating a list of all objects and the familial relationship each object to the other objects (i.e., whether they are a parent or a child), as discussed above with respect to FIG. 42. As shown in block C of FIG. 47, CONTAIN then calls HETEROGENEOUS DECLUMP, which is described below with respect to FIG. 53. The module HETEROGENEOUS DECLUMP checks each object for independent objects. An object is considered independent if its characteristics are different from its parent by a predetermined degree. Then, as shown in block D of FIG. 47, CONTAIN calls REMOVE REDUNDANCIES, which is described below with respect to FIG. 56. The module REMOVE REDUNDANCIES identifies redundant instances of an object using different generations of objects. It should be noted that although the case of a parent having one child is described herein with respect to FIG. 56, the module REMOVE REDUNDANCIES may also remove redundancies for a parent having more than one child and for an object having no children. In the preferred implementation of the fourth embodiment, the object with the greatest edge contrast from each set of object instances is kept, as illustrated below with respect to FIG. 58C.

Figure 49:
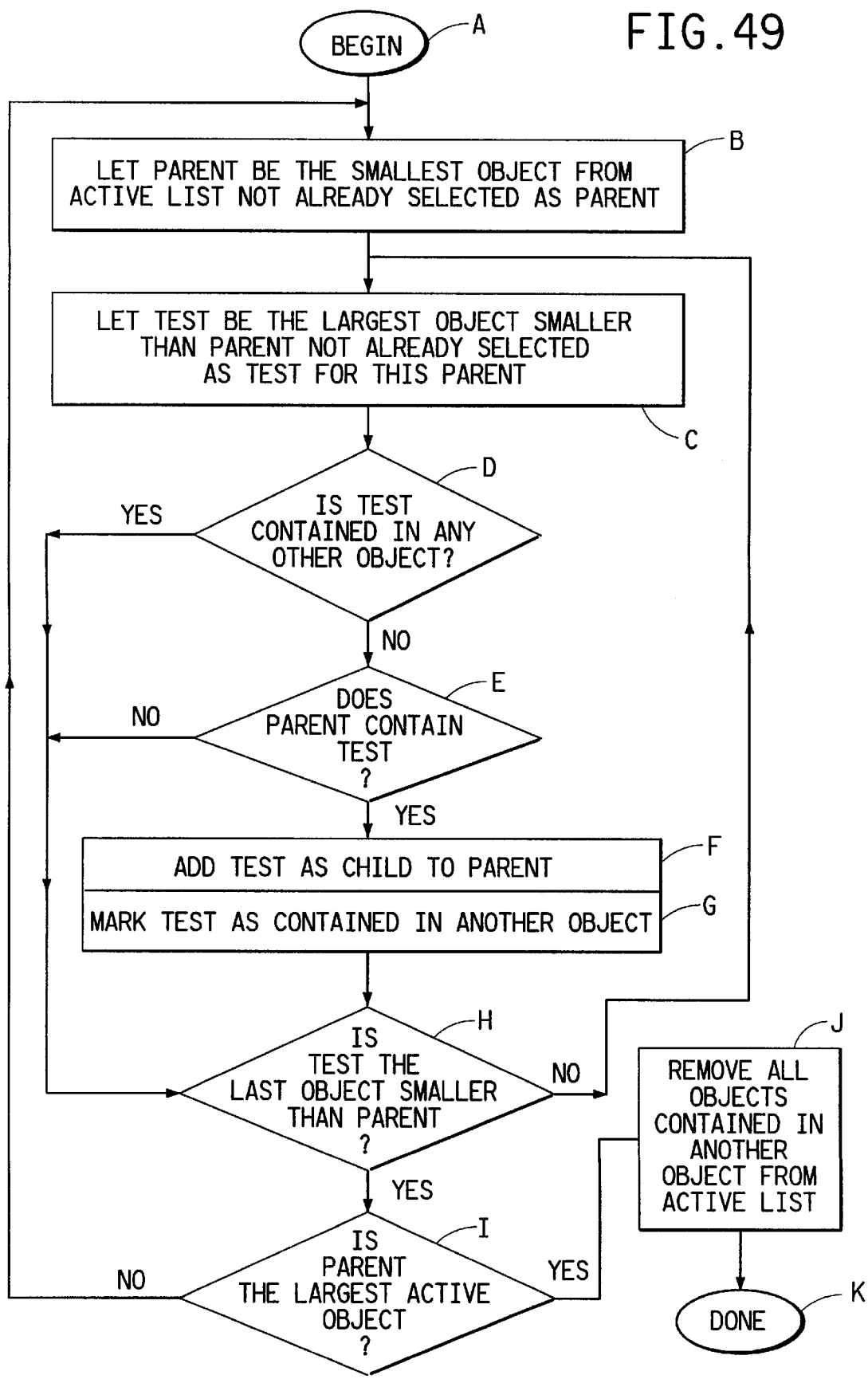
FIG. 49 is a flow chart showing the steps of a module, LINK FAMILY, which generates a family ordering of all objects.

The first step of LINK FAMILY as illustrated in FIG. 49 is "Begin" as shown in oval A, and then let the parent be the smallest object from the active list not already selected as a parent as shown in block B. As shown in block C of FIG. 49, LINK FAMILY then lets "test" be the largest object smaller than the parent not already selected as a test object for this parent object. Decision diamond D asks whether test is contained in any other object. If it is, then LINK FAMILY goes to decision diamond H, as described below. If test is not contained in any other object, then decision diamond E asks whether the parent contains test. If it does not, then LINK FAMILY goes to decision diamond H as described below. Returning to decision diamond E, if the parent does contain test, then LINK FAMILY adds test as a child to the parent as shown in block F, and test is marked as contained in another object as shown in block G. Decision diamond H asks whether test is the last object smaller than the parent. If it is not, the loop through C–H continues, until test is the last object smaller than the parent. Then decision diamond I asks whether the parent is the largest object on the active list. If it is not, the loop through B–I continues until the parent is the largest object on the active list. Then all objects contained in another object are removed from the active list as shown in block J, and the module is done as shown in oval K of FIG. 49.

Figure 48:
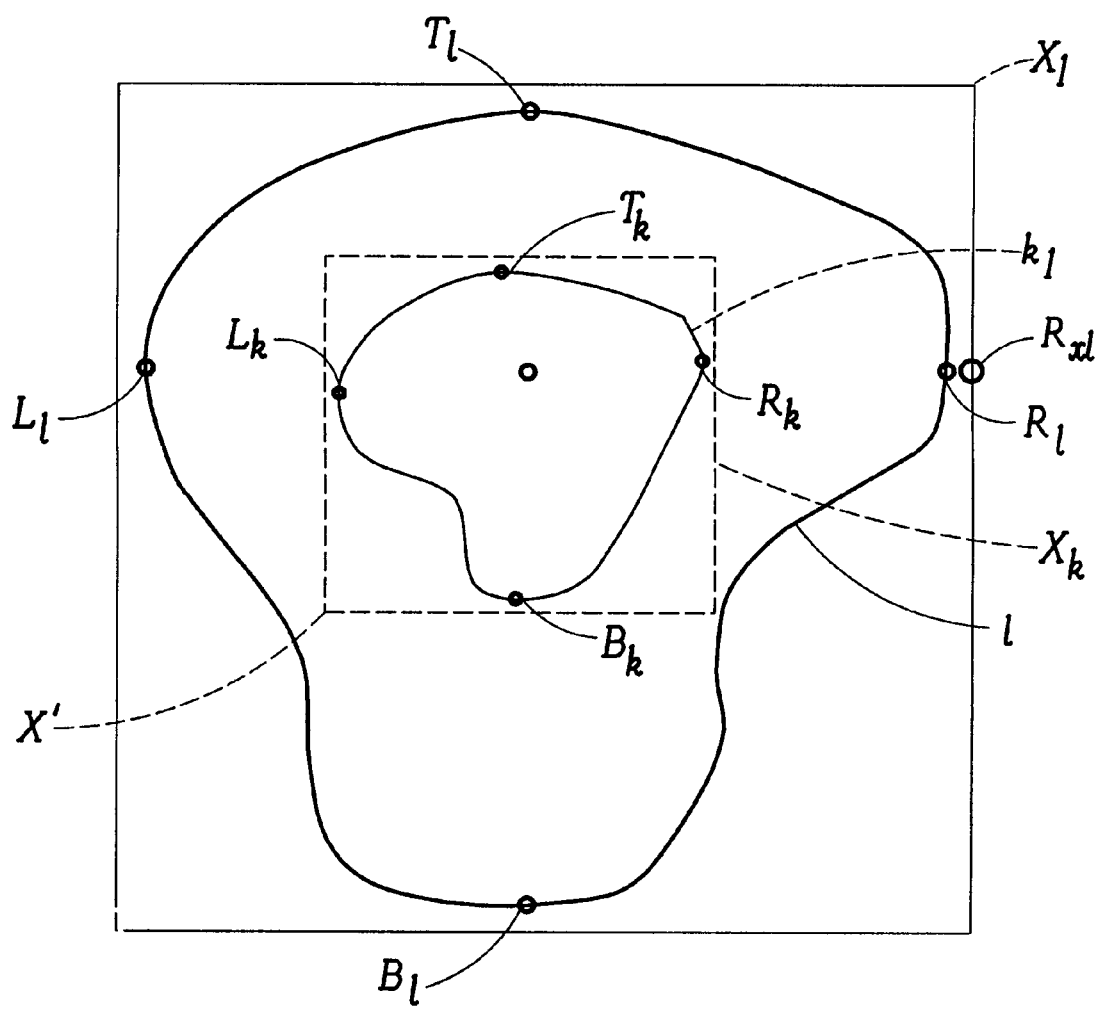
FIG. 48 is a schematic diagram of an object, illustrating the first step of the containedness check, or the "box test", as used with the fourth embodiment of the present invention.

FIG. 48 is a schematic diagram of an object, illustrating the first step of the containedness check, or the more powerful "double box test", as used with the fourth embodiment of the present invention. This box test is similar to the box test performed as used with the first embodiment of the present invention. However, the box test of the fourth embodiment is really a "double box test", in that a hypothetical box, such as a dashed box $X_k$ is drawn around the smaller, contained object k, as well as the larger object. This box is used only for showing the four extremum points of the smaller object, k. The advantage of the double box test is that it can determine more objects as not contained within another object than the simple box test, and thus the full containedness test need be done less frequently. The double box test is performed as shown in blocks B and D of FIG. 51.

In FIG. 48, an object l, and an object k, have been identified, where object l is larger than object k. According to the method of the fourth embodiment, the step of determining whether each smaller object is contained within each larger object includes the sub-step of determining the four extremum points of the larger object. As illustrated in FIG. 48, four extremum points $L_l$, $T_l$, $R_l$ and $B_l$ for object l are determined. In the fourth embodiment, the four extremum points are determined by a module similar to TRACE OBJECT, as described above with respect to FIGS. 27A–27B. Each extremum point has a row-position coordinate value and a column-position coordinate value, which are described above with respect to FIGS. 7–10. The determining step further includes the sub-steps of constructing a rectangle bounding the larger object by using the row-position coordinate value and the column-position coordinate value of the four extremum points. Rectangle $X_l$ as shown in FIG. 48 is constructed using the row-position coordinate value and the column-position coordinate value of the four extremum points, $L_l$, $T_l$, $R_l$ and $B_l$ for object l. As in the first embodiment, the determining step further includes the sub-steps of determining a predetermined point on the smaller object. The predetermined point has a row-position coordinate value and a column-position coordinate value, which are obtained in a manner similar to that described above in the first embodiment. The determining step further includes the sub-steps of determining the position of the predetermined point of the smaller object with respect to the rectangle bounding the larger object. When performing the double-box test, the four extremum points $L_k, T_k, R_k$ and $B_k$ are determined for object k and compared to the corresponding extremum points of the larger object, thereby determining if the extremum points of the smaller object are contained within rectangle $X_l$. A rectangle $X_k$ is constructed around object k using the extremum points, only for purposes of illustrating the extremum points. In a preferred implementation of the fourth embodiment, the predetermined point is the center of mass. However, the predetermined point may be any point on the smaller object.

Figure 50:
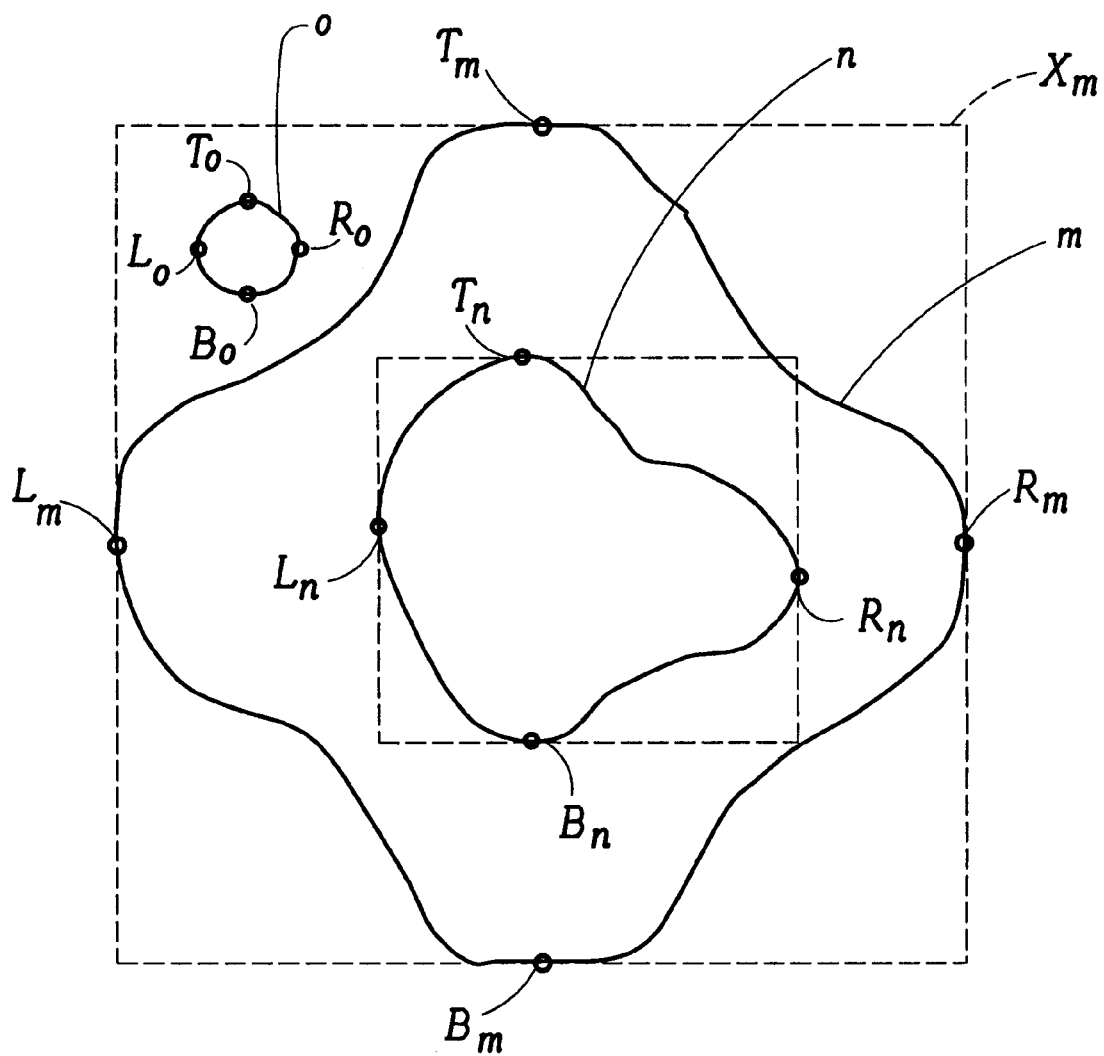
FIG. 50 is a schematic diagram of an object, illustrating the second step of the containedness check of the fourth embodiment in the fourth embodiment.

As noted above, the full containedness check need be performed less frequently, because of the use of the double-box test. However, there are times when an object may pass the double box test, but may fail the full containedness check. In such instances, doing the full containedness check is useful. FIG. 50 is a schematic diagram of an object, illustrating the full containedness check which is performed by the module CONTAIN in the fourth embodiment. The full containedness check is applied only if an object, such as object o in FIG. 50, is found to be located within the rectangular box. As in the first embodiment, less frequent use of the full containedness check is less computationally intensive, allowing redundancy determination to be conducted at a faster rate. The full containedness check of the fourth embodiment can be applied to all identified objects without first applying the box test. However, by applying the full containedness check, the box test serves as an initial screen for the containedness check. The full containedness check is performed by block H of FIG. 51.

In FIG. 50, objects m, n and o are identified. Extremum points $L_n$, $T_n$, $B_n$ and $R_n$ of object n and extremum points $L_o$, $T_o$, $B_o$ and $R_o$ of object o are all determined to be within the bound $X_m$. Upon applying the full containedness check, the extremum points of object n are determined to have column-position coordinate values and row-position coordinate values which lie between the column-position coordinate values and the row-position coordinate values of the perimeter points of object m. Object n is determined to be contained within object m. Object n is a single, smaller object contained within object m and may be subsequently deleted—i.e., not retained, if certain criteria are met. Upon applying the full containedness check, the extremum points of object o fail to have column-position coordinate values and row-position coordinate values which lie between the column-position coordinate values and the row-position coordinate values of the perimeter points of object m. Object o is therefore determined not to be contained within object m. Object o is neither a parent or child of object m and is therefore retained.

Figure 51:
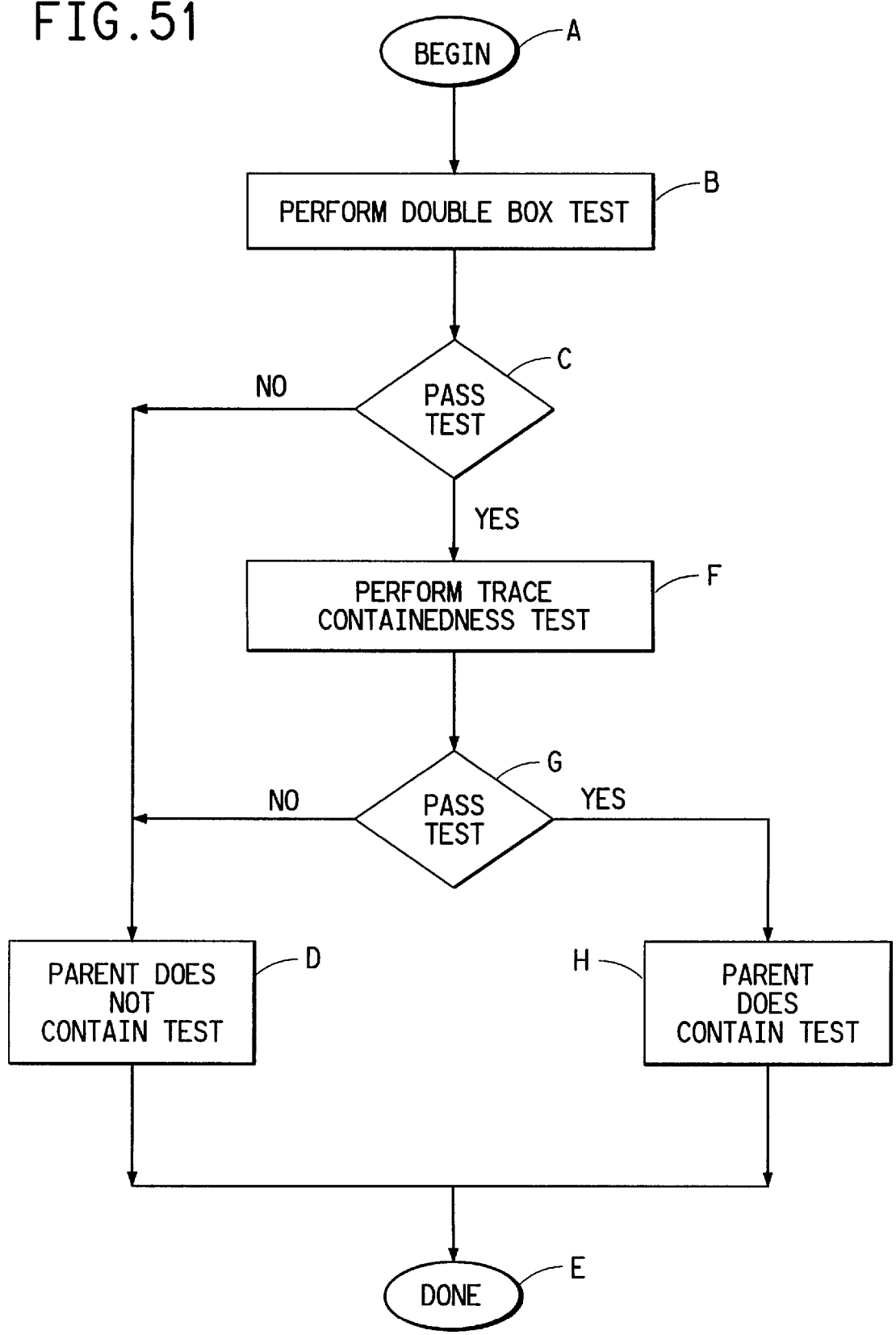
FIG. 51 is a module, CONTAIN TEST, which is called by LINK FAMILY, and which determines whether an object contains a particular object.

The double box test as illustrated in FIGS. 48 and 50 is performed by the module CONTAIN TEST, the steps of which are illustrated in FIG. 51. The module CONTAIN TEST is called by the module LINK FAMILY, as shown in block D of FIG. 49. The module CONTAIN TEST determines whether one object is contained within another. As shown in oval A of FIG. 51, CONTAIN TEST begins and then performs the double box test as shown in block B. Decision diamond C asks whether the object being tested passes the test. If it does not, then the parent object does not contain the test object as shown in block D, and the module CONTAIN TEST is done as shown in oval E. Returning to decision diamond C, if the object passes the double box test as shown in block B, then a trace containedness test is performed as shown in block F. Decision diamond G then asks whether the object being tested passes the test. If it does, then block H shows that the parent object does contain the test object. If the object being tested does not pass the test, then block D shows that the parent does not contain the test object. After the determination that the parent object does or does not contain the test object, the module CONTAIN TEST is done as shown in oval E.

Figure 52A:
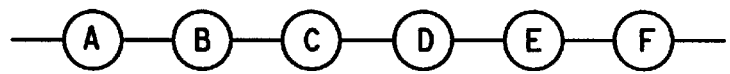
FIGS. 52A–52E are schematic diagrams illustrating what happens to the family ordering of objects as LINK FAMILY is run.

For purposes of clarity, the module LINK FAMILY is explained with reference to FIGS. 52A–52E. FIG. 52A illustrates an active list of objects A, B, C, D, E and F sorted by size where A is the smallest object in the list and F is the largest object in the list. Initially all objects on the active list are considered to be parents. Each parent object on the active list is compared to every other object to determine whether each smaller object is contained within a larger object—i.e., does the smaller object have a parent. This containedness test is performed by the module CONTAIN TEST as illustrated in FIG. 51. If a smaller object is determined to be contained within a larger object, the smaller object is referred to as a child. The larger object is referred to as the parent.

The containedness test begins with the smallest object on the active list, in this illustration, object A and moves to each succesively larger parent object. In considering object A, there are no smaller objects to compare with it and therefore A is retained as a parent on the active list. In considering the object B, the question is asked if smaller object A is contained within object B. For purposes of this illustration, module CONTAIN TEST determines that object A is not contained within object B, and therefore objects A and B are parent objects.

Figure 52B:
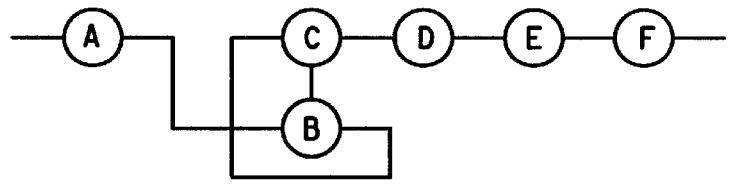

FIG. 52B shows the family link relationship after objects C and D on the active list have been considered with respect to smaller objects B and A. In considering object C, since smaller object B has a current status of parent, the containedness test is performed. As illustrated herein, module CONTAIN TEST determines that object B is contained within object C and object B is given the status of child. In FIG. 52B, a subordinate linkage of object B to object C is shown while retaining the direct linkage to the active list. Since smaller object A has a current status of parent, the test as to whether object A is contained within object C is also performed. The containedness test shows that object A is not contained within object C, and object A is a parent and remains on the active list.

In considering object D, since smaller object C has a current status of parent, the containedness test is performed. As illustrated herein, module CONTAIN TEST determines that object C is not contained within object D. Object C retains its status as parent on the active list. Since smaller object B has a current status of child, a containedness test with respect to object D is not performed. Since smaller object A has a current status of parent, the containedness test is performed with respect to object D. As illustrated herein CONTAIN TEST determines that object A is not contained within object D, and thus object A is a parent and remains on the active list. In FIG. 52B objects E and F have not yet been considered and retain their intiallized status of parent.

Figure 52C:
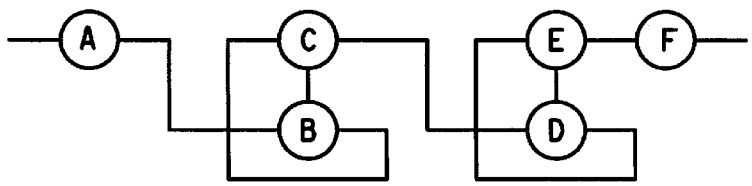

FIG. 52C shows the family link relationship after object E has been considered with respect to smaller object D. In considering object E, since smaller object D has a current status of parent, the containedness check is performed. As illustrated herein, module CONTAIN TEST determines that object D is contained within object E, and object D is a child. In FIG. 52C, a subordinate linkage of object D to object E is shown while retaining the direct linkage of object D to the active list.

Figure 52D:
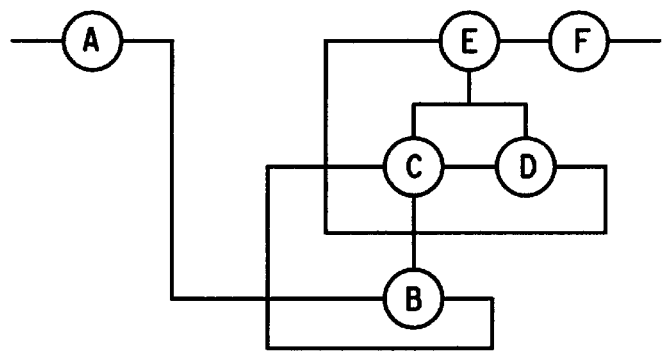

FIG. 52D shows the family link relationship after object E has been considered with respect to smaller objects C and A and after object F has been considered with respect to smaller objects E and A. In considering object E, since smaller object C has a current status of parent, the containedness test is performed. As illustrated herein, module CONTAIN TEST determines that object C is contained within object E, and object C is a child. In FIG. 52D, a subordinate linkage of object C to object E is shown while retaining the direct linkage of object C on the active list and the subordinate linkage of object B to its parent object C. Since smaller object B has a current status of child, a containedness test with respect to object E is not performed. Since smaller object A has a current status of parent, the test with respect to whether object A is contained within object E is performed. As illustrated herein, the module CONTAIN TEST determines that object A is not contained within object E, and object A is a parent and remains on the active list.

In considering object F, since object E has a current status of parent, the containedness test is performed. As illustrated herein, module CONTAIN TEST determines that object E is not contained within in object F. Object E is retained as a parent on the active list showing subordinate linkages to all of its children. Objects D, C and B have the current status of children, and a containedness test with respect to F is not performed. Since smaller object A has a current status of parent, the test with respect to whether object A is contained within object F is performed. As illustrated herein, the module CONTAIN TEST determines that object A is not contained within object F and is a parent and remains on the active list.

Figure 52E:
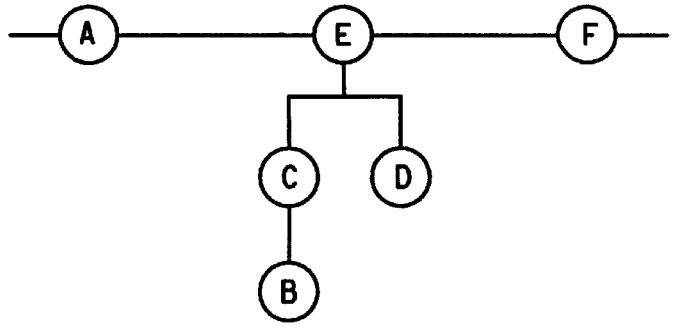

FIG. 52E illustrates the family link relationship of objects A, B, C, D, E and F at the completion of the LINK FAMILY module with objects B, C, and D removed from the active list as shown by removal of their direct linkages in this illustration.

Figure 47:
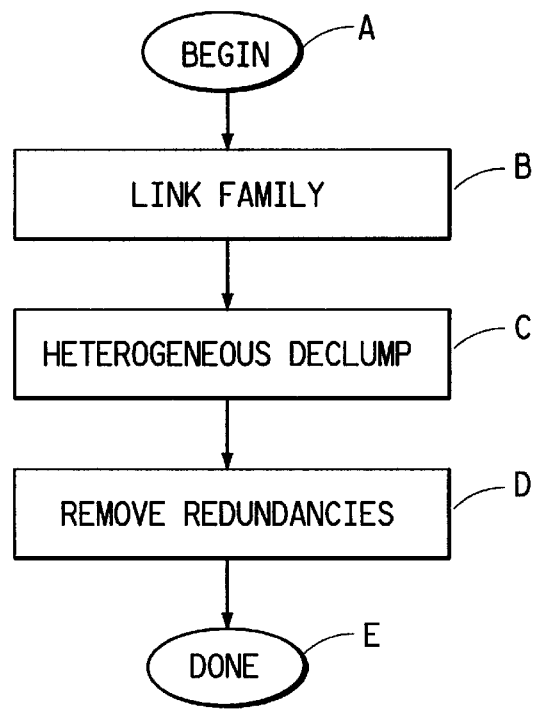
FIG. 47 is a flow chart showing the steps of a module, CONTAIN, which performs the containedness check of the fourth embodiment.
Figure 53:
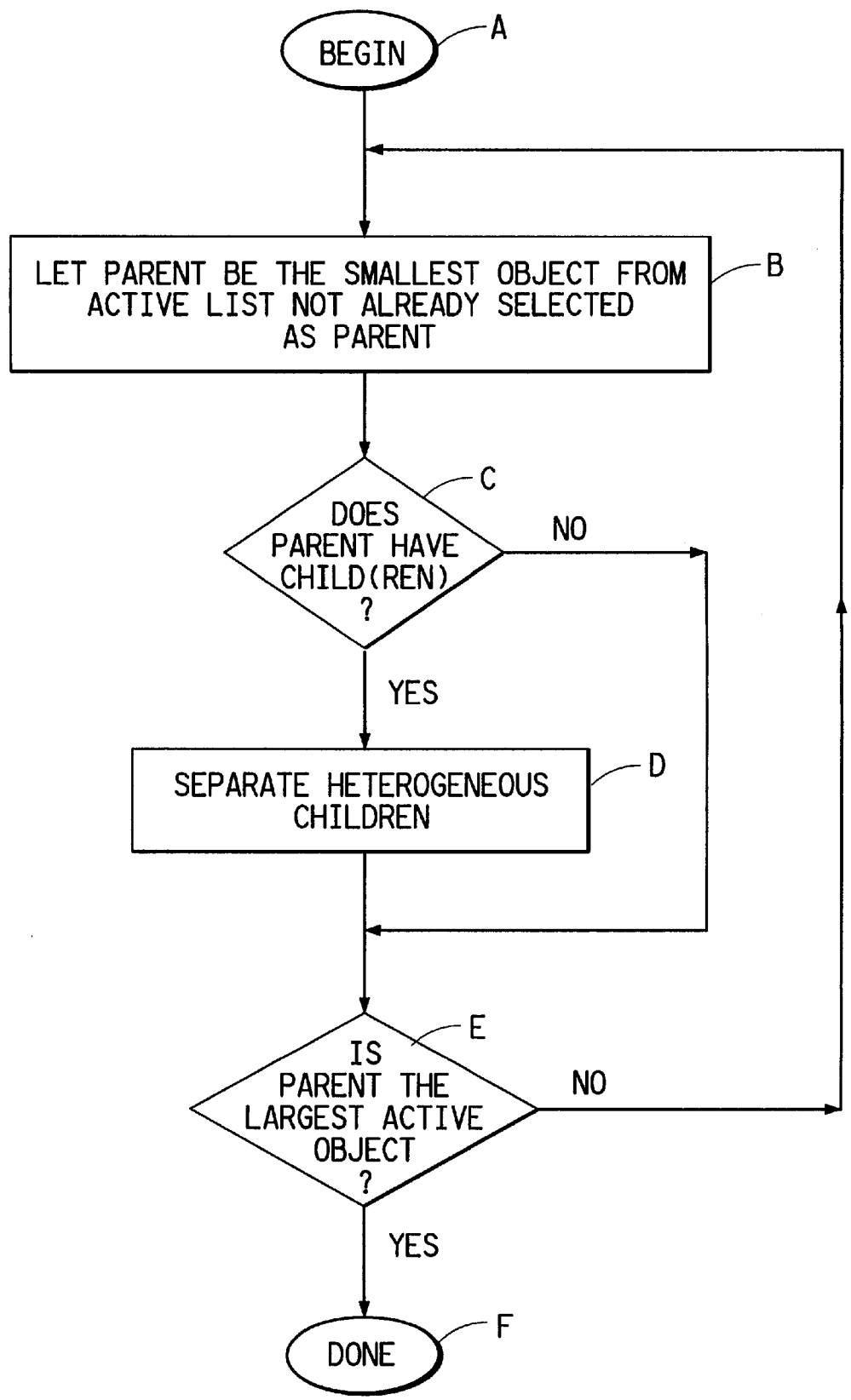
FIG. 53 is a flow chart illustrating the steps of a module, HETEROGENEOUS DECLUMP, which checks each object for independent objects.

The fourth embodiment is able to perform a similarity check as illustrated above for the first embodiment with respect to FIG. 18. According to the piggyback method of the present invention, a characteristic attribute of at least one predetermined point of each second object which is redundant with the first object is determined. Specifically, in the fourth embodiment, the at least one predetermined point is the four extremum points of the smaller object. This step is illustrated in FIG. 47, block C, which is expanded in the module HETEROGENEOUS DECLUMP as illustrated in FIG. 53 as will be discussed in detail below. For purposes of clarity, the steps of HETEROGENEOUS DECLUMP will be illustrated where the first object is a larger object, and the second object is a smaller object, it being understood that there may be cases where the first and the second objects may be redundant in ways other than spatial overlap, as noted above.

In the preferred implementation of the fourth embodiment, an average characteristic attribute of each interior point of each first and second object is determined as discussed above with respect to the first embodiment. This implementation, which uses the average characteristic attribute, gives a better comparison than the implementation of the piggyback method which uses the characteristic attribute. This same average characteristic attribute of each interior point of each first object is then determined. In the preferred implementation, the first object is a larger object, the second object is a smaller object, and the average characteristic attribute is average interior hue, i.e., the average hue of the interior points of the larger object and the smaller object.

For parent (larger) and child (smaller) objects as illustrated with respect to the fourth embodiment, if $$|\bar{H}_p - \bar{H}_c| > H_t \qquad (9)$$

or $$(a_p - a_c)^2 + (b_p - b_c)^2 > d^2_t \qquad (10)$$

where:

H is hue $\bar{H}$ is hue mean a & b are from R,G,B gray level values in a color image p refers to a parent c refers to a child d refers to a predetermined distance t refers to the predetermined distance threshold then, the child is heterogenous—i.e., the child is different from the parent. In a preferred implementation of the fourth embodiment, the interior points of the larger object, excluding the interior points of the smaller object, are determined.

The module HETEROGENEOUS DECLUMP begins as shown in oval A of FIG. 53. This module determines whether an object has a heterogeneous child. By "heterogeneous child" is meant that the child is different from the parent. The module lets the parent object be the smallest object from the active list not already selected as the parent object. Decision diamond C asks whether the object object has a child or children. If it does, then the module HETEROGENEOUS DECLUMP calls the module SEPARATE HETEROGENEOUS CHILDREN as shown in block D. This module is described below with respect to FIG. 54. Then decision diamond E asks whether the parent object is the largest object on the active list. If it is, then the module HETEROGENOUS DECLUMP is done as shown in oval F. If it is not, the loop through B–E continues until the parent object is the largest object on the active list, at which point the module is done. Returning to decision diamond C, if the parent object does not have children, then the module HETEROGENEOUS DECLUMP goes immediately to decision diamond E, and the loop through B–E continues until the parent object is the largest object on the active list, at which point the module is done as shown in oval F.

Figure 54:
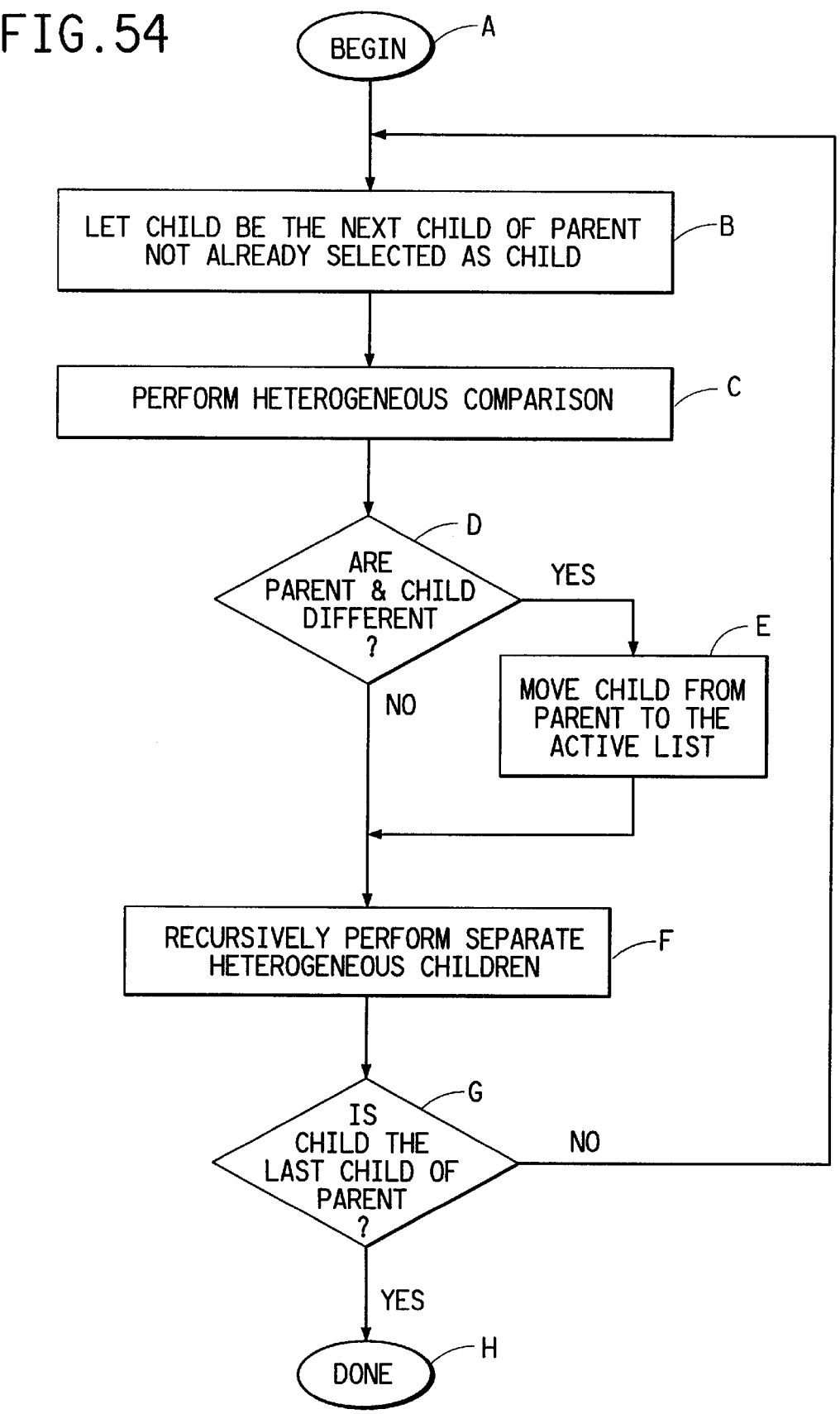
FIG. 54 is a a flow chart illustrating the steps of a module, SEPARATE HETEROGENEOUS CHILDREN, which reinstates objects as independent objects.

As noted above, the module HETEROGENOUS DECLUMP calls the module SEPARATE HETEROGENOUS CHILDREN as illustrated in FIG. 54. This module reinstates objects as independent objects. After the module begins as shown in oval A, the module lets the child object be the next child object of the parent not already selected as a child as shown in block B. Block C shows that the module SEPARATE HETEROGENEOUS CHILDREN then performs a comparison of heterogenous objects, as discussed more fully below. Decision diamond D then asks whether the parent and the child are different. If they are, the child is moved from being a child of the parent to an independent object on the active list as shown in block E, and the module proceeds to block F. If the parent and the child are not different, then the module proceeds directly to block F. As shown in block F, the module then recursively performs the module SEPARATE HETEROGENOUS CHILDREN for the child object. Decision diamond G then asks whether the child is the last child of the parent. If it is not, the module SEPARATE HETEROGENEOUS CHILDREN returns to block B, and the loop through B–G continues until the child is the last child of the parent. At this point, the module is done as shown in oval H.

It should be noted that the selection rules of the fourth embodiment distinguish between retain, delete and retain for subsequent comparison. Although an object may be removed as a redundant object from the list, that object's perimeter points may be retained for subsequent comparisons. For instance, when multiple children, or smaller objects, are found within a parent object, the perimeter points of the outermost parent object may be retained.

Figure 55A:
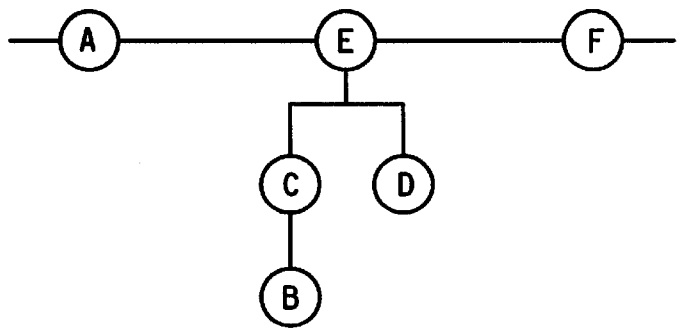
FIGS. 55A–55F are schematic diagrams illustrating how an objects are classified when the modules HETEROGENEOUS DECLUMP and SEPARATE HETEROGENEOUS CHILDREN are run.

For purposes of clarity, the module HETEROGENEOUS DECLUMP is explained by reference to FIGS. 55A–55F. FIG. 55A illustrates a group of objects A, B, C, D, E and F with a family relationship which has been determined by the module Link Family. Objects A, E and F have the status of parent and are included on the active list. Objects C and D are children of object E. Object B is a child of object C. The module HETEROGENEOUS DECLUMP determines whether any child object is dissimilar (or heterogeneous) to a parent. The module begins with the smallest parent object on the active list, in this case, object A. Object A has no children so the module moves onto the next largest parent object, object E. Object E has children which must be considered for heterogeneous declumping. Object F has no children and therefore need not be processed by the module HETEROGENEOUS DECLUMP.

Figure 55B:
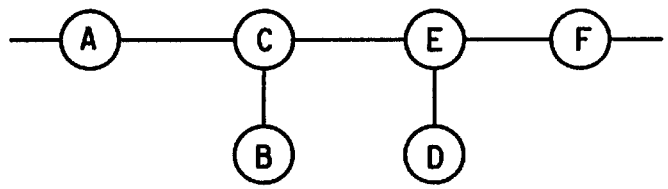

FIG. 55B shows the result of heteregeneous declumping if object C is dissimilar or heterogeneous from its parent object E. In considering object C, the module Heterogenous Declump determines object C to be heterogeneous and the object C is relinked to the active list with the status of parent.

Figure 55C:
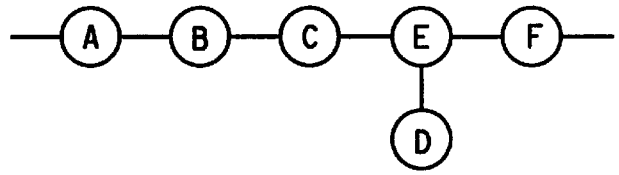

FIG. 55C shows the result of heterogeneous declumping if object B is next considered and determined to be heterogeneous to its parent object C. Object B is also relinked to the active list with the status of parent.

Figure 55D:
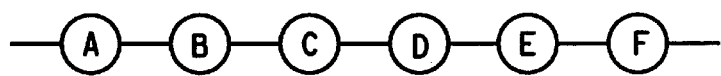

FIG. 55D shows the result of the heterogeneous declumping if object D is considered and determined to be heterogeneous to its parent object E. Object D is then also relinked to the active list with the status of parent. If object D is considered and determined not to be heterogeneous then the family link relationship as shown in FIG. 55C is applicable.

Figure 55E:
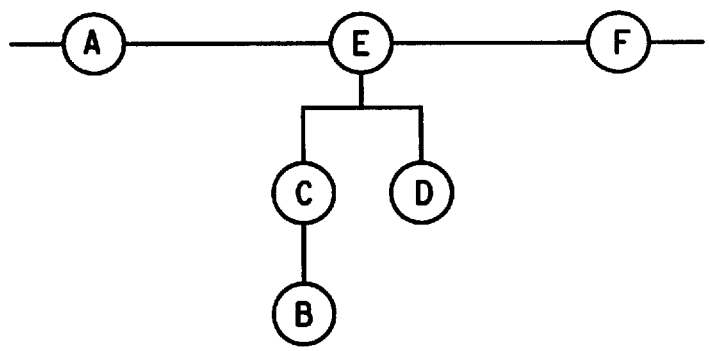

FIG. 55E shows the result of heterogeneous declumping if object C is determined not to be heterogeneous to its parent object E. The subordinate linkage of object C to parent object E is retained including the subordinate linkage to its own child, object B.

Figure 55F:
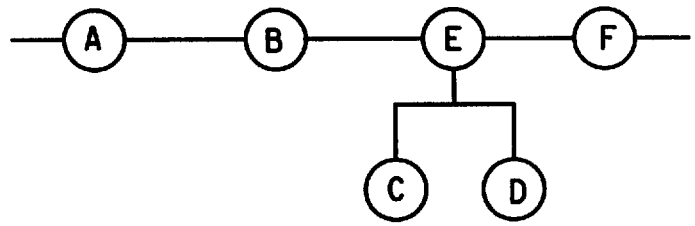

FIG. 55F shows the result of heterogeneous declumping if object B is determined to be heterogeneous to its parent object C. Object B is relinked to the active list with a status of parent.

Figure 56:
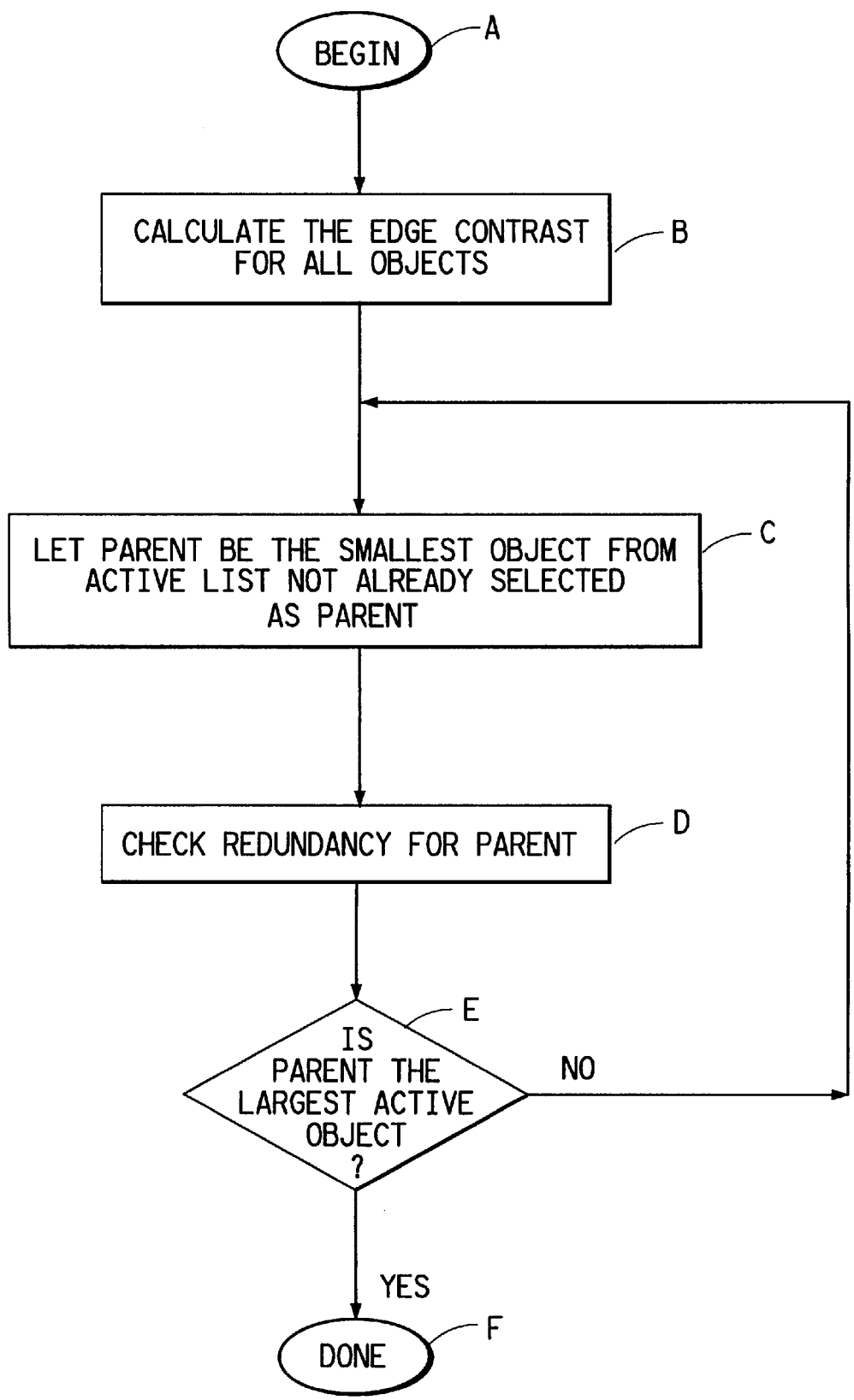
FIG. 56 is a flow chart illustrating the steps of a module, REMOVE REDUNDANCIES, identifies redundant instances of an object, using different generations of objects.

A module REMOVE REDUNDANCIES as shown in FIG. 56 is then run in order to keep only the object with the greatest edge contrast from each set of object instances. As shown in oval A, REMOVE REDUNDANCIES begins, and then calculates a parameter, such as edge contrast, for all objects. Edge contrast is calculated as described above with respect to FIG. 33 as shown in block B of FIG. 56. Then, REMOVE REDUNDANCIES lets the parent be the smallest object from the active list not already selected as the parent object as shown in block C. REMOVE REDUNDANCIES then calls the module CHECK REDUNDANCY and runs this module for the parent object as shown in block D. Decision diamond E then asks whether the parent is the largest active object. If it is not, the loop through B–E continues until the parent is the largest active object. At this point, the module is done as shown in oval F.

Figure 57A:
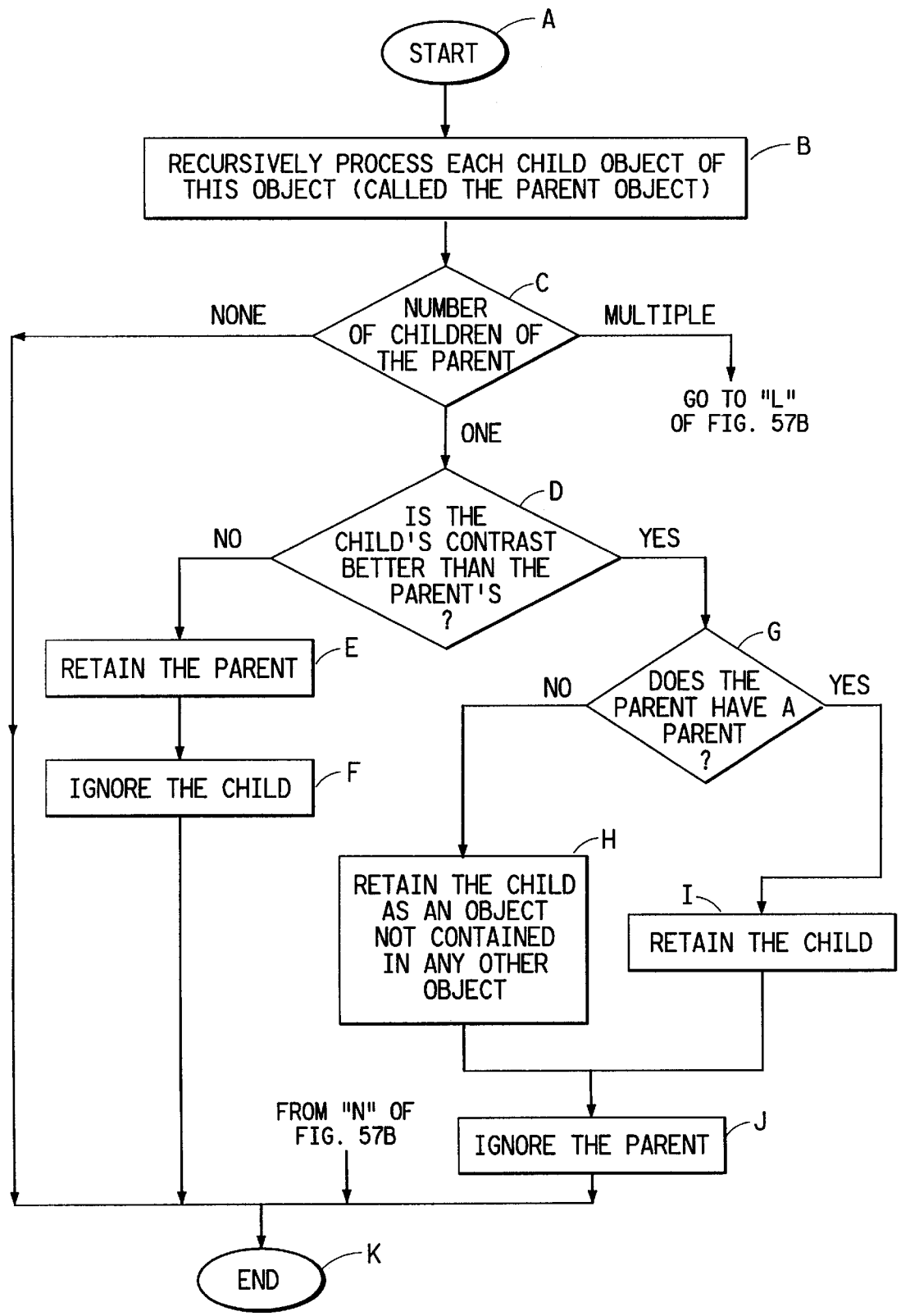
FIGS. 57A–57B are a flow chart illustrating the steps of a module, CHECK REDUNDANCY, which removes redundant identifications of different generations of objects.
Figure 57B:
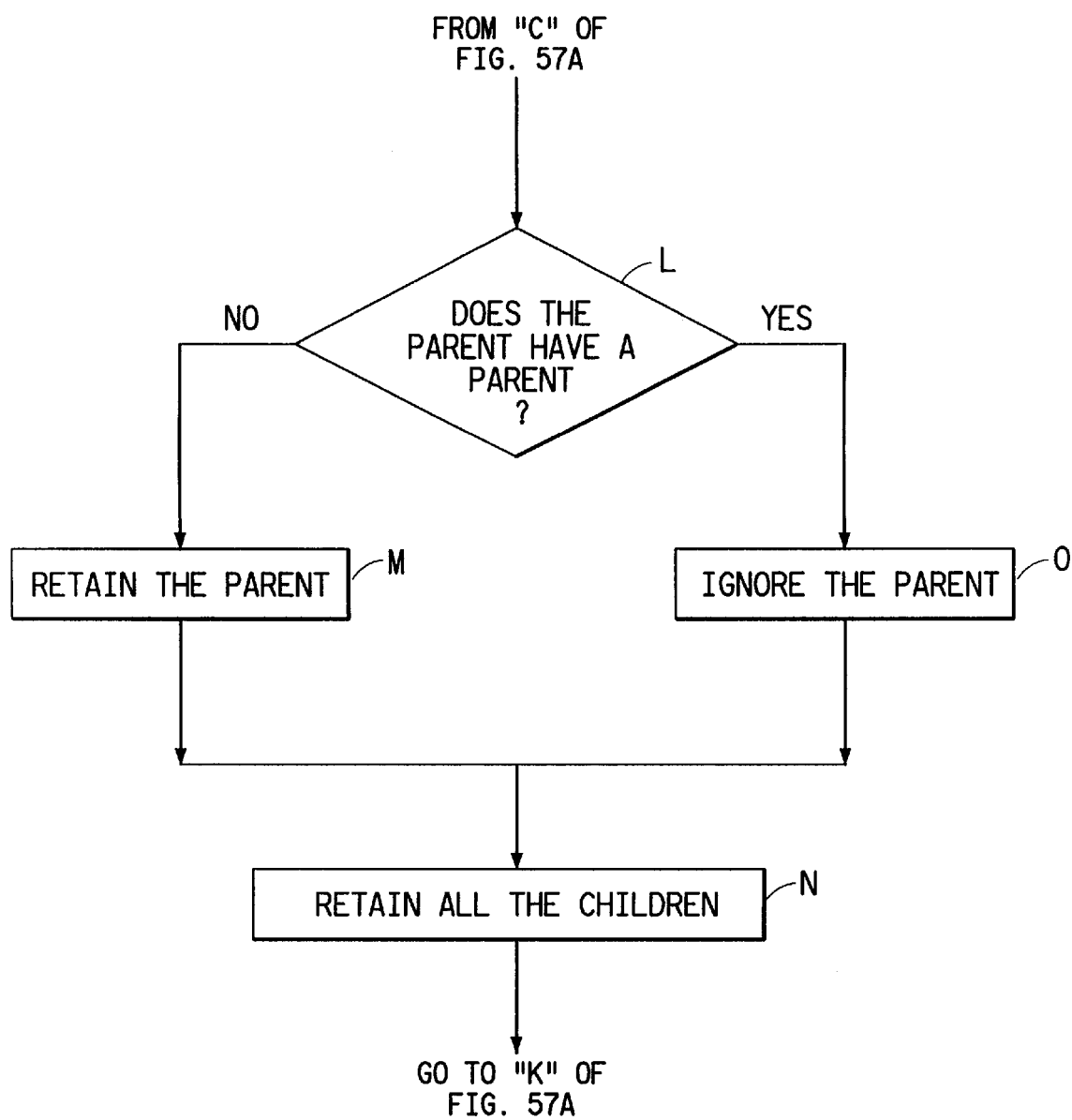

In the fourth embodiment, a module CHECK REDUNDANCY, as shown in FIGS. 57A–57B, removes redundant identifications of different generations of objects. The module CHECK REDUNDANCY starts as shown in oval A of FIG. 57A. CHECK REDUNDANCY is called to process a parent object. As shown in block B, CHECK REDUNDANCY is recursively called for each child of the parent. Then for each object not contained in any other object, i.e., the parent object, the module CHECK REDUNDANCY recursively processes each child object of the parent object as shown in block B of FIG. 57A. This recursive call results in processing objects furthest down the family tree, for example, as shown in FIG. 55A, first—i.e., great grand children are processed before grand children, and grand children are processed before children, etc. Decision diamond C then asks what the number of children of the parent is. If it is none, the module ends, as shown in oval D. If the number of children of the parent is one, then decision diamond E asks whether the edge contrast of the child is greater than the edge contrast of the parent. If it is not, then the parent is retained as shown in block E, the child is ignored as shown in block F, and the module is done as shown in oval D. Returning to decision diamond E, if the edge contrast of the parent is better than the edge contrast of the child, then decision diamond G asks whether the parent has a parent. If it does not, then the child is retained as an object not contained in any other object as shown in block H. The parent is ignored as shown in block J, and the module is done, as shown in oval D of FIG. 56B. Returning to decision diamond G, if the parent has a parent, then the child is retained as shown in block I. The parent is ignored as shown in block J, and the module is done as shown in oval D.

Returning to decision diamond C, if the number of children is greater than one, then the module CHECK REDUNDANCY proceeds to decision diamond L, which asks whether the parent has a parent. If it does not, then the parent is retained as shown in block M. The parent is retained only for the purpose of permitting assignment of the parent's characteristics, such as perimeter points, to the children. For example, each interior point of the parent is assigned to one of the children so that all the parent's area is represented by the children in the final analysis. All the children are retained as shown in block N, and the module is done as shown in oval D. If the parent does have a parent, the, the parent is ignored as shown in block O. All the children are retained as shown in block N, and the module is done as shown in oval D.

Figure 58A:
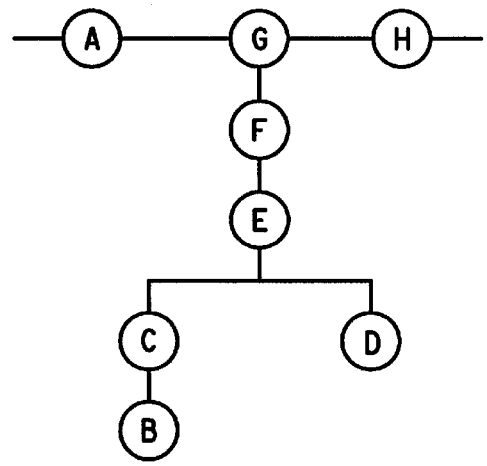
FIGS. 58A–58D are schematic diagrams illustrating how objects are classified when the module REMOVE REDUNDANCIES is run.

For purposes of clarity, the module Removing Redundancies is explained with reference to FIGS. 58A–58D. FIG. 58A is an illustration of a family link relationship of objects A, B, C, D, E, F, G and H after the modules LINK FAMILY and Heterogeneous Declump have been run. The purpose of the module REMOVE REDUNDANCIES to compare homogeneous or similar children with their parents and thereby determine redundancies. In this process, each child of a current parent is recursively processed. In the present illustration, parent object A has no children and therefore is not considered. Considering the next parent object G, each child and related child must be recursively processed. The module first processes the child furthest down the family tree. In this illustration, object B which is the great, great grand child of object G and which has no children itself, is processed.

Figure 58B:
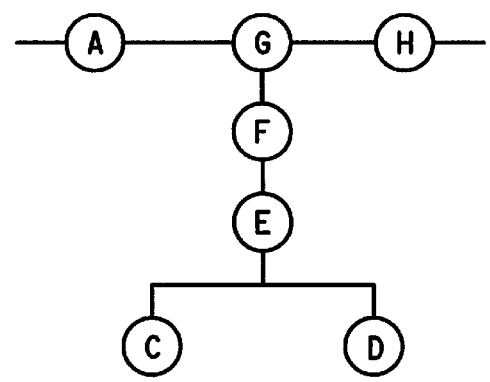

FIG. 58B shows the result of resolving the redundany of child object B with respect to its parent object C. Object B and its parent object C are known to be similar (or homogeneous) objects because they have previously passed the heterogeneous declumping test. Based on the number of children of parent object C and/or edge contrast of objects B and C, CHECK REDUNDANCY determines which of objects B and C will be retained while the other is ignored. For purposes of this illustration, object C is determined to be retained while object B is ignored as illustrated in FIG. 58B.

The module recursively returns to consider child object D. Since object D has no children, the module proceeds back up the tree to object E which as shown in FIG. 58B is the parent of object D. If a parent object has multiple children, then the parent of the parent is considered. Since object E has a parent object F, object E is ignored and the resulting family link relationship is shown in FIG. 58C.

Figure 58C:
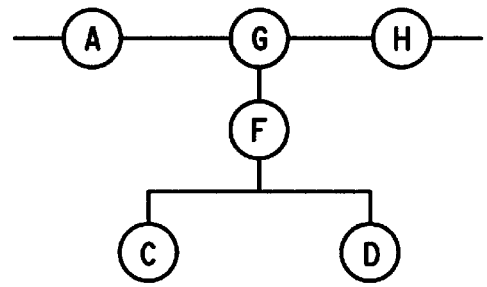
Figure 58D:
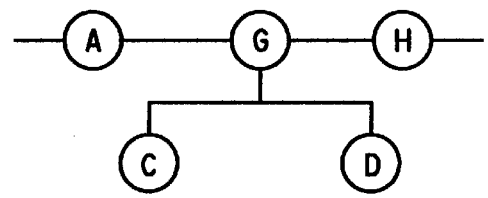

The module recursively returns to consider object F in FIG. 58C. Since object F has multiple children and has a parent object G, object F is ignored and the resulting the family link relationship is shown in FIG. 58D. The module recursively returns to consider object G in FIG. 58C. Since object G has multiple children and has no parent object, object G and its children are retained, and the family relationship is represented by FIG. 58D.

The module recursively returns to consider object H. Object H has no children. The family link relationship as illustrated in FIG. 58D is established.

EXAMPLE I

In this Example, the capability of the method and the system of the present invention was investigated using the LOCATE module as described above to differentiate between two classes of objects. This Example used images of spread plates prepared on Baird Parker selective agar for *Staphylococcus aureus*, (*S. aureus* and incubated at 37° C. for 48 hours. Twenty-three (23) plates were imaged, containing 2245 manually counted colonies. In this Example, only typical *S. aureus* was of interest to be identified, versus all other objects, which were considered to be artifacts.

The LOCATE module found 2061 objects that were matched to microbiologist's marks for *S. aureus*, and about 4280 artifact objects. For each object, a number of parameters describing the object as shown in FIG. 59F were extracted from the image. Table 1 as given below lists the parameters used in this Example. A linear regression fit, as described by William H. Press, Brian P. Flannery, Saul A. Teukolsky and William T. Vetterling in their textbook, "Numerical Recipes in C", Cambridge Univesity Press, (1988), was made as shown in FIG. 59N using 50% of the artifact objects (to balance the number of artifact objects and colony objects in the regression fit). A regression value was generated for all objects using the regression coefficients, as shown in FIG. 59H, determined from the regression fit.

Figure 59:
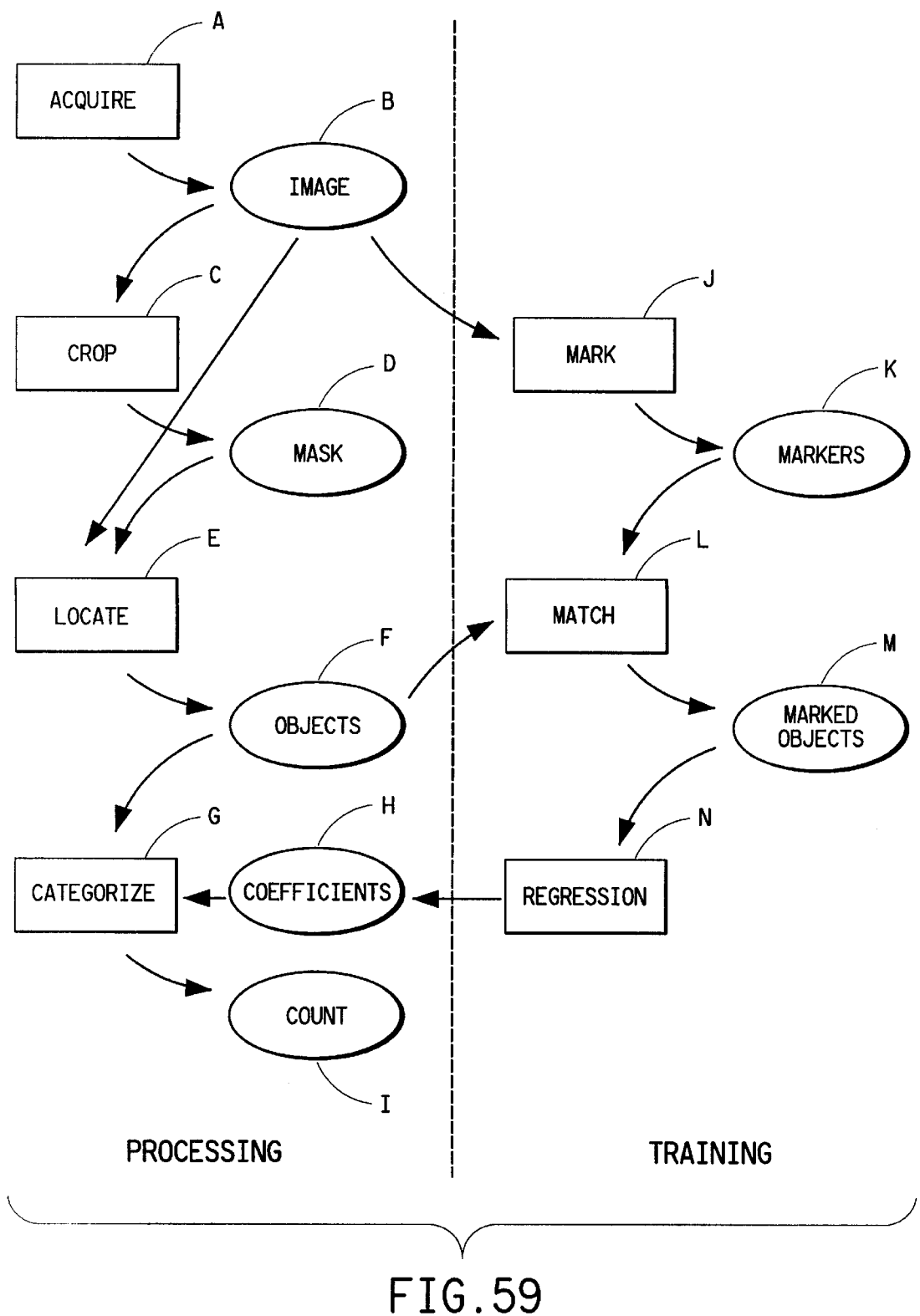
FIG. 59 is a flow chart showing the overall process in which the module LOCATE is used in order to identify objects in accordance with the fourth embodiment.

A system for object identification and counting using the fourth embodiment is shown in FIG. 59. This system makes use of the described method for resolving potentially redundant objects found in the visual features of a scene being analyzed to obtain the automatic determination of the classes (or categories) of objects and the number of objects in each class, as described below.

FIG. 59 can best be understood by considering two separate information flows. The first information flow is for image processing which is illustrated entirely on the left side of the figure. The object of this flow is to determine the count of desired objects in one or more categories in the view of the scene. This flow makes use of information obtained by the second flow. The second information flow is for process training which is illustrated using the entire FIG. 59. The object of this flow is to determine the proper setup data for the object classification method used to provide two or more categories, and is based on a set of image scenes which represent the scenes to be used in the first flow.

The following describes the first information flow, image processing. An image of the desired scene is acquired as shown in block A of FIG. 59. This image, oval B, is a full color image consisting of red, green, blue, and grey color planes acquired using red, green, blue, and neutral density filters respectively, matched for equivalent proper color balance. This image is cropped as shown in block C to permit analysis of only a part of the entire image scene. This cropping process may be fully automatic, by for example, locating the edge of a circular petri plate in the image and cropping it with a predetermined offset. The cropping process may also be manual, by for example, using a predetermined rectangular mask. In either case, mask data are saved as shown in oval D. The image data (oval B) and mask data (oval D) are used by the locate method as shown in block E and as described in the fourth embodiment, although the other embodiments could be used. The results of the locate method are a list of objects and associated descriptive data as shown by oval F. This data are combined with the linear regression coefficients shown by oval H using a classification step as shown by block G to provide a count of the objects in each class (or category) present, as shown by oval I.

The following describes the second information flow, process training. As above, an image is acquired (block A), cropped (block C), and object located (block E), resulting in image data (oval B), mask data (oval D), and object descriptive data (oval F). The image data (oval B) is also marked as shown by block J to produce a data list providing the locations of all desired objects in one or more categories, represented by oval K. This list of marker locations is matched to the objects located (oval F) by a matching step as shown by block L. This matching step may include a confirmation step to assure that all objects are assigned to a correct category. The matching step results in a marked object list shown by oval M. Note that all objects in the object list, oval F, that are not associated with (matched to) one of the marks in the markers list, oval K, are assigned to a special artifacts category. These steps are repeated for a number of images, these images comprise the training set. The marked object lists for each image in the training set are combined to create a combined marker object list (also represented by oval M since the lists are identical other than the latter represents objects from a number of images).

This combined marked object list, oval M, contains all the descriptive data for each object contained in the object list, oval F, plus an indication of the correct category that should be assigned to each object, for all images in the training set. This new list may then be used by a linear regression method (or any other suitable linear or non-linear classification method) as shown by block N to produce the necessary coefficients and thresholds collectively shown as oval H necessary to classify objects (block F) into one of two or more classes.

The use of the above method would normally consist of the following steps. A training set of scenes is selected that is representitive of the scenes for which automatic processing is desired. The process training step as defined above is performed on that set. Then additional scenes are selected for which automatic processing is desired. The image processing step is performed on each of these images resulting in a count of objects for each desired class for each image, as desired.

Figure 60:
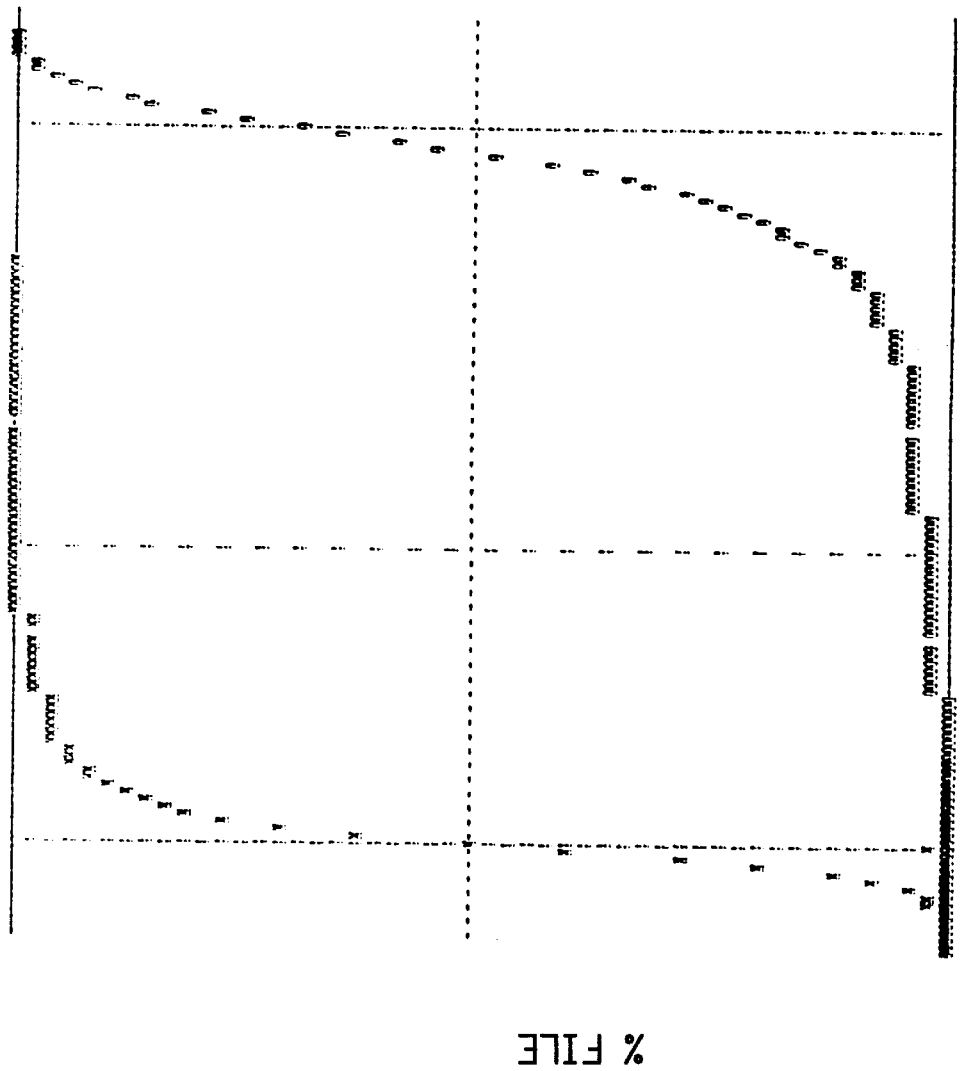
FIG. 60 is a plot showing the percentile distribution of artifacts and bacterial colonies identified by the method of the present invention as described in Example 1.

FIG. 60 shows a percentile distribution of artifacts (left curve) and colonies (right curve) as a function of the regression coefficient. The regression threshold (vertical line in the center) was set to minimize the total error (sum of false positive error represented by the tail of the left curve to the right of the threshold and the false negative error represented by the tail of the right curve to the left of the threshold).

Figure 61:
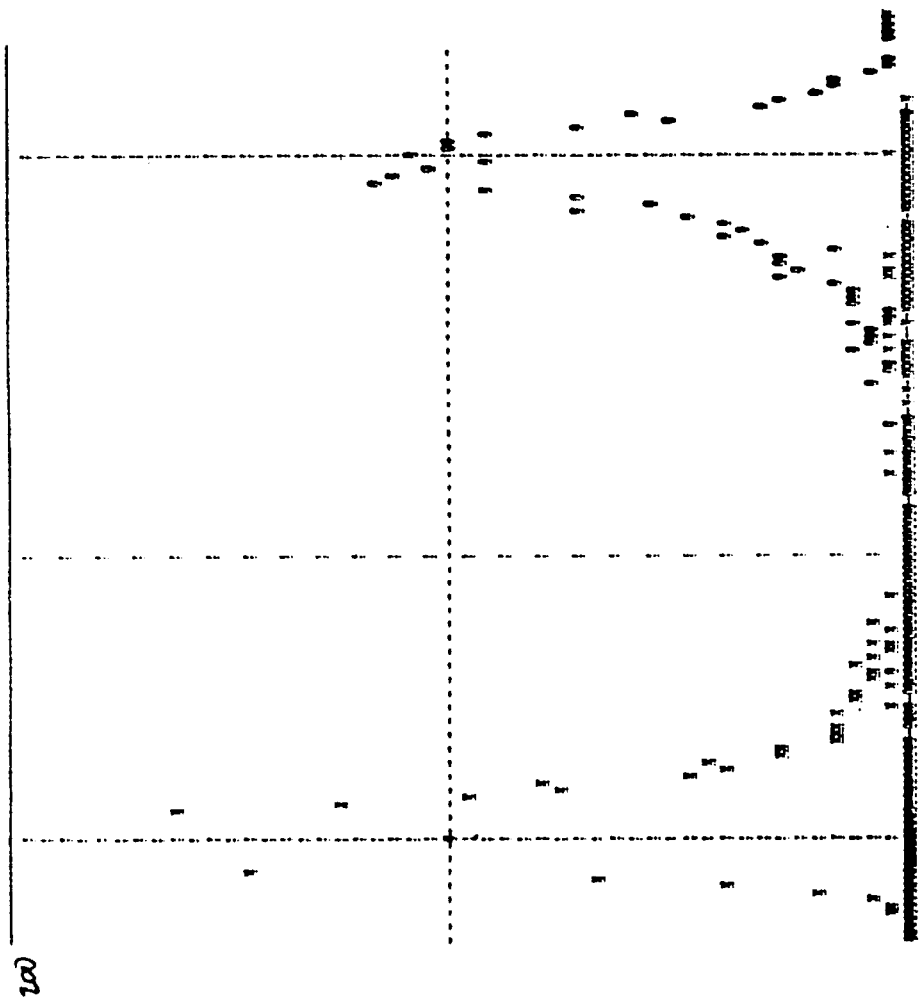
FIG. 61 is a plot showing the count distribution of artifacts and colonies identified by the method of the present invention as described in Example 1.

FIG. 61 shows the count distribution of artifacts (left peak, where the maximum is above the plot maximum value of 200 objects per 0.01 regression value width) and colonies (right peak). A clear separation between artifacts and colonies can be seen.

TABLE 1 npts
area
contrast
shape
interior count
interior hue mean
interior magnitude mean
interior red mean
interior red standard deviation
interior green mean
interior green stanard deviation
interior blue mean
interior blue stanard deviation
interior gray mean
interior gray stanard deviation
exterior count
exterior hue mean
exterior magnitude mean
exterior red mean
exterior red standar deviation
exterior green mean
exterior green standard deviation
exterior blue mean
exterior blue standard deviation
exterior gray mean
exterior gray stanard deviation
hue difference
red difference
green difference
blue difference
gray difference
hue difference times interior hue
red difference times interior red
green difference times interior green
blue difference times interior blue
gray difference times interior gray
interior hue mean times area
interior magnitude mean times area
interior red mean times area
interior red standard deviation times area
interior green mean times area
interior green standard deviation times area
interior blue mean times area
interior blue standard deviation times area
interior gray mean times area
interior gray standard deviation times area

EXAMPLE 2

Figure 62:
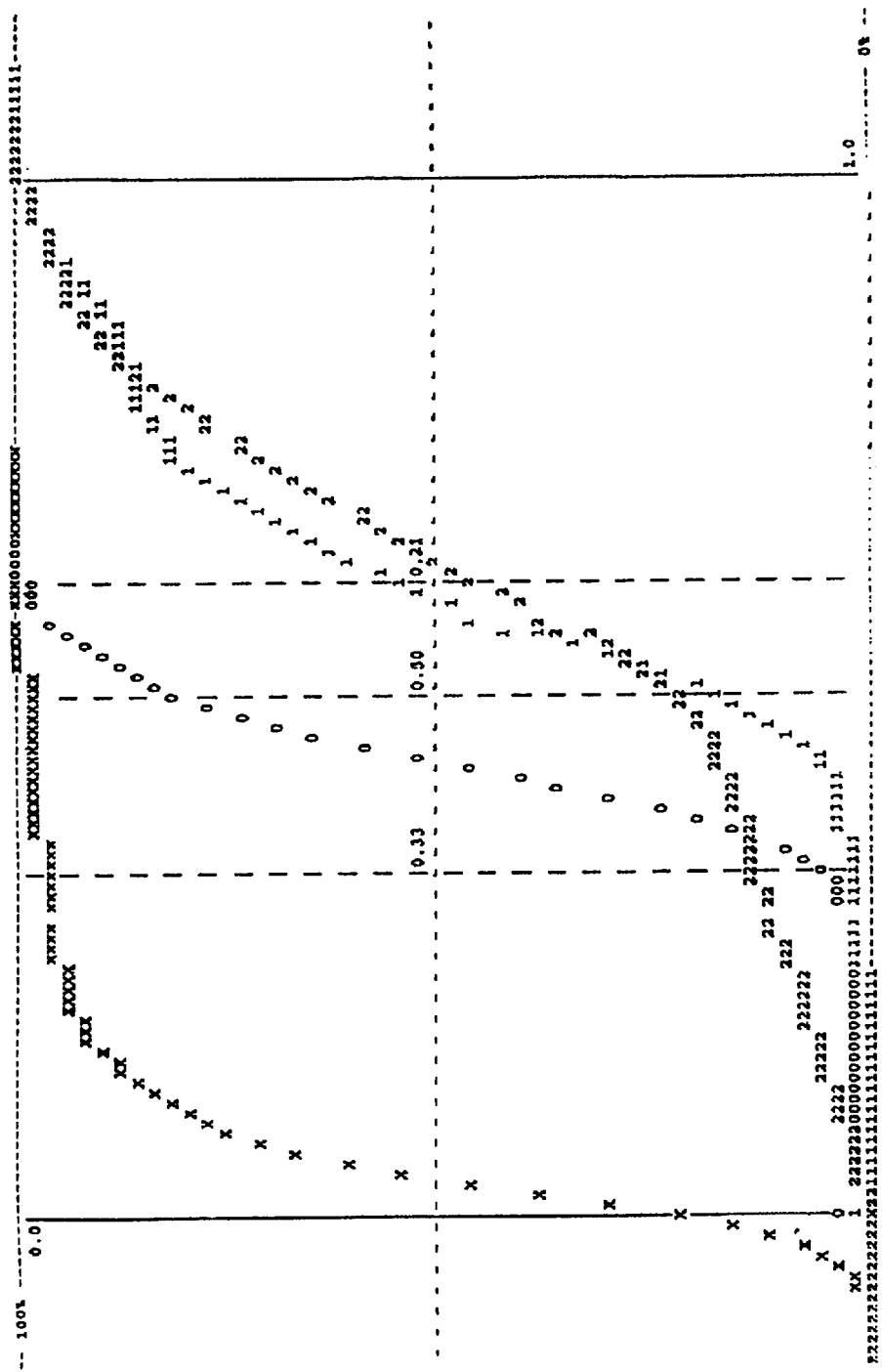
FIG. 62 is a plot showing the regression values of objects (colonies and artifacts) identified by the method of the present invention as described in Example 2.

In this Example, the capability of the method and system of the present invention was investigated, using the LOCATE module as described above to differentiate among several classes of objects. This Example again used images of spread plates prepared on Baird Parker selective agar for *S. aureus*, and incubated at 37° C. for 48 hours. However, in this Example, the differential capability was examined by distinguishing between typical *S. aureus* colonies (labeled "2" in FIGS. 62 and 63), atypical or other Staphylococcus colonies (labeld "1" in FIGS. 62 and 63), other background colonies (labeled "0" in FIGS. 62 and 63) and artifacts or non-colony objects (labeled "X" in FIGS. 62 and 63).

For this Example, 69 plates were imaged. The following Table 2 indicates the number of each type object found and matched to the microbiologist's marks:

TABLE 2

| Typical | 1249 |
| Atypical | 1171 |
| Background | 1999 |
| Artifact | 4365 |

For each object, a number of parameters describing the object were extracted from the image. Table 3, as given below, lists the parameters used in this Example. All objects were used to determine a regression fit. From the fit coefficients, a regression value was determined for each object, which is plotted as FIG. 62. This plot shows a clear separation between artifacts and background colonies, as well as a good separation between the background colonies and the two Staphylococcus populations.

Figure 63:
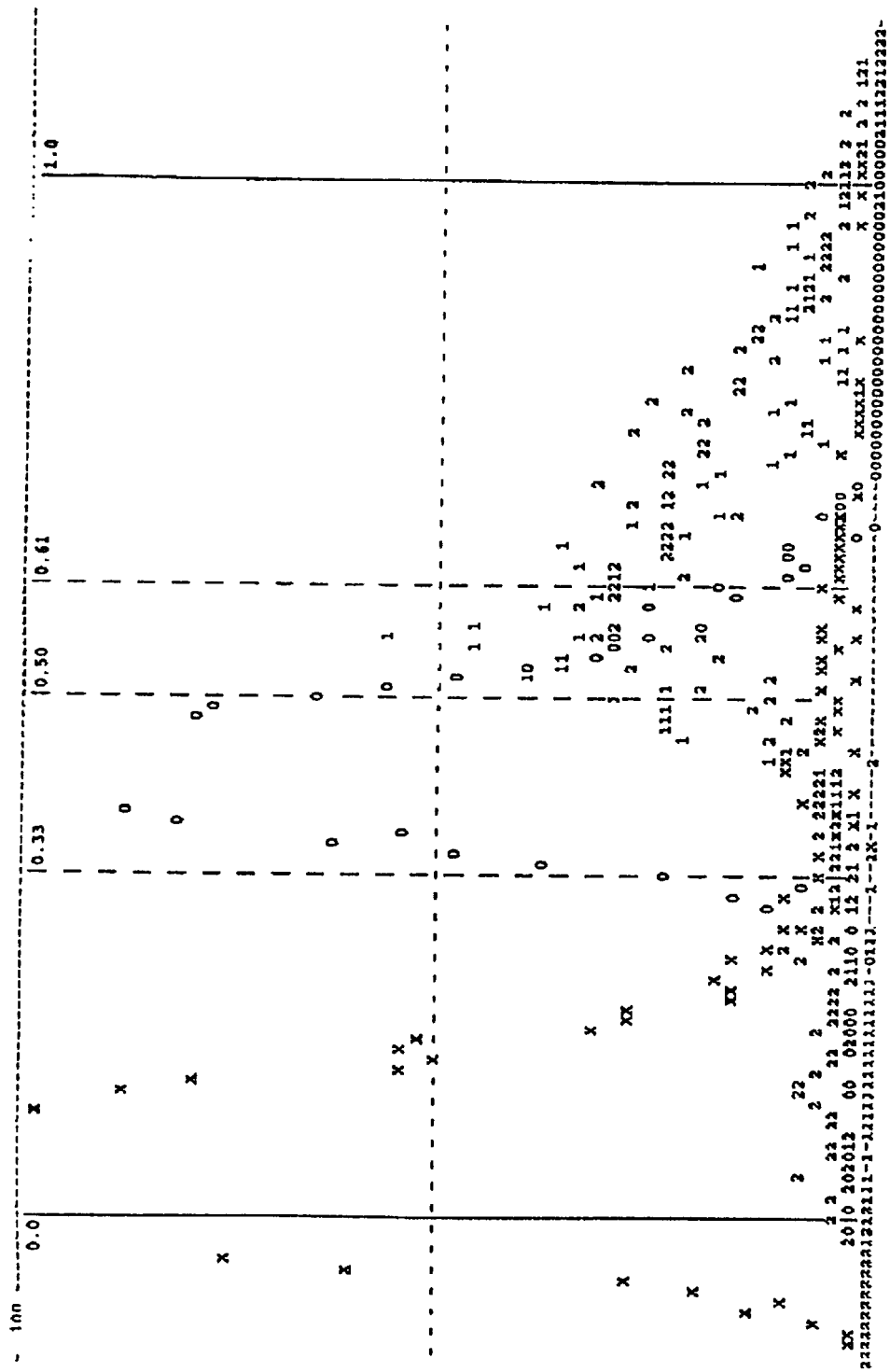
FIG. 63 is a plot showing the count distribution of artifacts and colonies identified by the method of the present invention as described in Example 2.

FIG. 63 gives the count distribution for the data of Example 2.

TABLE 3 unique id
scan number
object number
number siblings
number perimeter points, npts
area including npts
contrast
shape
min radius to edge
max radius to edge
interior count
interior red mean
interior red stardard deviation
interior green mean
interior green stardard deviation
interior blue mean
interior blue stardard deviation
interior gray mean
interior gray stardard deviation
exterior count
exterior red mean
exterior red stardard deviation
exterior green mean
exterior green stardard deviation
exterior blue mean
exterior blue stardard deviation
exterior gray mean
exterior gray stardard deviation

EXAMPLE 3

In this Example, the method and system of the present invention used the LOCATE module as described above to count bacterial colonies. This Example used images of spread plates prepared on Brain Heart Infusion (BHI) non-selective nutrient agar, and incubated at 37° C. for 24 hours. The plates were manually counted by trained microbiologists and imaged using the method and the system of the present invention.

A first set of images (a training set) was also marked on the system of the present invention by a microbiologist to tell the system the locations of the colonies. This set consisted of 74 plates, 25 of which were in the count range of 25 to 250 colonies per plate, most of the rest having fewer than 25 colonies per plate. A total of 3459 colonies were manually counted, and 3572 marks, representing a second manual count, were made.

The LOCATE module found 9941 objects on the images of these 74 plates. Of these, 3084 were matched to the microbiologists' marks. The discrepencies included 317 objects already assigned to another mark (that is, multiple marks for a single object automatically found), 171 marks for which no suitable object was automatically found, and 6 marks for which 2 or more objects were automatically found which were equally suitable, for which one was randomly selected. Of the remaining 6857 non-colony or artifact objects, a random selection of about 45%, or 3157 objects, was made, giving about equal number of colony and artifact objects for the linear regression fit.

The linear regression fit (using the same parameters as listed in Table 1 for the first example) produced a set of coefficients and a threshold, which were then applied to an independent set of 33 images, all within the counting rnage of 25 to 250 colonies per plate. The LOCATE module found 9850 objects on the iamges of these plates. After applying the regression coefficients and threshold, 3048 were automatically identified as colonies, compared to 3220 colonies manually counted, for an error of 5.6% undercounting. This is an estimate of what performance can be expected for a set of plates, that is, one could expect undercounting by 5.6% on average.

The automatically determined count for each plate was then compared to the manual count for that plate, giving a percent error for each plate. The average of these error was 5.0% undercounting. This is comparable to the above error estimate of 5.6%, and is the best estimate of the error that could be expected for a set of plates. The value difference is due to the distribution of counts between the plates in the set, which translates to a difference in the percentage error effect of a single count different among the plates.

The absolute value of the per plate percent errors was also averaged to give an estimate of the error that could be exptected on an individual plate. For these 33 plates, this average absolute error was 13.6%. Thus, for any given plate, one could expect that the automatically determined count would, on average, be within 13.6% of the manual count.

The error rates in the above Example are based on manual counts. It is know that manually counting is not completely precise. Other data has suggested that manual counts are in error by 5 to 30%. For this data set, it should be noted that the discrepancy between two manual counts on the training set of plates is about 3%, where the second count was made knowing the first count. This indicates that the performance of the automatic system of the present invention was quite acceptable.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for resolving redundant identifications of an object in an image, comprising the steps of:

(a) identifying a group of potentially redundant objects in an image;

(b) sorting the identified objects in a predetermined order to create a sorted list of objects, the initial object in the list having an initial characteristic value and the last object in the list having a last characteristic value;

(c) defining an object status variable, the object status variable having one of a first and a second value;

(d) assigning the first value of the object status variable to the initial object in the sorted list;

(e) comparing each respective object subsequent to the initial object to each object having a characteristic value less than the characteristic value of the respective, subsequent object and having the first value of the object status variable, wherein each respective, subsequent object is defined as a first object and each object having a characteristic value less than the characteristic value of the first object is defined as a second object for each comparison;

(f) determining whether each respective second object has a characteristic value contained within a predetermined range of the characteristic value of the first object, thereby assigning one of the first and the second status values of the object status variable to each respective first object and to each respective second object in order to resolve redundant identifications of an object in the image; and (g) identifying the objects having the first value of the object status variable of step (f) as non-redundant objects and retaining the non-redundant objects.

2. The method of claim 1, wherein the determining step comprises the sub-steps of:

(i) retaining the first object and setting the object status variable of the first object to the first value if no second object has a characteristic value within the predetermined range of the characteristic value of the first object, (ii) retaining the first object and setting the object status variable of the first object to the first value if only one second object has a characteristic value within the predetermined range of the characteristic value of the first object and deleting the second object, and (iii) deleting the first object and setting the object status variable of the second object to the first value if more than one second object has a characteristic value within the predetermined range of the characteristic value of the first object.

3. The method of claim 1, wherein the determining step comprises the sub-steps of:

(i) retaining the first object and setting the object status variable of the first object to the first value if no second object has a characteristic value within the predetermined range of the characteristic value of the first object, (ii) retaining the first object and setting the object status variable of the first object to the first value if only one second object has a first characteristic value within the predetermined range of the characteristic value of the first object and the first object has a greater second characteristic value of the first object and deleting the second object, (iii) retaining the second object and setting the object status variable of the second object to the first value if only one second object has a first characteristic value within the predetermined range of the characteristic value of the first object and the first object has a lesser second characteristic value and deleting the first object, and (iv) deleting the first object and setting the object status variable of the second object to the first value if more than one second object has a first characteristic value within the predetermined range of the first characteristic value of the first object.

4. The method of claim 2, wherein the first object is a larger object as compared to the second object, and the second object is a smaller object as compared to the first object, and the determining step comprises determining whether the smaller object is contained within the larger object and further includes the sub-steps of:

(iv) determining the perimeter points of the larger object, (v) creating a perimeter buffer, the perimeter buffer comprising the perimeter points of the larger object, each perimeter point having a row-position coordinate value, a column-position coordinate value and a direction code vector, the direction code vector comprising a first and a second direction code value for each perimeter point, the first direction code value describing the relationship of each respective perimeter point to the next perimeter point and the second direction code value describing the relationship of each respective perimeter point to the previous perimeter point, (vi) sorting the perimeter points in the perimeter buffer in a predetermined order to create a row-column sorted perimeter buffer, (vii) assigning to each perimeter point in the buffer a perimeter point status variable having one of a first and a second value, the value of the perimeter point status variable being determined by the first and second direction code values, (viii) designating the smaller object as being contained within the larger object if the column-position coordinate value of a predetermined point of the smaller object lies between the values of the column-position coordinate value of a perimeter point having the first value of the perimeter point status variable and the column-position coordinate value of the next perimeter point in the sorted perimeter buffer, wherein the perimeter points have the same row-position coordinate value as the predetermined point of the smaller object.

5. The method of claim 3, wherein the first object is a larger object as compared to the second object, and the second object is a smaller object as compared to the first object, and the determining step comprises determining whether the smaller object is contained within the larger object and further includes the sub-steps of:

(v) determining the perimeter points of the larger object, (vi) creating a perimeter buffer, the perimeter buffer comprising the perimeter points of the larger object, each perimeter point having a row-position coordinate value, a column-position coordinate value and a direction code vector, the direction code vector comprising a first and a second direction code value for each perimeter point, the first direction code value describing the relationship of each respective perimeter point to the next perimeter point and the second direction code value describing the relationship of each respective perimeter point to the previous perimeter point, (vii) sorting the perimeter points in the perimeter buffer in a predetermined order to create a row-column sorted perimeter buffer, (viii) assigning to each perimeter point in the buffer a perimeter point status variable having one of a first and a second value, the value of the perimeter point status variable being determined by the first and second direction code values, (ix) designating the smaller object as being contained within the larger object if the column-position coordinate value of a predetermined point of the smaller object lies between the values of the column-position coordinate value of a perimeter point having the first value of the perimeter point status variable and the column-position coordinate value of the next perimeter point in the sorted perimeter buffer, wherein the perimeter points have the same row-position coordinate value as the predetermined point of the smaller object.

6. The method of claim 4, wherein the sub-step of designating the smaller object as being contained within the larger object further includes the following sub-steps performed prior to sub-steps (iv)–(viii):

(ix) determining the four extremum points of the larger object, each extremum point having a row-position coordinate value and a column-position coordinate value, (x) constructing a rectangle bounding the larger object by using the row and column-position coordinate values of the four extremum points, (xi) determining a predetermined point on the smaller object, the predetermined point having a row-position coordinate value and a column-position coordinate value, (xii) determining the position of the predetermined point of the smaller object with respect to the rectangle bounding the larger object, (xiii) performing steps (iv)–(viii) only if the predetermined point of the smaller object is contained within the rectangle bounding the larger object, and (xiv) designating the smaller object as not contained within the larger object if the predetermined point of the smaller object is not contained within the rectangle bounding the larger object.

7. The method of claim 2, wherein the first object is a larger object as compared to the second object, and the second object is a smaller object as compared to the first object, and the determining step comprises determining whether the smaller object is contained within the larger object and the determining step further includes the sub-steps of:

(ix) determining the four extremum points of the larger object, each extremum point having a row-position coordinate value and a column-position coordinate value, (x) constructing a rectangle bounding the larger object by using the row and column-position coordinate values of the four extremum points, (xi) determining a predetermined point on the smaller object, the predetermined point having a predetermined row-position coordinate value and a predetermined column-position coordinate value, (xii) determining the position of the predetermined point of the smaller object with respect to the rectangle bounding the larger object, and (xiii) designating the smaller object as contained within the larger object if the predetermined point of the smaller object is contained within the rectangle.

8. The method of claim 5, wherein the first object is a larger object as compared to the second object, and the second object is a smaller object as compared to the first object, and the determining step comprises determining whether the smaller object is contained within the larger object and further includes the following sub-steps performed prior to sub-steps (v)–(ix):

(x) determining the four extremum points of the larger object, each extremum point having a row-position coordinate value and a column-position coordinate value, (xii) constructing a rectangle bounding the smaller object by using the row and column-position coordinate values of the four extremum points, (xiii) determining the four extremum points of the smaller object, and (xiv) ignoring the smaller object if any extremum point of the smaller object is not contained within the boundary of the rectangle.

9. The method of claim 3, wherein the first object is a larger object as compared to the second object, and the second object is a smaller object as compared to the first object, and the determining step comprises determining whether the smaller object is contained within the larger object and further includes the sub-steps of:

(iv) determining the four extremum points of the larger object, each extremum point having a row-position coordinate value and a column-position coordinate value, (v) constructing a rectangle bounding the smaller object by using the row and column-position coordinate values of the four extremum points, (vi) determining the four extremum points of the smaller object, and (vii) ignoring the smaller object if any extremum point of the smaller object is not contained within the boundary of the rectangle.

10. The method of claim 6, wherein the predetermined point is contained within the rectangle bounding the larger object if both of the following conditions are met:

(A) the row-position coordinate value of the predetermined point of the smaller object lies between the minimum and the maximum values for the row-position coordinate values of the rectangle bounding the larger object, and (B) the column-position coordinate value of the predetermined point of the smaller object lies between the minimum and maximum values for the column-position coordinate values of the rectangle bounding the larger object.

11. The method of one of claims 5, 6 or 10, wherein the predetermined point is the center of mass of the smaller object.

12. The method of claim 5, 6 or 10, further including the steps of:

(h) determining a characteristic attribute of at least one predetermined point of the smaller object contained within the larger object;

(i) determining the characteristic attribute of the larger object; and (j) retaining the larger object and the smaller object and setting the object status variable of each of the larger and smaller objects to the first value if the difference in the characteristic attribute of the at least one predetermined point of the larger object with respect to the characteristic attribute of the predetermined point of the smaller object contained within the larger object exceeds a predetermined minimum number.

13. The method of claim 12, further including the steps of:

(k) determining at least one average characteristic attribute of the interior points of the smaller object;

(l) determining the average characteristic attribute of the interior points of the larger object; and (m) retaining the larger object and the smaller object and setting the object status variable of each of the larger and smaller objects to the first value if the difference in the average characteristic attribute of the interior points of the larger object with respect to the average characteristic attribute of the interior points of the smaller object contained within the larger object exceeds a predetermined minimum number.

14. The method of claim 13, wherein determining step (k) comprises determining the interior points of the larger object, excluding the interior points of the smaller object.

15. The method of claim 12, wherein the characteristic attribute is hue.

16. The method of claim 13, wherein the average characteristic attribute is the average hue of the interior points of each of the larger and the smaller object.

17. The method of claim 1, wherein the step of identifying a group of potentially redundant objects in an image comprises the sub-steps of:

(i) generating an image of the object and the background;

(ii) defining a multi-dimensional data space comprising a plurality of sub-spaces;

(iii) selecting at least one sub-space based on the attributes of at least one candidate object;

(iv) multiply searching the image for at least one representation of a candidate object using each selected sub-space, wherein the candidate object has at least one predetermined attribute value; and (v) validating the candidate object having the predetermined attribute value to identify the valid object.

18. The method of claim 17, wherein:

(A) the multi-dimensional data space is a gray level histogram representative of the entire image, the gray level histogram having an entropy function, and a plurality of gray level upper and lower histograms, each having a respective entropy function is generated from the histogram, and (B) the at least one sub-space is a plurality of pairs of threshold gray level values for each upper and lower histogram such that the entropy function of each upper and lower histogram is maximized, and the image is multiply searched using the selected threshold gray level pair for each upper and lower histogram for at least one representation of a candidate object.

19. A method of resolving redundant identifications of object in an image, comprising the steps of:

(a) identifying a group of potentially redundant objects;

(b) comparing the area of two identified objects and designating one of the objects as a larger object as compared to the other object and the other object as a smaller object as compared to the larger object; and (c) determining whether the smaller object is contained within the larger object by:

(i) determining the four extremum points of the larger object, each extremum point having a row-position coordinate value and a column-position coordinate value, (ii) constructing a rectangle bounding the larger object by using the row and column-position coordinate values of the four extremum points, (iii) determining a predetermined point on the smaller object, the predetermined point having a predetermined row-position coordinate value and a predetermined column-position coordinate value, and (iv) determining the position of the predetermined point of the smaller object with respect to the rectangle bounding the larger object, and (v) designating the smaller object as contained within the larger object if the predetermined point of the smaller object is contained within the rectangle, thereby resolving the redundant identifications of each identified object in the image.

20. The method of claim 19, wherein the predetermined point is contained within the rectangle bounding the larger object if both of the following conditions are met:

(A) the row-position coordinate value of the predetermined point of the smaller object lies between the minimum and the maximum values for the row-position coordinate values of the rectangle bounding the larger object, and (B) the column-position coordinate value of the predetermined point of the smaller object lies between the minimum and maximum values for the column-position coordinate values of the rectangle bounding the larger object.

21. A method of identifying a valid object having at least one predetermined attribute value in a background and for resolving redundant identifications of a valid object, comprising the steps of:

(a) generating an image of an object and a background;

(b) generating a gray level histogram of the image, the gray level histogram having an entropy function;

(c) entropically selecting a threshold gray level value such that the entropy function of the histogram is maximized;

(d) searching the image using the entropically selected threshold gray level value for at least one representation of a candidate object, wherein the candidate object has at least one candidate object attribute value; and (e) validating the candidate object having the valid object predetermined attribute value to identify the valid object by:

(i) comparing the areas of two valid objects and designating one of the valid objects as a larger valid object as compared to the other valid object and the other valid object as a smaller valid object as compared to the larger object, (ii) determining the four extremum points of the larger object, each extremum point having a row-position coordinate value and a column-position coordinate value, (iii) constructing a rectangle bounding the larger object by using the row and column-position coordinate values of the four extremum points, (iv) determining a predetermined point on the smaller object, the predetermined point having a row-position coordinate value and a column-position coordinate value, (v) determining the position of the predetermined point of the smaller object with respect to the rectangle bounding the larger object, and (vi) designating the smaller object as being contained within the larger object if the predetermined point of the smaller object is contained within the rectangle bounding the larger object.

22. The method of claim 21, wherein the validating step is performed to resolve redundant identifications of inhomogeneous objects and further includes the sub-step of deleting the larger object when the larger object contains more than one smaller object.

23. The method of claim 21, wherein the validating step is performed to resolve redundant identifications of inhomogeneous objects and further includes the sub-steps of:

(vi) calculating the average edge contrast of the larger and smaller valid objects, and (vii) deleting the object having the smaller edge contrast when the larger valid object contains only one smaller valid object.

24. The method of claim 21, wherein the validating step is performed to resolve redundant identifications of homogeneous objects and further includes the sub-steps of:

(vi) calculating the average edge contrast of the larger and smaller valid objects, and (vii) deleting the larger object where the average edge contrast of the larger object is less than the average edge contrast of the smaller object and is less than a predetermined minimum edge contrast.

25. The method of claim 22, wherein the validating step is performed to resolve redundant identifications of inhomogeneous objects and further includes the sub-steps of:

(vi) calculating the edge contrast of the larger and smaller valid objects, and (vii) deleting the smaller valid object where the average edge contrast of the larger valid object is greater than the average edge contrast of the smaller valid object and is greater than a predetermined maximum edge contrast.

* * * * *